US012666233B2

(12) United States Patent
Fukuda et al.

(10) Patent No.: US 12,666,233 B2
(45) Date of Patent: Jun. 23, 2026

(54) WORKING VEHICLE AND ATTACHMENT USAGE SYSTEM

(71) Applicant: Kubota Corporation, Osaka (JP)

(72) Inventors: Yuji Fukuda, Sakai (JP); Tomoyuki Noguchi, Sakai (JP); Daichi Kino, Sakai (JP); Shotaro Kubota, Sakai (JP); Ryuki Matsumoto, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 41 days.

(21) Appl. No.: 18/818,740

(22) Filed: Aug. 29, 2024

(65) Prior Publication Data

US 2026/0067652 A1     Mar. 5, 2026

(51) Int. Cl.
| | |
|---|---|
| *H04W 4/40* | (2018.01) |
| *B60K 35/10* | (2024.01) |
| *B60R 16/023* | (2006.01) |
| *H04W 4/80* | (2018.01) |

(52) U.S. Cl.
CPC .............. *H04W 4/40* (2018.02); *B60K 35/10* (2024.01); *B60R 16/023* (2013.01); *H04W 4/80* (2018.02)

(58) Field of Classification Search
CPC .......... H04W 4/40; H04W 4/80; B60K 35/10; B60R 16/023
See application file for complete search history.

(56) References Cited

U.S. PATENT DOCUMENTS

| | | | | |
|---|---|---|---|---|
| 2006/0011721 A1* | 1/2006 | Olsen | ................... | G06Q 10/087 |
| | | | | 235/385 |
| 2015/0137961 A1* | 5/2015 | Bean | .................... | G01R 31/007 |
| | | | | 340/431 |
| 2019/0075724 A1* | 3/2019 | Becke | ................... | H02J 7/0045 |
| 2019/0210418 A1* | 7/2019 | Hall | ...................... | B60W 30/00 |
| 2020/0285237 A1* | 9/2020 | Ahola | .................. | G05D 1/0212 |
| 2021/0195840 A1* | 7/2021 | Puryk | ................... | A01D 90/10 |
| 2021/0255639 A1* | 8/2021 | Davis | .................. | A01B 69/006 |
| 2022/0098833 A1 | 3/2022 | Fukuda | | |
| 2022/0412040 A1* | 12/2022 | Zitterbart | ................ | E02F 3/431 |
| 2024/0209882 A1* | 6/2024 | Sietsema | .................. | F16B 5/00 |
| 2024/0424844 A1* | 12/2024 | Roltgen | .............. | A01B 59/062 |
| 2025/0063972 A1* | 2/2025 | Morford | ............. | A01B 69/008 |
| 2025/0121810 A1* | 4/2025 | Wiedenmann | ...... | A01M 7/0075 |
| 2025/0227468 A1* | 7/2025 | Shankar | ................ | H04W 12/48 |

* cited by examiner

*Primary Examiner* — Ashley L Redhead, Jr.

(74) *Attorney, Agent, or Firm* — Keating & Bennett, LLP

(57) ABSTRACT

A working vehicle includes a first interface to receive input of first attachment information relating to an attachment attached to a hitch, a second interface to connect thereto at least one accessory electronic device provided in/on the attachment attached to the hitch, and a controller and a gateway which are connected to a bus. The gateway is connected to the second interface without the bus between the gateway and the second interface, and is configured or programmed to, if an external signal inputted thereto from the second interface does not agree with the attachment corresponding to the first attachment information, not output the external signal to the bus, and, if the external signal agrees with the attachment corresponding to the first attachment information, output the external signal to the bus. The controller is configured or programmed to perform control corresponding to the external signal inputted thereto via the bus.

40 Claims, 24 Drawing Sheets

Figure 2:
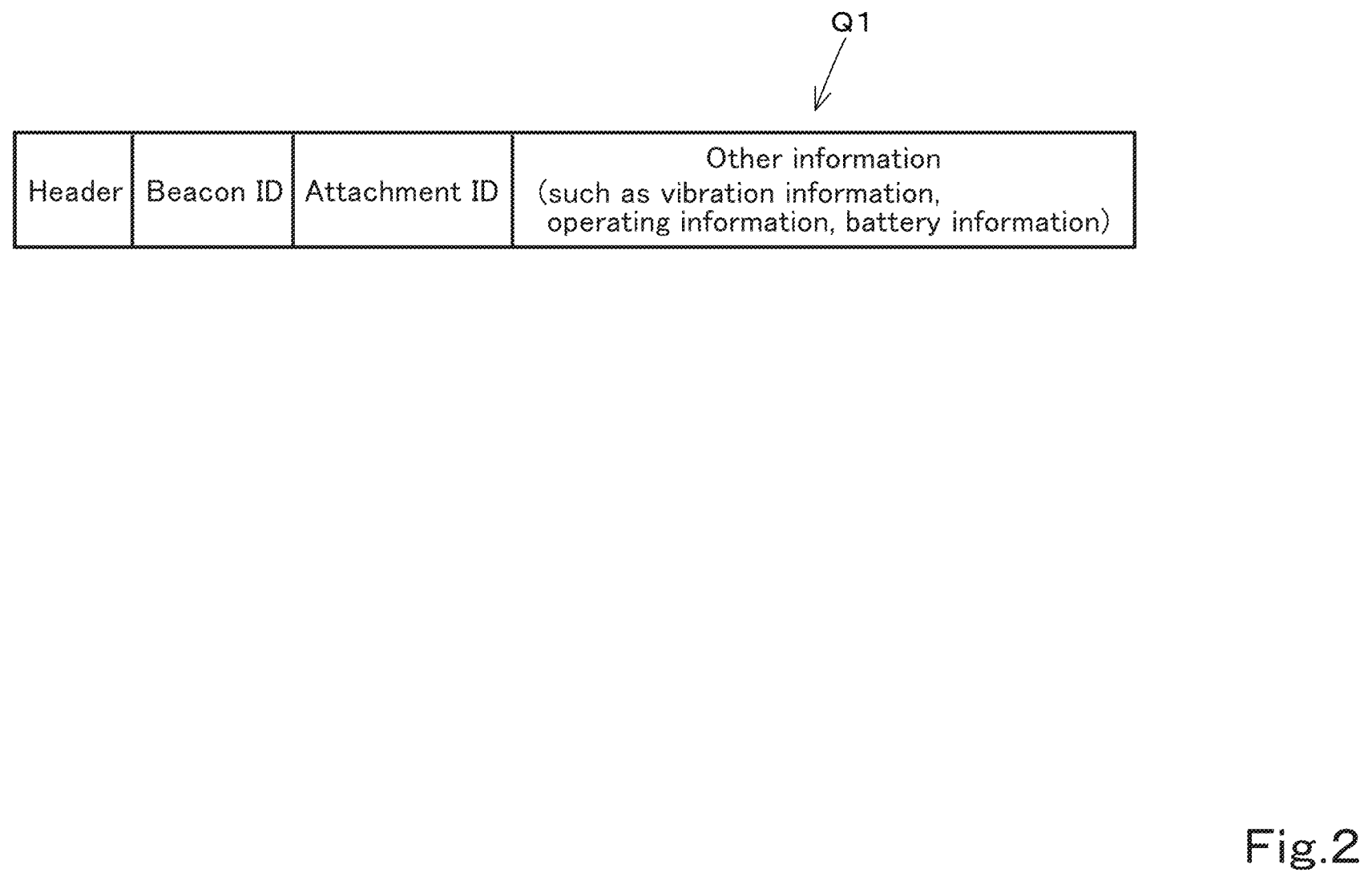

| Header | Beacon ID | Attachment ID | Other information (such as vibration information, operating information, battery information) |

Fig.3

| ADV information<br>(such as attachment ID, beacon ID, vibration information,<br>operating information, battery information. RSSI, time information) |
| --- |
| ADV information<br>(such as attachment ID, beacon ID, vibration information,<br>operating information, battery information, RSSI, time information) |
| ADV information<br>(such as attachment ID, beacon ID, vibration information,<br>operating information, battery information, RSSI, time information) |
| ADV information<br>(such as attachment ID, beacon ID, vibration information,<br>operating information, battery information, RSSI, time information) |

| Attachment ID | Corresponding data | |
| --- | --- | --- |
| | Attachment data | Accessory device data |
| ATT0001 | Identification information<br>Specifications<br>Control data etc.<br>(such as posture, vehicle speed) | |
| ATT0002 | Identification information<br>Specifications<br>Control data etc.<br>(such as supply amount of hydraulic fluid,<br>posture, vehicle speed) | Identification information<br>Specifications etc. |
| ATT0003 | Identification information<br>Specifications<br>Control data etc.<br>(such as supply amount of hydraulic fluid,<br>posture, vehicle speed) | Identification information<br>Specifications etc. |
| . . . | . . . | . . . |

<ADV information collecting process>

<ATT usage process>

| Name | Attachment ID | Specifications |
|---|---|---|
| Bucket | ATT0001 | Product name, Model number, Excavation, Large, Total length, Total width, etc. |
| Spreader | ATT0002 | Product name, Model number, Spreading, Total length, Total width, etc. |
| Skid cutter | ATT0003 | Product name, Model number, Mowing, Small, Total length, Total width, etc. |
| Pallet fork | ATT00xy | Product name, Model number, Cargo handling, Total length, Total width, etc. |
| Bucket | ATT00xx | Product name, Model number, Excavation, Small, Total length, Total width, etc. |
| ... | ... | ... |

<External signal evaluating process>

<Communication process>

WORKING VEHICLE AND ATTACHMENT USAGE SYSTEM

BACKGROUND OF THE INVENTION

1. Field of the Invention

The present invention relates to techniques to use attachments to perform work on working vehicles.

2. Description of the Related Art

For example, the specification of U.S. Patent Application Publication No. 2022/412040 discloses a system to automatically identify the attachment attached to a working vehicle among attachments in the vicinity of the working vehicle. The system is such that a first communication unit (tool module) including a first acceleration sensor is provided on an attachment such as a bucket, a quick changer configured to quickly and simply attach and detach the attachment thereto and therefrom is provided at the distal end of the boom of the working vehicle (excavator), a second communication unit (receiving module) including a second acceleration sensor is provided at the quick changer, and the working vehicle is provided with an identification module and a controller.

The first communication unit transmits, to the second communication unit via a near field communication such as RFID or Bluetooth (registered trademark) Low Energy, a first acceleration signal relating to the instantaneous acceleration of the attachment detected by the first acceleration sensor and an identifying signal of the attachment. The second communication unit transmits, to the identification module, the first acceleration signal and the identifying signal received from the first communication unit and the second acceleration signal relating to the instantaneous acceleration of the quick changer detected by the second acceleration sensor. The identification module identifies the attachment attached to the quick changer based on the comparison (e.g., difference) between the first acceleration signal and the second acceleration signal received from the second communication unit and/or the received signal strength of the first acceleration signal, and transmits the identification information relating to the attachment to the controller. The controller performs an appropriate operation (work action) of the working vehicle based on the received identifying signal.

Some attachments include an actuator such as a hydraulic cylinder or a hydraulic motor. The actuator is actuated by power such as the pressure of hydraulic fluid outputted from a hydraulic circuit of the working vehicle, as disclosed in, for example, U.S. Patent Application Publication No. 2022/0098833. Specifically, the working vehicle and the attachment are connected by hose(s) and electric harness(es). Then, an electrical signal is inputted from a controller and/or the like of the working vehicle into the control valve in the attachment via the electric harness to cause the control valve to open, allowing hydraulic fluid to be supplied from the hydraulic circuit of the working vehicle to the actuator of the attachment via the hose and the control valve, thus actuating the actuator. This allows work to be done by the working vehicle using the attachment.

In the case where an attachment is used with the working vehicle, if control corresponding to the attachment attached to the working vehicle is not performed by the working vehicle, an error may occur and work using the attachment may not be performed appropriately.

SUMMARY OF THE INVENTION

One or more example embodiments of the present invention make it possible to appropriately use attachments attached to working vehicles.

A working vehicle according to an example embodiment of the present invention includes a hitch to attach and detach an attachment thereto and therefrom, a first interface to receive input of a piece of first attachment information relating to the attachment attached to the hitch, a second interface to connect thereto at least one accessory electronic device provided in or on the attachment attached to the hitch, a bus, a controller connected to the bus, and a gateway connected to the bus, wherein the gateway is connected to the second interface without the bus between the gateway and the second interface, and is configured or programmed to, if an external signal inputted thereto from the second interface does not agree with the attachment corresponding to the piece of first attachment information inputted thereto via the first interface, not output the external signal to the bus, and, if the external signal agrees with the attachment corresponding to the piece of first attachment information, output the external signal to the bus, and the controller is configured or programmed to perform control corresponding to the external signal inputted thereto via the bus.

In a working vehicle according to an example embodiment of the present invention, the controller may be configured or programmed to perform the control corresponding to the external signal after starting a predetermined process based on the piece of first attachment information.

According to an example embodiment of the present invention, the working vehicle may further include a first operation switch to be operated to attach the attachment to the hitch. The gateway may be configured or programmed to output, to the bus, the external signal which agrees with the attachment corresponding to the piece of first attachment information after the first operation switch is operated.

According to an example embodiment of the present invention, the working vehicle may further include a second operation switch to be operated to allow the attachment to be detached from the hitch. The gateway may be configured or programmed to not output the external signal to the bus after the second operation switch is operated.

In a working vehicle according to an example embodiment of the present invention, the gateway may be configured or programmed to determine whether or not the external signal agrees with the attachment corresponding to the piece of first attachment information.

In a working vehicle according to an example embodiment of the present invention, the gateway may be configured or programmed to determine whether or not the external signal agrees with the attachment corresponding to the piece of first attachment information based on information relating to the at least one accessory electronic device that is indicated by the external signal and based on information relating to the at least one accessory electronic device provided in or on the attachment that is included in the piece of first attachment information.

According to an example embodiment of the present invention, the working vehicle may further include a memory from which information is readable by the controller. The memory may store a plurality of pieces of second attachment information for a respective plurality of the attachments attachable to the hitch, the plurality of pieces of second attachment information each including at least one of (i) more types of information relating to the attachment than in the piece of first attachment information or (ii) information relating to the at least one accessory electronic device provided in or on the attachment. The external signal may indicate at least one of (a) information relating to the at least one accessory electronic device from which the external signal is outputted or (b) information relating to the attachment in or on which the at least one accessory electronic device is provided. The controller may be configured or programmed to output, to the bus, at least one of the piece of first attachment information or a piece of second attachment information that corresponds to the piece of first attachment information. The gateway may be configured or programmed to determine whether or not the external signal agrees with the attachment corresponding to the piece of first attachment information based on the at least one of the piece of first attachment information or the piece of second attachment information inputted thereto via the bus from the controller and based on the at least one of the information (a) or the information (b) indicated by the external signal.

In a working vehicle according to an example embodiment of the present invention, the first interface may include a receiver to receive a wireless signal which is transmitted periodically from a transmitter in or on the attachment and which is compliant with a near field communication standard. The controller may be configured or programmed to select one of one or more of the pieces of first attachment information indicated by one or more of the wireless signals received by the receiver that satisfies a predetermined condition, and output, to the bus, at least one of (i) the selected piece of first attachment information or (ii) a piece of second attachment information relating to the attachment that is generated or read from a memory based on the selected piece of first attachment information. The gateway may be configured or programmed to determine, based on the at least one of the piece of first attachment information or the piece of second attachment information inputted thereto from the controller via the bus, whether or not the external signal agrees with the attachment corresponding to the inputted piece of first attachment information.

In a working vehicle according to an example embodiment of the present invention, the gateway may be configured or programmed to not output the external signal to the bus if the external signal is inputted thereto but no first attachment information is inputted thereto.

According to an example embodiment of the present invention, the working vehicle may further include a user interface to output an alert when the external signal does not agree with the attachment corresponding to the piece of first attachment information.

In a working vehicle according to an example embodiment of the present invention, the first interface may include a user interface to receive input of the piece of first attachment information from a user.

In a working vehicle according to an example embodiment of the present invention, the controller may be configured or programmed to output, to the bus, at least one of (i) the piece of first attachment information inputted thereto via the user interface or (ii) a piece of second attachment information generated or read from a memory based on the inputted piece of first attachment information, the piece of second attachment information relating to the attachment corresponding to the piece of first attachment information. The gateway may be configured or programmed to determine, based on the inputted at least one of the piece of first attachment information or the piece of second attachment information inputted thereto from the controller via the bus, whether or not the external signal agrees with the attachment corresponding to the inputted piece of first attachment information.

In a working vehicle according to an example embodiment of the present invention, the controller or an information processor included in the working vehicle may be configured or programmed to determine whether or not the external signal agrees with the attachment corresponding to the piece of attachment information and output information indicating a result of determining to the gateway.

In a working vehicle according to an example embodiment of the present invention, the external signal may indicate information which includes (i) at least one of identification information of the at least one accessory electronic device from which the external signal is outputted or identification information of the attachment in or on which the at least one accessory electronic device is provided and (ii) state information indicating a state of the attachment. The gateway may be configured or programmed to input the identification information indicated by the external signal into the controller or the information processor. The controller or the information processor may be configured or programmed to determine whether or not the external signal agrees with the attachment corresponding to the piece of first attachment information based on the identification information inputted thereto from the gateway and based on at least one of identification information of the attachment corresponding to the piece of first attachment information or identification information of the at least one accessory electronic device provided in or on the attachment. The gateway may be configured or programmed to, upon receipt of input of information indicating that the external signal agrees with the attachment corresponding to the piece of first attachment information from the controller or the information processor, output at least the state information indicated by the external signal to the bus.

In a working vehicle according to an example embodiment of the present invention, the second interface may include a connector to connect thereto an electric harness connected to the at least one accessory electronic device.

According to an example embodiment of the present invention, the working vehicle may further include a traveling device to allow a vehicle body to travel, and a working device provided on the vehicle body and having the hitch linked thereto. The at least one accessory electronic device may include at least one sensor to detect at least one of a position, posture, or action of the attachment in or on which the at least one accessory electronic device is provided. The controller may be configured or programmed to control at least one of the traveling device or the working device based on a detection signal from the at least one sensor, the detection signal being the external signal which agrees with the attachment corresponding to the piece of first attachment information.

According to an example embodiment of the present invention, the working vehicle may further include a power outlet port to allow power to be outputted to the attachment attached to the hitch. The controller may be configured or programmed to allow power to be outputted via the power outlet port to the attachment based on the external signal which agrees with the attachment corresponding to the piece of first attachment information.

In a working vehicle according to an example embodiment of the present invention, the at least one accessory electronic device may include at least one sensor to detect an operating state of an actuator in or on the attachment in or on which the at least one accessory electronic device is provided. The controller may be configured or programmed to control output of power to the attachment based on a detection signal from the at least one sensor, the detection signal being the external signal which agrees with the attachment corresponding to the piece of first attachment information.

According to an example embodiment of the present invention, the working vehicle may further include a user interface. The controller may be configured or programmed to cause the user interface to output information based on the external signal which agrees with the attachment corresponding to the piece of first attachment information.

According to an example embodiment of the present invention, the working vehicle may further include at least one in-vehicle electronic device connected to the bus. The gateway may be configured or programmed to, if the external signal does not agree with the attachment corresponding to the piece of first attachment information, not output, via the second interface, an output signal outputted from at least one of the controller or the at least one in-vehicle electronic device to the bus, and, if the external signal agrees with the attachment corresponding to the piece of first attachment information, output the output signal via the second interface.

A working vehicle according to an example embodiment of the present invention includes a hitch to attach and detach an attachment thereto and therefrom, a first interface to receive input of a piece of first attachment information relating to the attachment attached to the hitch, a second interface to connect thereto at least one accessory electronic device provided in or on the attachment attached to the hitch, a bus, a controller and a gateway which are connected to the bus, wherein the gateway is connected to the second interface without the bus between the gateway and the second interface and is configured or programmed to output an external signal inputted thereto from the second interface to the bus, and the controller is configured or programmed to, if the external signal does not agree with the attachment corresponding to the piece of first attachment information inputted thereto via the first interface, not perform control corresponding to the external signal, and, if the external signal agrees with the attachment corresponding to the piece of first attachment information, perform control corresponding to the external signal.

In a working vehicle according to an example embodiment of the present invention, the receiver may be connected to the bus and be configured or programmed to output, to the bus, a piece of first attachment information indicated by the wireless signal received from the transmitter and reception information relating to a reception condition of the wireless signal which are associated with each other. The controller may be configured or programmed to select one of the one or more pieces of first attachment information that satisfies the predetermined condition based on the piece of first attachment information and the reception information inputted thereto via the bus.

According to an example embodiment of the present invention, the working vehicle may further include a communication controller connected to the bus and configured or programmed to transmit, to an external computer in a wireless manner, the at least one of the piece of first attachment information or the piece of second attachment information inputted thereto from the controller via the bus.

According to an example embodiment of the present invention, the working vehicle may further include at least one in-vehicle electronic device connected to the bus. The controller may be configured or programmed to acquire, via the bus, a piece of third attachment information relating to the attachment corresponding to the piece of first attachment information from at least one of the at least one in-vehicle electronic device or the at least one accessory electronic device, and output the acquired piece of third attachment information to the bus. The communication controller may be configured or programmed to transmit, to the external computer, the piece of third attachment information inputted thereto from the controller via the bus.

According to an example embodiment of the present invention, the working vehicle may further include a first operation switch to be operated to attach the attachment to the hitch. The controller may be configured or programmed to, when the first operation switch is operated, select the piece of first attachment information and output, to the bus, securing-of-attachment information indicating that the attachment is attached to the hitch. The communication controller may be configured or programmed to transmit, to the external computer, the securing-of-attachment information inputted thereto via the bus.

According to an example embodiment of the present invention, the working vehicle may further include a second operation switch to be operated to allow the attachment to be detached from the hitch. The controller may be configured or programmed to, when the second operation switch is operated with the attachment attached to the hitch, output, to the bus, detaching-of-attachment information indicating that the attachment is allowed to be detached from the hitch. The communication controller may be configured or programmed to transmit, to the external computer, the detaching-of-attachment information inputted thereto via the bus.

An attachment usage system according to an example embodiment of the present invention includes the working vehicle to perform work using the attachment.

According to an example embodiment of the present invention, the attachment usage system may further include a transmitter in or on the attachment to periodically transmit a wireless signal compliant with a near field communication standard. The first interface may include a receiver to receive one or more of the wireless signals transmitted from one or more of the transmitters. The controller may be configured or programmed to select one of one or more of the pieces of first attachment information indicated by the one or more wireless signals received by the receiver that satisfies a predetermined condition, and output, to the bus, at least one of (i) the selected piece of first attachment information or (ii) a piece of second attachment information relating to the attachment that is generated or read from a memory based on the selected piece of first attachment information. The gateway may be configured or programmed to determine whether or not the external signal agrees with the attachment corresponding to the piece of first attachment information based on the at least one of the piece of first attachment information or the piece of second attachment information inputted thereto from the controller via the bus. The working vehicle may further include a communication controller connected to the bus and configured or programmed to transmit, to an external computer in a wireless manner, the at least one of the piece of first attachment information or the piece of second attachment information inputted thereto via the bus.

In a working vehicle according to an example embodiment of the present invention, the first interface may include a receiver to receive a wireless signal which is transmitted periodically from a transmitter in or on the attachment and which is compliant with a near field communication standard. The controller may be configured or programmed to select one of one or more of the pieces of first attachment information indicated by one or more of the wireless signals received by the receiver that satisfies a predetermined condition, and start the predetermined process based on source information included in the selected piece of first attachment information and relating to a signal source, the signal source being at least one of the transmitter or the attachment, the predetermined process including performing a predetermined control and outputting predetermined information relating to a state of the signal source, and, during a period from when the controller starts performing the predetermined control and outputting the predetermined information to when the attachment is allowed to be detached from the hitch, if another source information is acquired via the receiver within a predetermined period of time from the previous acquisition, continue performing the predetermined control and outputting the predetermined information, and, if no other source information is acquired within the predetermined period of time from the previous acquisition, continue performing the predetermined control and stop outputting the predetermined information.

In a working vehicle according to an example embodiment of the present invention, the controller may be configured or programmed to output error information if the controller acquires no other source information within the predetermined period of time.

In a working vehicle according to an example embodiment of the present invention, the controller may be configured or programmed to cause a user interface to output the predetermined information, and, based on the another source information acquired within the predetermined period of time, update the predetermined information which is being outputted by the user interface.

In a working vehicle according to an example embodiment of the present invention, the controller may be configured or programmed to, if the another source information acquired within the predetermined period of time indicates the same signal source as the source information included in the selected piece of first attachment information, update, based on the another source information acquired within the predetermined period of time, the predetermined information which is being outputted by the user interface.

In a working vehicle according to an example embodiment of the present invention, the controller may be configured or programmed to, if another source information is acquired after passage of the predetermined period of time and before the attachment is allowed to be detached, resume outputting the predetermined information based on the acquired another source information.

In a working vehicle according to an example embodiment of the present invention, the controller may be configured or programmed to cause a user interface to output the predetermined information, and, if another source information is acquired after passage of the predetermined period of time and before the attachment is allowed to be detached and the acquired another source information indicates the same signal source as the source information included in the selected piece of first attachment information, cause the user interface to resume outputting the predetermined information based on the acquired another source information.

In a working vehicle according to an example embodiment of the present invention, the receiver and the controller may be electrically connected to each other in a wired manner. The controller may be configured or programmed to, if no signal is inputted from the receiver during a period from when the attachment is attached to the hitch to when the attachment is allowed to be detached from the hitch, continue performing the predetermined control, stop outputting the predetermined information, and output error information indicating a connection error of the receiver.

In a working vehicle according to an example embodiment of the present invention, the controller may be configured or programmed to output the predetermined information based on the source information, the outputting of the predetermined information including causing a user interface to display at least one of an operating time of the signal source or a remaining charge level of a battery of the transmitter each of which is included in the source information, and causing the user interface to display attached information indicating that the attachment corresponding to the source information is attached, and, during a period from when the predetermined information starts to be outputted to when the attachment is allowed to be detached from the hitch, if no other source information is acquired within the predetermined period of time, cause the user interface to continue displaying the attached information and stop displaying the operating time and the remaining charge level.

In a working vehicle according to an example embodiment of the present invention, the controller may be configured or programmed to finish performing the predetermined control and outputting the predetermined information when the attachment is allowed to be detached from the hitch.

According to an example embodiment of the present invention, the working vehicle may further include a first operation switch to be operated to attach the attachment to the hitch, and a second operation switch to be operated to allow the attachment to be detached from the hitch. The controller may be configured or programmed to determine whether or not the attachment is attached to the hitch based on an operation state of the first operation switch, and determine whether or not the attachment is allowed to be detached from the hitch based on an operation state of the second operation switch.

In a working vehicle according to an example embodiment of the present invention, the controller may be configured or programmed to cause a memory to store, for a period of time, one or more received signal strengths of the one or more wireless signals received by the receiver and the one or more pieces of first attachment information indicated by the one or more wireless signals such that the one or more received signal strengths and the one or more pieces of first attachment information are associated with each other, and, when the attachment is attached to the hitch, select one of the one or more pieces of first attachment information stored in the memory that satisfies the predetermined condition relating to at least one of a received signal strength or first attachment information.

In a working vehicle according to an example embodiment of the present invention, the receiver and the controller may be electrically connected to each other in a wired manner. The controller may be configured or programmed to, when the attachment is attached to the hitch, if the memory stores no first attachment information, cause a user interface to output information requesting input of a piece of first attachment information, and, upon receipt of input of the piece of first attachment information via the user interface, start performing the predetermined control corresponding to the inputted piece of first attachment information and outputting the predetermined information corresponding to the inputted piece of first attachment information.

An attachment usage system according to an example embodiment of the present invention includes a working vehicle to perform work using an attachment, wherein the working vehicle includes a hitch to attach and detach the attachment thereto and therefrom, a receiver to receive a wireless signal which is transmitted periodically from a transmitter in or on the attachment and which is compliant with a near field communication standard, and a controller configured or programmed to acquire source information relating to a signal source which is at least one of the transmitter or the attachment indicated by the wireless signal received by the receiver, the controller is configured or programmed to, after the attachment is attached to the hitch, start performing a predetermined control for the attachment to perform work and outputting predetermined information relating to a state of the signal source based on the source information, and before the attachment is allowed to be detached from the hitch, if another source information is acquired via the receiver within a predetermined period of time from the previous acquisition, continue performing the predetermined control and outputting the predetermined information, and, if no other source information is acquired within the predetermined period of time, continue performing the predetermined control and stop outputting the predetermined information.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

FIG. 2 is a diagram showing an example of information indicated by an advertisement signal.

FIG. 3 is a diagram showing advertisement information stored in a memory.

FIG. 5 illustrates an example of attachment IDs and corresponding data.

FIG. 8 is a screen showing an example of an attachment list.

DETAILED DESCRIPTION OF THE EXAMPLE EMBODIMENTS

Figure 1:
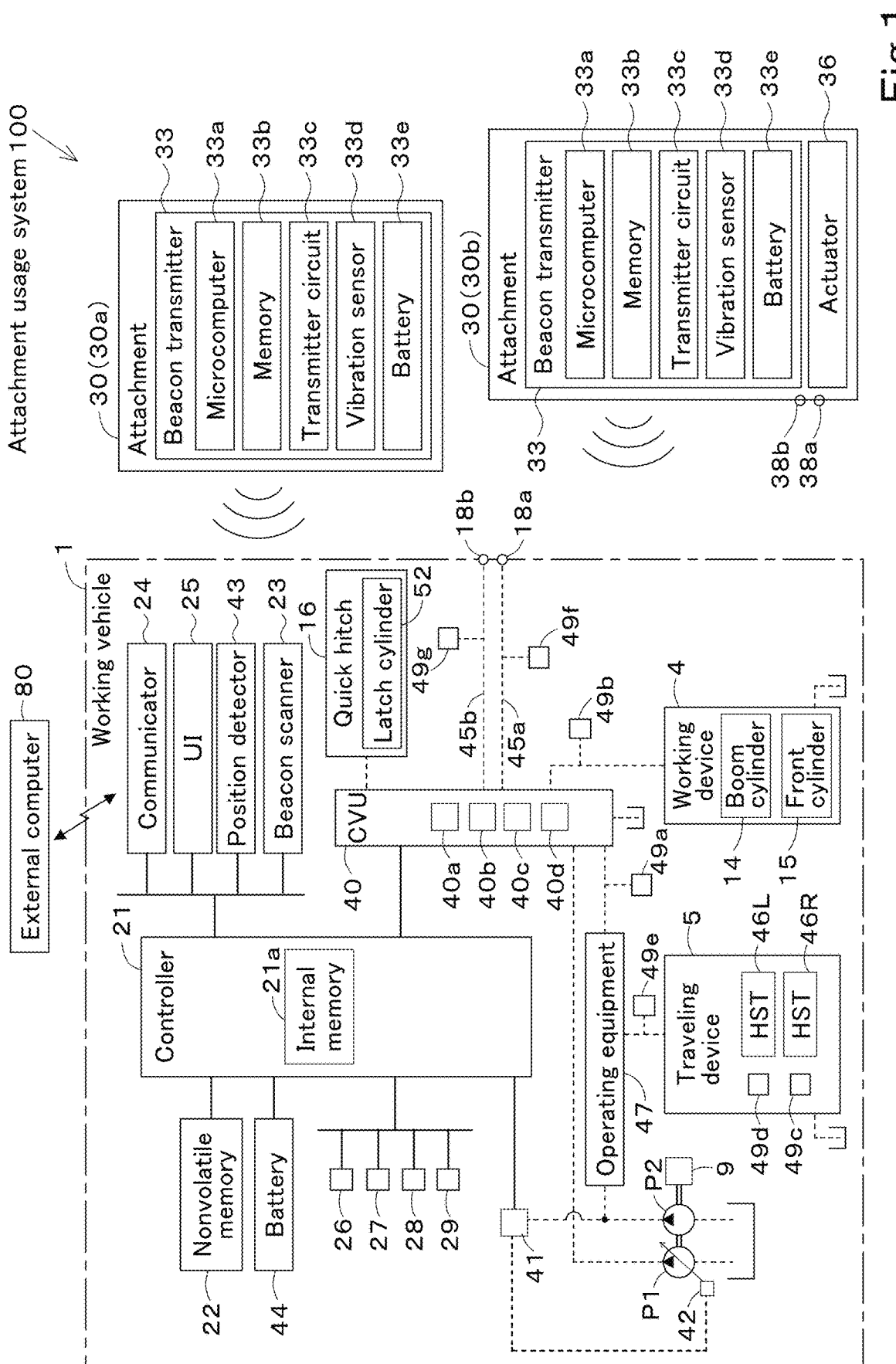
FIG. 1 is a block diagram of an attachment usage system and a working vehicle.

Example embodiments will now be described with reference to the accompanying drawings, wherein like reference numerals designate corresponding or identical elements throughout the various drawings. The drawings are to be viewed in an orientation in which the reference numerals are viewed correctly.

Figure 15:
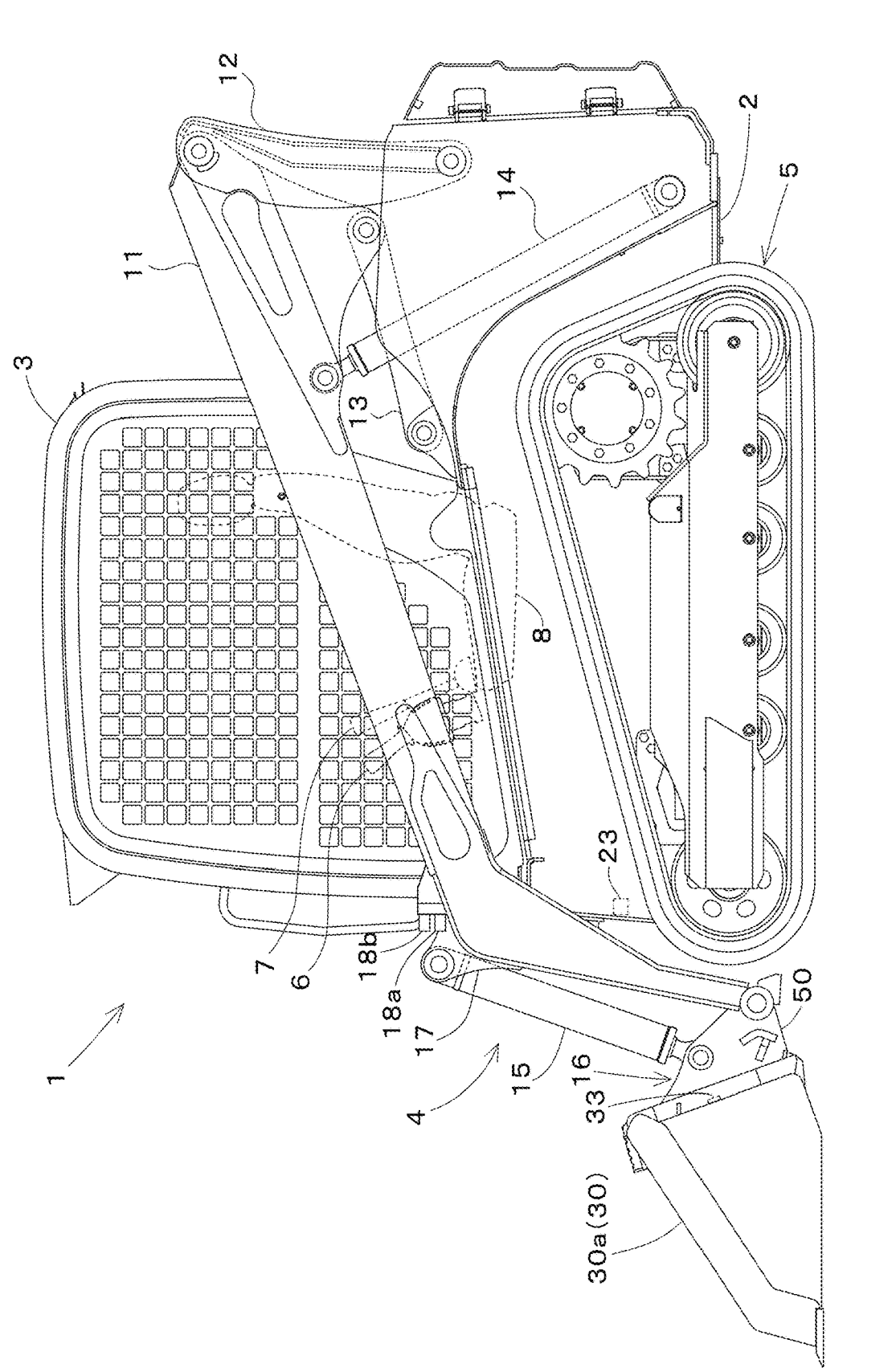
FIG. 15 is a side view of a working vehicle.

FIG. 15 is a side view of a working vehicle 1 according to the present example embodiment. In the present example embodiment, a compact track loader is discussed as an example of the working vehicle 1. Note, however, that the working vehicle according to an example embodiment of the present invention is not limited to a compact track loader, and may be, for example, some other construction machine or agricultural machine such as a skid-steer loader, a backhoe, or a tractor.

The working vehicle 1 includes a vehicle body 2, a cabin 3, a working device 4, and traveling device(s) 5. The cabin 3 is provided on the vehicle body 2. The cabin 3 includes a seat 8, operators (manual operators) to be operated by a user seated on the seat 8, and/or the like. The manual operators include a travel operator 6 to be operated to actuate the traveling devices 5 and a work operator 7 to be operated to actuate the working device 4.

The traveling devices 5 are provided on the left and right sides of the vehicle body 2, support the vehicle body 2, and cause the vehicle body 2 to travel. The traveling devices 5 are crawler traveling devices. The user operates the travel operator 6 to cause both the left and right traveling devices (the traveling device on the left side and the traveling device on the right side) 5 to rotate in a forward direction, both the left and right traveling devices 5 to rotate in a reverse direction, only one of the left and right traveling devices 5 to rotate in the forward direction, or one of the left and right traveling devices 5 to rotate in the forward direction and the other to rotate in the reverse direction to cause the vehicle body 2 (working vehicle 1) to travel forward, rearward, or turn left or right. The travel operator 6 can be operated in operation states corresponding to forward travel, rearward travel, left turn, right turn, and stop of the traveling devices 5.

The working device 4 is attached to the vehicle body 2. The working device 4 includes a bucket 30a, boom(s) 11, lift link(s) 12, control link(s) 13, boom cylinder(s) 14, front cylinder(s) 15, and a quick hitch 16. The booms 11, the lift links 12, the control links 13, the boom cylinders 14, and the front cylinders 15 are provided at the left and right of the cabin 3. The left and right booms 11 are connected to each other by a connector 17 at an intermediate portion of their front portion. The left boom 11 has, at the front portion thereof, a pair of AUX couplers 18a and 18b for introduction and discharge of hydraulic fluid.

The lift links 12 and the control links 13 support proximal portions (rear portions) of the booms 11 via shafts such that the booms 11 are swingable up and down. The boom cylinders 14 each have one end thereof pivotally connected to a corresponding one of the booms 11 via a shaft and the other end thereof pivotally connected to a lower rear portion of the vehicle body 2 via a shaft. Upon operation of the work operator 7 along a first direction by the user of the working vehicle 1, the boom cylinders 14 extend or retract and the booms 11 ascend or descend (swing upward or downward).

The booms 11 are provided with the quick hitch 16 at the distal ends thereof. The quick hitch 16 is a linkage configured to easily attach and detach any of various attachments 30 such as the bucket 30a. An attachment 30 is a working tool to perform work. The user of the working vehicle 1 can easily change attachments 30 using the quick hitch 16. The quick hitch 16 is therefore also called "quick changer". In the example shown in FIG. 15, the bucket 30a which is an example of the attachment 30 is attached to a front portion of the quick hitch 16.

The quick hitch 16 has, connected to a rear portion thereof, the distal ends of the booms 11 and ends of the front cylinders 15 via respective shafts such that the booms 11 and the front cylinders 15 are pivotable. The opposite ends of the front cylinders 15 are pivotally connected to the connector 17 via shafts. Upon operation of the work operator 7 along a second direction, the front cylinders 15 extend or retract and the quick hitch 16 swings upward or downward. With this, the bucket 30a attached to the quick hitch 16, swinging upward or downward, performs shoveling or dumping. That is, the working device 4 is operable to change at least one of the position or the posture of the attachment 30 attached to the quick hitch 16 to cause the attachment 30 to perform work.

Figure 16:
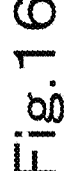
FIG. 16 is an elevational view of a quick hitch.
Figure 17A:
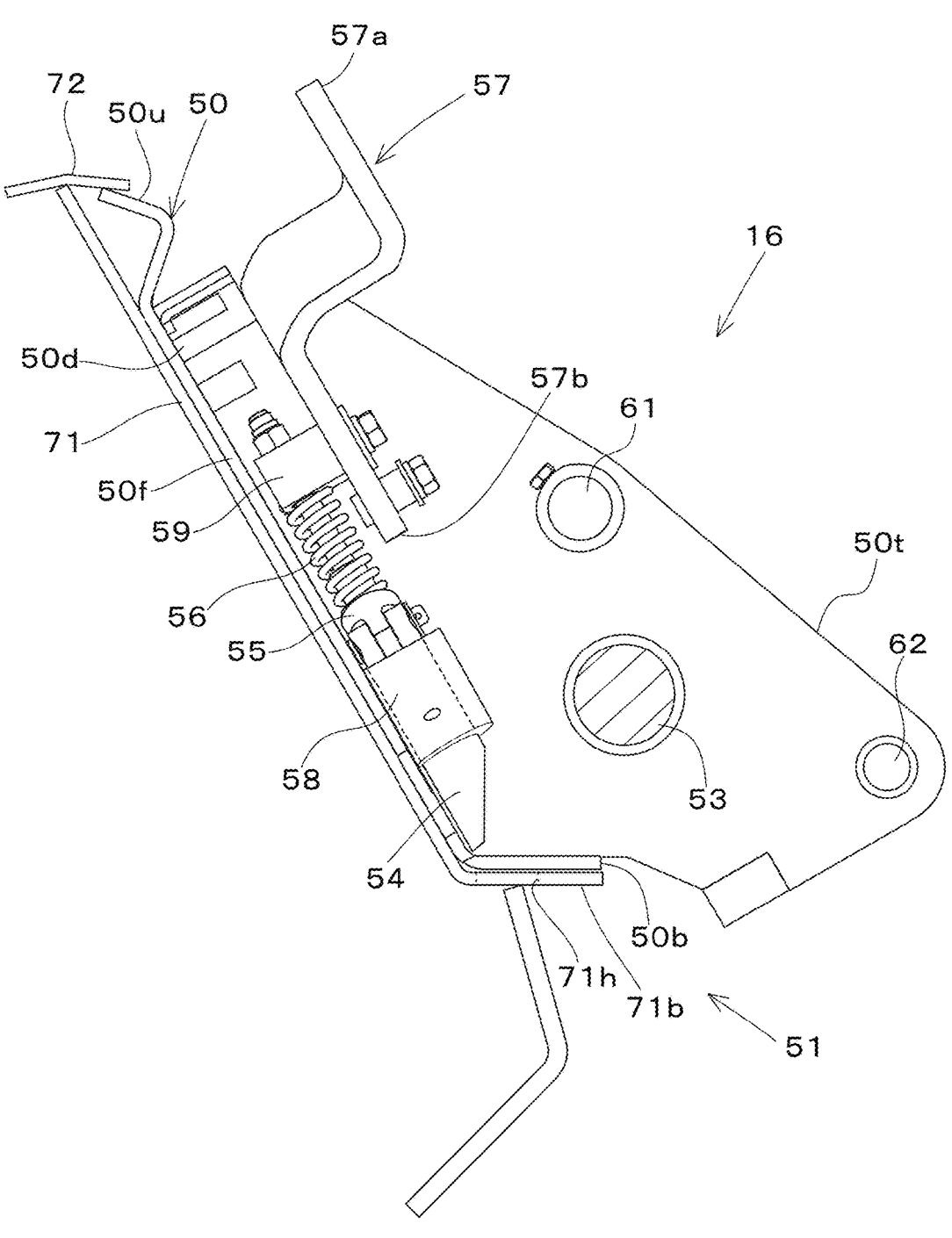
FIG. 17A is a side view of an attachment unlatched by a quick hitch.
Figure 17B:
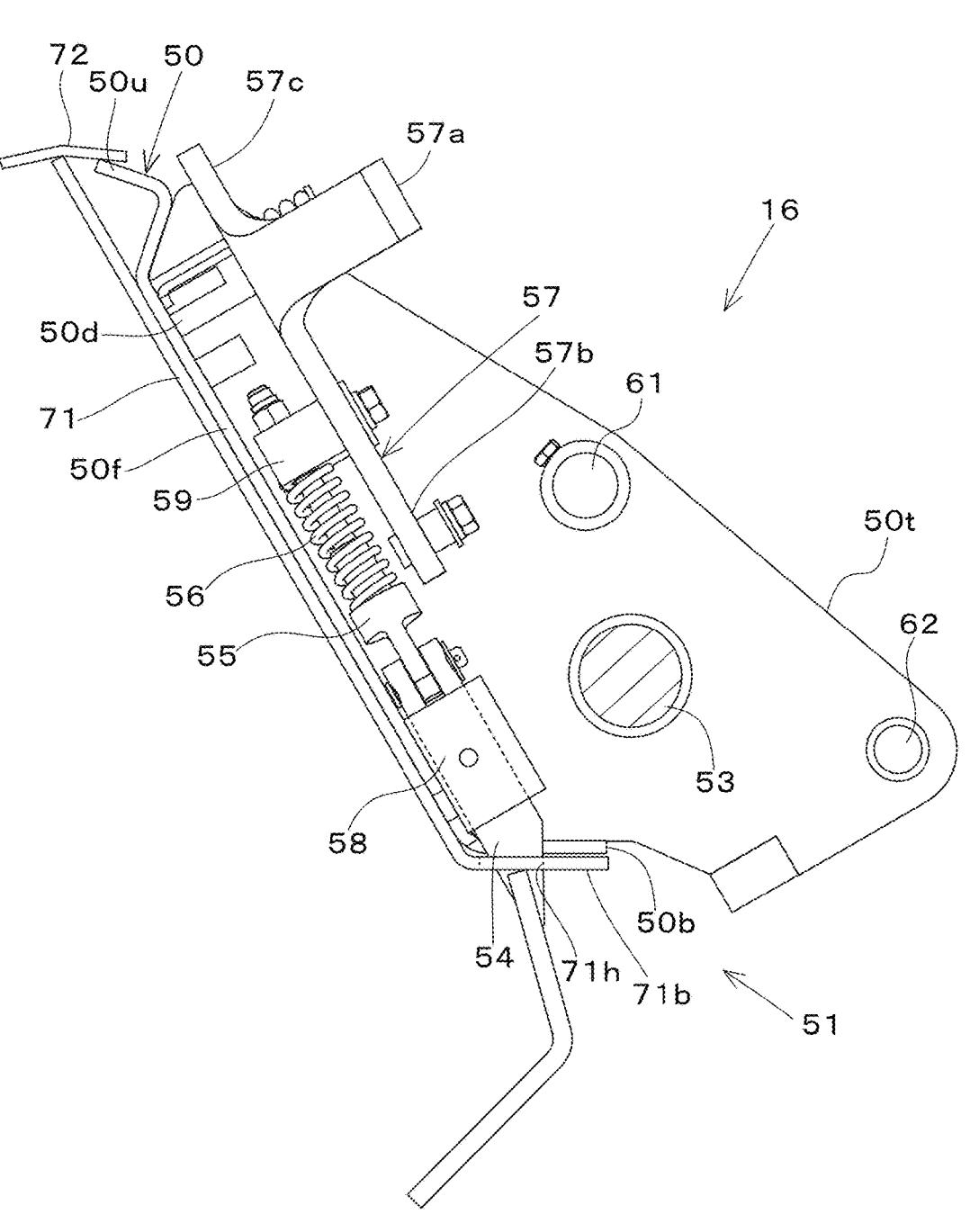
FIG. 17B is a side view of an attachment latched by a quick hitch.

FIG. 16 is an elevational view of the quick hitch 16. Specifically, FIG. 16 illustrates the quick hitch 16 in FIG. 15 as viewed from the vehicle body 2 of the working vehicle 1. FIG. 17A is a side view of an attachment 30 unlatched by the quick hitch 16. FIG. 17B is a side view of the attachment 30 latched by the quick hitch 16.

The quick hitch 16 includes a pair of left and right brackets 50, a pair of left and right latching mechanisms 51, a latch cylinder 52, and the like. The brackets 50 hold the attachment 30. The latching mechanisms 51 are selectively operable in a latching state in which the attachment 30 is secured to the brackets 50 (quick hitch 16) or an unlatching state in which the attachment 30 is not secured (released state) and is allowed to be detached from the brackets 50. The latch cylinder 52 is a latch actuator to place (actuate) the latching mechanisms 51 selectively in the latching state or the unlatching state.

As illustrated in FIG. 17A, each of the brackets 50 includes a front plate 50f and a pair of connector plates 50t projecting rearward from the front plate 50f. The connector plates 50t have pivotally connected thereto the distal ends of the left and right booms 11 (FIG. 15) via shafts 61, and have pivotally connected thereto ends of the left and right front cylinders 15 (FIG. 15) via shafts 62. The connector plates 50t are connected to a beam 53, so that the pair of brackets 50 are combined.

The front plate 50f of each of the brackets 50 includes an upper portion 50u bent in the form of the letter V as illustrated in FIG. 17A. The front plate 50f includes a lower portion 50b bent such that the lower portion 50b projects diagonally rearward. A top plate 72 bent downward is provided above a base plate 71 of the attachment 30. The base plate 71 includes a lower portion 71b bent such that the lower portion 71b projects diagonally rearward. The lower portion 71b of the base plate 71 has a through-hole 71h.

The upper portions 50u of the front plates 50f of the brackets 50 are inserted into the gap between the base plate 71 and the top plate 72 of the attachment 30 and engage with the back surface of the top plate 72, the front surfaces of the front plates 50f engage with the base plate 71, and the lower portions 50b of the front plates 50f engage with the lower portion 71b of the base plate 71. With this, the attachment 30 is held by the brackets 50.

The latching mechanisms 51 are located inward of the connector plates 50t of the brackets 50 in FIG. 16. Each of the latching mechanisms 51 includes, as illustrated in FIG. 17A, a latch pin 54, a link 55, a coil spring 56, a latch lever 57, and the like. The latch pin 54 is held by a housing 58 fixed to a corresponding bracket 50 such that the latch pin 54 is movable up and down. The latch pin 54 includes a lower portion projecting downward from the housing 58, and the lower portion has an inclined surface sloping diagonally forward and downward. The latch pin 54 includes an upper portion rotatably connected to a lower end portion of the link 55 via pin(s). The link 55 is inserted in the coil spring 56. The link 55 includes an upper end portion projecting from the coil spring 56, and the upper end portion is held by a holder 59.

Each latch lever 57 is substantially in the form of the letter L as illustrated in FIG. 16. The latch lever 57 includes a bent intermediate portion which is rotatably connected to a mount 50d on a corresponding bracket 50 via pin(s) as illustrated in FIG. 17A. The latch lever 57 includes a first projecting portion 57a which projects inward from corresponding connector plates 50t as illustrated in FIG. 16. The latch lever 57 includes a second projecting portion 57b projecting downward. The second projecting portion 57b has, connected to a back surface of a central portion thereof, the holder 59 via pin(s) as illustrated in FIG. 17A. The latch lever 57 includes a third projecting portion 57c which projects upward as illustrated in FIG. 16.

The latch cylinder 52 is a hydraulic cylinder which is positioned laterally and located above the beam 53. The latch cylinder 52 has a first end (distal end of the rod) pivotally connected to the distal end portion of the second projecting portion 57b of one of the latch levers 57 (right latch lever 57 in FIG. 16) via pin(s). The latch cylinder 52 has a second end (bottom of the cylinder case) pivotally connected to the distal end portion of the second projecting portion 57b of the other of the latch levers 57 (the left latch lever 57 in FIG. 16) via pin(s).

The retraction of the latch cylinder 52, as indicated by dot-dot-dash lines in FIG. 16, causes the second projecting portions 57b of the left and right latch levers 57 to approach each other, causing the latch levers 57 to pivot upward. Then, as illustrated in FIG. 16A, the links 55 and the latch pins 54 move upward and the latch pins 54 detach from the through-holes 71h in the base plate 71 of the attachment 30. With this, the latching mechanisms 51 are placed in their unlatching state (also referred to as "unlock state") in which the latching mechanisms 51 do not hold the attachment 30, allowing the attachment 30 to be detached from the quick hitch 16. The third projecting portions 57*c* of the latch levers 57 contact corresponding connector plates 50*t* of the brackets 50, so that the degree of retraction of the latch cylinder 52, the angle of upward rotation of the latch levers 57, and the degree of upward movement of the latch pins 54 are restricted.

Upon the extension of the latch cylinder 52 as indicated by solid lines in FIG. 16 from the state as illustrated in FIG. 17A, the second projecting portions 57*b* of the left and right latch levers 57 are pushed to cause the latch levers 57 to pivot downward. Upon such pivoting, the holders 59 cause the links 55 and the latch pins 54 to move downward and compress the coil springs 56. Then, as illustrated in FIG. 17B, the latch pins 54 are inserted in the through-holes 71*h* in the base plate 71 of the attachment 30, so that the inclined surfaces of the latch pins 54 contact the side walls of the through-holes 71*h*.

With this, the latching mechanisms 51 are placed in their latching state (also referred to as "lock state") in which the latching mechanisms 51 hold the attachment 30, and the attachment 30 is attached to the quick hitch 16. The second projecting portions 57*b* of the latch levers 57 contact corresponding connector plates 50*t* of the brackets 50, so that the degree of extension of the latch cylinder 52, the angle of downward rotation of the latch levers 57, and the degree of downward movement of the latch pins 54 are restricted. It is noted here that the spring back force of the coil springs 56 holds the latch levers 57 in position. Since the first projecting portions 57*a* of the latch levers 57 are positioned horizontally, the user seated on the seat 8 of the working vehicle 1 confirms that the attachment 30 is attached to the quick hitch 16 (working vehicle 1) by looking at the horizontally positioned first projecting portions 57*a*.

Starting from the state as illustrated in FIG. 15 in which the bucket 30*a* is attached to the quick hitch 16, the bucket 30*a* is detached and another attachment 30 is attached to the quick hitch 16. This makes it possible to perform work other than excavation (or some other excavation work) using the other attachment 30.

Examples of attachments 30 other than the bucket 30*a* include pallet forks, skid cutters, crushers, breakers, angle brooms, earth augers, grapple, sweepers, mowers, snow blowers, and spreaders. Attachments 30 of each type may have different specifications such as sizes and/or shapes. In the present example embodiment, a hydraulic-driven attachment 30 is used, but an electric attachment may be used instead.

FIG. 1 is a block diagram of an attachment usage system 100 and the working vehicle 1 according to the present example embodiment. The attachment usage system 100 includes the working vehicle(s) 1 and attachment(s) 30. The example in FIG. 1 includes one working vehicle 1 and two attachments 30, but the number of working vehicles 1 and the number of attachments 30 included in the attachment usage system 100 may be selected appropriately.

The working vehicle 1 includes a controller 21, a nonvolatile memory 22, a beacon scanner 23, a communication controller 24, a user interface (indicated as "UI" in FIG. 1) 25, a position detector 43, a battery 44, switches (each indicated as "SW" in FIGS. 1) 26 to 29, and/or the like.

The controller 21 may include, for example, an information processor circuit including processor(s) and memory (memories). Specifically, the controller 21 may include a computer. The controller 21 is configured or programmed to control the working vehicle 1, and perform various controls relating to the working vehicle 1. The controller 21 is communicably connected to devices in or on the working vehicle 1 via an in-vehicle network such as CAN, ISOBUS, LIN, and/or FlexRay.

Examples of the processor(s) of the controller 21 include central processing unit (CPU), graphics processing unit (GPU), digital signal processor (DSP), field programmable gate array (FPGA), and application specific integrated circuit (ASIC).

Note that the controller 21 may include a plurality of physically separated processors which operate together to perform various processes, and the configuration thereof is not limited to those mentioned above. In such a case, the plurality of processors are provided in one or more computers physically separated from the working vehicle 1, and are communicably connected together via an in-vehicle network and/or an external network such as LAN, WAN, and/or the Internet.

The controller 21 includes an internal memory 21*a* (first memory) which is a volatile memory or a nonvolatile memory. The controller 21 may, for example, use a predetermined storage area of the internal memory 21*a* which is a volatile memory as a buffer for temporary storage of information and data.

The one or more nonvolatile memories 22 (second memory, third memory) are one or more storing devices provided externally to the controller 21. The internal memory 21*a* and the nonvolatile memory 22 store software program(s) and control data for the controller 21 to control operation of the elements. The nonvolatile memory 22 stores pieces of data for control and data for display corresponding to various attachments 30.

The software program(s) may be stored in recording medium (media) (nonvolatile memory such as HDD, SSD, CD-ROM, DVD-ROM) communicably connected to the controller 21 and/or in an external computer 80 connected to the controller 21 via an external network, and may be installed from the recording medium (media) and/or the external computer 80 onto the internal memory 21*a* and/or the nonvolatile memory 22. The same applies to the foregoing data for control and data for display.

The beacon scanner 23 is a receiver to receive wireless signals (beacon signals) compliant with Bluetooth (registered trademark) Low Energy which is a near field communication standard. The beacon scanner 23 includes processor(s) such as CPU, one or more memories, measuring circuit(s) to measure the received signal strength indicator (RSSI, received signal strength) of the received wireless signals, and/or the like.

The communication controller 24 includes an electric circuit (communication interface) for communication via at least one of wireless LAN, near field communication, the Internet, or the like. The electric circuit includes processor(s) such as CPU, one or more memories, and/or the like. The communication controller 24 communicates with an external computer 80 provided externally to the working vehicle 1 in a wireless manner. The external computer 80 is, for example, a mobile terminal device, a server, a device (computer, server, terminal device) included in a cloud system, and/or the like. The mobile terminal device is, for example, a smartphone, a tablet computer, and/or the like. The external computer 80 is included in the attachment usage system 100.

The user interface 25 includes an input and an output of the working vehicle 1, and includes, for example, a touchscreen (touch panel) including a display, a terminal device, and/or the like. For another example, the user interface 25 may include an input and an output (display) provided independently of each other.

The position detector 43 measures the position (current position) of the working vehicle 1 (vehicle body 2) using a satellite positioning system. The position detector 43 includes a receiver to receive radio waves transmitted from satellite(s) and an inertial measurement unit (IMU) including an acceleration sensor, a gyroscope sensor, and/or the like.

The battery 44 supplies electricity to electric equipment in and/or on the working vehicle 1. The attaching switch 26, the detaching switch 27, the AUX mode switch 28, and the AUX output switch 29 are respective operation switches to be operated by the user of the working vehicle 1. The attaching switch 26 and the detaching switch 27 are momentary operation switches. The user interface 25 and the switches 26 to 29 are provided operably in the vicinity of the seat 8 in the cabin 3.

The attaching switch 26 is operated to attach (secure, fasten) the attachment 30 to the quick hitch 16. The detaching switch 27 is operated to allow the attachment 30 to be detached from the quick hitch 16 (to unfasten the attachment 30 from the quick hitch 16). The AUX mode switch 28 is operated to start an AUX mode in which predetermined attachment(s) 30 is/are usable. The AUX output switch 29 is operated to supply (output) hydraulic fluid as power for an actuator 36 of the attachment 30 via the AUX coupler 18a or 18b to the attachment 30.

For another example, the working vehicle 1 may include a single operation switch to selectively receive an operation to attach an attachment 30 to the quick hitch 16 or an operation to allow an attachment 30 to be detached from the quick hitch 16, instead of the attaching switch 26 and the detaching switch 27.

The working vehicle 1 includes a hydraulic circuit. The hydraulic-related features included in the hydraulic circuit include a main pump P1, a pilot pump P2, a control valve unit (indicated as "CVU" in FIG. 1) 40, a proportional valve 41, a regulator 42, sensors 49a, 49b, 49d, 49e, 49f, and 49g, hydraulic actuators 14, 15, 46L, 46R, and 52, fluid passage(s), a tank, and/or the like. The main pump P1 and the pilot pump P2 are driven by power from a prime mover 9 to deliver hydraulic fluid sucked from the tank to fluid passage(s). The prime mover 9 includes, for example, an engine. For another example, the prime mover 9 may include an electric motor.

The main pump P1 is a variable displacement hydraulic pump. The regulator 42 changes the angle of the swash plate of the main pump P1. The controller 21 controls the opening of the proportional valve 41 to apply pilot pressure, which is the hydraulic pressure of hydraulic fluid delivered by the pilot pump P2, to the regulator 42. The controller 21 then actuates the regulator 42 to change the angle of the swash plate of the main pump P1 to change the amount of hydraulic fluid delivered by the main pump P1. Operating equipment 47 includes the travel operator 6 and work operator 7, operating valves corresponding to the travel operator 6 and the work operator 7, switching valve(s), and the like.

The control valve unit 40 allows hydraulic fluid supplied from the main pump P1 through fluid passage(s) to flow to the boom cylinders 14 and the front cylinders 15 of the working device 4, the latch cylinder 52 of the quick hitch 16, and the AUX couplers 18a and 18b. The control valve unit 40 also allows hydraulic fluid that flows from the boom cylinders 14, the front cylinders 15, the latch cylinder 52, and the AUX couplers 18a and 18b (return fluid) to be drained. The control valve unit 40 controls the direction and amount of supply of hydraulic fluid to the boom cylinders 14, the front cylinders 15, and the latch cylinder 52. The control valve unit 40 also controls the amount of supply of hydraulic fluid to the AUX couplers 18a and 18b.

Specifically, the control valve unit 40 includes control valves 40a, 40b, 40c, and 40d corresponding to the boom cylinders 14, the front cylinders 15, the latch cylinder 52, and the AUX couplers 18a and 18b. Each of the control valves 40a, 40b, 40c, and 40d is switchable between a neutral position, a first position, and a second position. At least the control valves 40c and 40d, corresponding to the latch cylinder 52 and the AUX couplers 18a and 18b, of the control valves 40a, 40b, 40c, and 40d are electrically actuated solenoid valves. The control valves 40a, 40b, 40c, and 40d are normally held in the neutral position by the elastic force of a spring.

The operating equipment 47 includes the work operator 7 and work operating valves corresponding to the work operator 7. The work operating valve(s) is/are actuated according to the manner in which the work operator 7 is operated, thus allowing the pilot pressure of pilot fluid from the pilot pump P2 to act on pressure receiver(s) of the corresponding control valve(s) 40a and/or 40b via the actuated work operating valve(s). For example, the work operator 7 may be supported on the work operating valves and the work operating valves may be physically actuated by operation of the work operator 7. Additionally or alternatively, a detection sensor to detect the amount (degree) and direction of operation of the work operator 7 may be provided and the controller 21 may electrically actuate the work operating valve(s) based on the detection result from the detection sensor.

With this, the control valve(s) 40a and/or 40b is/are switched from the neutral position to the first position or the second position, so that hydraulic fluid from the main pump P1 is supplied through the control valve(s) 40a and/or 40b to the boom cylinders 14 and/or the front cylinders 15 to cause the boom cylinders 14 and/or the front cylinders 15 to extend or retract. It follows that the booms 11 and/or the attachment 30 such as the bucket 30a attached to the quick hitch 16 swing.

The pilot pressure (work operating pressure) acting on the pressure receivers of the control valves 40a and 40b from the work operating valves of the operating equipment 47 is detected by pressure sensors 49a. Although only a single pressure sensor 49a is illustrated in FIG. 1, actually pressure sensors 49a (four pressure sensors 49a) are connected to respective fluid passages (four fluid passages) to supply pilot fluid to respective pressure receivers of the control valves 40a and 40b (two pressure receivers of the control valve 40a and two pressure receivers of the control valve 40b). The controller 21 determines the operation state of the work operating valves and the work operator 7 of the operating equipment 47 based on the pilot pressure detected by the pressure sensors 49a.

For another example, detection sensor(s) such as potentiometer(s) to detect the angle of rotation of the work operator 7, etc. may be provided instead of the pressure sensors 49a. The controller 21 may determine the operation state of the work operating valves and the work operator 7 of the operating equipment 47 based on output signal(s) from the detection sensor(s). Such detection sensors and pressure sensors 49a are examples of work operation sensors to detect the operation state of the work operator 7, and the work operation sensors are not limited to those described above. In a case that the work operator 7 is an electric work operator to output an electric signal (operation signal) corresponding to the operation state such as a joystick, the controller 21 may determine the operation state of the work operator based on the electric signal.

The pressure of hydraulic fluid supplied from the control valves 40a and 40b to the boom cylinders 14 and the front cylinders 15, i.e., the supply pressure of hydraulic fluid to the boom cylinders 14 and the supply pressure of hydraulic fluid to the front cylinders 15, are detected by pressure sensors 49b. Although only a single pressure sensor 49b is illustrated in FIG. 1, actually pressure sensors 49b (two pressure sensors 49b) are connected to a fluid passage to supply hydraulic fluid from the control valve 40a to the boom cylinders 14 and a fluid passage to supply hydraulic fluid from the control valve 40b to the front cylinders 15.

The controller 21 determines the action status (acting state or stopped state) of the working device 4 (including the boom cylinders 14, booms 11, front cylinders 15, quick hitch 16, and the like) based on the supply pressure of hydraulic fluid to the boom cylinders 14 and the supply pressure of hydraulic fluid to the front cylinders 15 detected by the pressure sensors 49b. The controller 21 regards the supply pressure of hydraulic fluid to the boom cylinders 14 and the supply pressure of hydraulic fluid to the front cylinders 15 as loads on the boom cylinders 14 and the front cylinders 15, and regards the greater of the supply pressures as the load on the working device 4.

For another example, detection sensor(s) to detect the angle of rotation achieved by the boom cylinders 14 and the front cylinders 15, and vibration, acceleration, and/or the like of the boom cylinders 14 and the front cylinders 15 may be provided instead of the pressure sensors 49b. Such detection sensors and pressure sensors 49b are examples of work detection sensors to detect the action status of the boom cylinders 14 and the front cylinders 15, and the work detection sensors are not limited to those described above. In a case that the control valves 40a and 40b are solenoid valves, the controller 21 may determine the action status of the working device 4 based on the switching positions of the control valves 40a and 40b controlled by the controller 21.

The controller 21 controls the actuation of the latch cylinder 52 in response to the operation of the attaching switch 26 or the detaching switch 27 of the switches 26 to 29 connected to the controller 21. For example, while the attaching switch 26 is being operated, the controller 21 places the control valve 40c in the first position to allow hydraulic fluid from the main pump P1 to be supplied to the latch cylinder 52 in the first direction to cause the latch cylinder 52 to extend. Accordingly, the operation of the attaching switch 26 that lasts for a predetermined period of time (first period) T1 or more while the latching mechanisms 51 are in the unlatching state causes the latch cylinder 52 to extend to the predetermined degree or more, bringing the latching mechanisms 51 into the latching state.

Even if the attaching switch 26 is operated, provided that the operation only lasts for a period less than the predetermined period of time T1, the latch cylinder 52 does not extend to the predetermined degree or more and therefore the latching mechanisms 51 are not brought into the latching state. Therefore, the latching mechanisms 51 are moved back by the spring back force of the coil springs 56 to the original unlatching state.

On the contrary, while the detaching switch 27 is being operated, the controller 21 places the control valve 40c in the second position to allow hydraulic fluid from the main pump P1 to be supplied to the latch cylinder 52 in a second direction opposite to the first direction to cause the latch cylinder 52 to retract. Accordingly, the operation of the detaching switch 27 that lasts for a predetermined period of time T2 or more while the latching mechanisms 51 are in the latching state causes the latch cylinder 52 to retract to a predetermined degree or more, bringing the latching mechanisms 51 into the unlatching state.

Even if the detaching switch 27 is operated, provided that the operation only lasts for a period less than the predetermined period of time T2, the latch cylinder 52 does not retract to the predetermined degree or more and therefore the latching mechanisms 51 are not brought into the unlatching state. Therefore, the latching mechanisms 51 are moved back by the spring back force of the coil springs 56 to the original latching state. The controller 21 determines whether the latching mechanisms 51 are in the latching state or the unlatching state based on, for example, the position of the control valve 40c.

The predetermined periods of time T1, T2 for the switches 26 and 27 are each, for example, about 2 to 3 seconds. The predetermined periods of time for the switches 26 and 27 may be the same period or different periods. The specific values of the predetermined periods of time T1, T2 are examples, and not limited to the values above. The specific values of another predetermined period of time and a period of time (described later) are also examples and not limited thereto.

The pair of left and right traveling devices 5 include a pair of left and right hydro-static transmissions (HSTs) 46L and 46R corresponding to the pair of left and right traveling devices 5. Each of the HSTs 46L and 46R includes hydraulic pump(s) and a travel motor (hydraulic motor).

The operating equipment 47 includes the travel operator 6 and travel operating valves corresponding to the travel operator 6. The travel operating valve(s) is/are actuated according to the manner in which the travel operator 6 is operated, thus allowing the pilot pressure of pilot fluid from the pilot pump P2 to act on pressure receiver(s) of the hydraulic pump(s) of the corresponding HST(s) 46L and/or 46R via the actuated travel operating valve(s) and changing the angle of inclination of swash plate(s) of the hydraulic pump(s). For example, the travel operator 6 may be supported on the travel operating valves and the travel operating valves may be physically actuated by operation of the travel operator 6. Additionally or alternatively, a detection sensor to detect the amount (degree) and direction of operation of the travel operator 6 may be provided and the controller 21 may electrically actuate the travel operating valve(s) based on the detection result from the detection sensor.

This controls the supply, the stopping of supply, and the direction of supply of hydraulic fluid from the hydraulic pump(s) of the HSTs 46L and/or 46R to the travel motor(s), the travel motor(s) rotate(s) in the forward direction, rotate in the reverse direction, or stop, the left and/or right traveling device(s) 5 also rotate(s) in the forward direction, rotate in the reverse direction, or stop, and the working vehicle 1 travels forward, rearward, turn left or right, or stops.

The operating equipment 47 includes a travel switching valve for speed change. The position of the travel switching valve is switched in response to a control signal from the controller 21, thus changing the angle of inclination of the swash plate(s) of the travel motor(s) of the HSTs 46L and/or 46R. With this, the rotation speed of the travel motor(s) increases or decreases, so that the travel speed of the traveling devices 5 and the working vehicle 1 is changed.

The pilot pressure (travel operating pressure) acting on the pressure receivers of the hydraulic pumps of the HSTs 46L and 46R from the travel operating valves of the operating equipment 47 is detected by pressure sensors 49e. Although only a single pressure sensor 49e is illustrated in FIG. 1, actually pressure sensors 48a (four pressure sensors 49e) are connected to respective fluid passages (four fluid passages) to supply pilot fluid to respective pressure receivers of the hydraulic pumps of the HSTs 46L and 46R (two pressure receivers of the hydraulic pump of the HST 46L and two pressure receivers of the hydraulic pump of the HST 46R). The controller 21 determines the operation state of the travel operating valves and the travel operator 6 of the operating equipment 47 based on the pilot pressure detected by the pressure sensors 49e.

For another example, detection sensor(s) such as potentiometer(s) to detect the angle of rotation of the travel operator 6, etc. may be provided instead of the pressure sensors 49e. The controller 21 may determine the operation state of the travel operating valves and the travel operator 6 of the operating equipment 47 based on output signal(s) from the detection sensor(s). Such detection sensors and pressure sensors 49e are examples of travel operation sensors to detect the operation state of the travel operator 6, and the travel operation sensors are not limited to those described above. In a case that the travel operator 6 is an electric travel operator, such as a joystick, to output an electric signal (operation signal) corresponding to the operation state, the controller 21 may determine the operation state of the travel operator based on the electric signal.

The pressure of hydraulic fluid supplied from the hydraulic pumps of the HSTs 46L and 46R to the travel motors, i.e., the travel pressure for the left traveling device 5 and the travel pressure for the right traveling device 5, are detected by pressure sensors 49d. Although only a single pressure sensor 49d is illustrated in FIG. 1, actually pressure sensors 49d (four pressure sensors 49d) are connected to fluid passages (supply fluid passage and return fluid passage) to allow hydraulic fluid to circulate between the hydraulic pump of the HST 46L and the travel motor corresponding to the left traveling device 5 and fluid passages (supply fluid passage and return fluid passage) to allow hydraulic fluid to circulate between the hydraulic pump of the HST 46R and the travel motor corresponding to the right traveling device 5.

The controller 21 determines the action status (traveling forward/rearward, turning, and stopping) of the traveling devices 5 (left traveling device 5 and right traveling device 5) based on the travel pressure detected by the pressure sensors 49d. The controller 21 may cause rotation speed sensors 49c to detect the rotation speed of the travel motors of the HSTs 46L and 46R instead of the pressure sensors 49d, and determine the action status of the traveling devices 5 based on the detection result. The rotation speed sensors 49c and the pressure sensors 49b are examples of travel detection sensors to detect the action status of the traveling devices 5, and the travel detection sensors are not limited to those described above.

The attachment 30 attachable to the working vehicle 1 is provided with a beacon transmitter 33. The beacon transmitter 33 is a transmitter to periodically transmit an advertisement signal (also called "advertisement packet" or "beacon signal") which is a wireless signal compliant with Bluetooth (registered trademark) Low Energy. The beacon transmitter 33 looks like a small tag, and is therefore sometimes called a "BLE tag". The beacon transmitter 33 includes a microcomputer 33a, a memory (nonvolatile memory) 33b, a transmitter circuit 33c, a vibration sensor 33d, a battery 33e, and/or the like. The elements of the beacon transmitter 33 are driven by electricity from the battery 33e. The beacon transmitter 33 transmits the advertisement signal at interval(s) of, for example, about 1 second to about 3 seconds, but the intervals are not limited to about 1 second to about 3 seconds and may be selected as appropriate.

FIG. 2 shows an example of information indicated by an advertisement signal (hereinafter referred to as "ADV signal") Q1 transmitted from the beacon transmitter 33. The ADV signal Q1 transmitted from a beacon transmitter 33 includes a header, a beacon ID, an attachment ID, and other information. The beacon ID is identification information relating to the beacon transmitter 33 which is the sender of the ADV signal Q1. The attachment ID is identification information relating to the attachment 30 in or on which the beacon transmitter 33 which is the sender of the ADV signal Q1 is provided. The beacon ID and the attachment ID are stored in the memory 33b.

The other information in the ADV signal Q1 includes vibration information, operating information, and battery information. The vibration information is information relating to the vibration state detected by the vibration sensor 33d of the beacon transmitter 33 which is the sender of the ADV signal Q1, i.e., information relating to the vibration state of the attachment 30 in or on which the beacon transmitter 33 is provided. The vibration information at least includes information indicating whether or not the attachment 30 is vibrating (presence or absence of vibration). The operating information indicated by the ADV signal Q1 is the operating time of the beacon transmitter 33 (the time for which the beacon transmitter 33 has been in operation), but is regarded as the operating time of the attachment 30 in or on which the beacon transmitter 33 is provided. The battery information indicated by the ADV signal Q1 includes the remaining charge level of the battery 33e of the beacon transmitter 33.

The microcomputer 33a in the beacon transmitter 33 determines whether there is vibration on the attachment 30 based on the detection signal from the vibration sensor 33d and generates vibration information including information indicating whether there is vibration or not at predetermined interval(s). The microcomputer 33a includes a timer which measures the time that has passed since the activation of the beacon transmitter 33 as the operating time. The microcomputer 33a calculates the remaining charge level of the battery 33e using a predetermined arithmetic expression based on at least one of the operating time, the voltage applied by the battery 33e, or the electric current discharged from the battery 33e. Then, the microcomputer 33a causes the transmitter circuit 33c to transmit, at predetermined interval(s), an ADV signal Q1 indicating the beacon ID and the attachment ID read from the memory 33b, and other information such as the vibration information, the operating time, and/or the battery information indicating the charge level of the battery 33e.

Note that the other information of the ADV signal Q1 may include, in addition to or instead of the information above mentioned, for example, specific information regarding the attachment 30 such as the supply volume or supply pressure of hydraulic fluid to the attachment 30, the name (official name), the product name, the model number, the serial number, and/or the like of the attachment 30, as well as specific information regarding the beacon transmitter 33 such as the product name, the model number, the serial number, and/or the like of the beacon transmitter 33.

As described above, an ADV signal Q1 indicates information relating to the attachment 30, and the information relating to the attachment 30 includes source information relating to at least one signal source which is the attachment 30 and/or the beacon transmitter 33.

As illustrated in FIG. 15, the beacon transmitter 33 is located on, for example, the back surface of the attachment 30 that faces the vehicle body 2 of the working vehicle 1. The beacon scanner 23 is located at, for example, the front portion of the vehicle body 2 that faces the attachment 30. The controller 21 is provided in the vehicle body 2. Since the beacon scanner 23 is provided in or on the vehicle body 2, it is possible to achieve a configuration in which output signals from the beacon scanner 23 can be inputted into the controller 21 using simple electric wiring or simple communication circuit(s) as compared to cases where the beacon scanner 23 is provided on the movable working device 4. In the present example embodiment, the beacon scanner 23 and the controller 21 are electrically connected together in a wired manner such as using cable(s).

The ADV signal Q1 transmitted from the beacon transmitter 33 is received by the beacon scanner 23 of the working vehicle 1. The controller 21 identifies (recognizes) the attachment 30 provided with the beacon transmitter 33 (sender) based on, for example, information included in the ADV signal Q1 received by the beacon scanner 23.

In the case where one or more attachments 30 are present in the vicinity of the working vehicle 1, one or more ADV signals Q1 from one or more beacon transmitters 33 in or on the one or more attachments 30 are received by the beacon scanner 23. Upon receipt of each ADV signal Q1, the beacon scanner 23 measures the RSSI of the ADV signal Q1, and outputs information included in the ADV signal Q1 and the RSSI to the controller 21. The RSSI is an example of reception information relating to the reception condition of the ADV signal Q1 (i.e., an example of information relating to the condition of reception of the ADV signal Q1).

The controller 21 causes the internal memory (first memory) 21a to store, in its predetermined storage area, information included in the ADV signal Q1 received by the beacon scanner 23 (FIG. 2), thus collecting such information. In so doing, the controller 21 generates advertisement information (hereinafter referred to as "ADV information") including information included in the ADV signal Q1 and time information indicating the receipt time point (date and time) at which the ADV signal Q1 was received, and causes the internal memory 21a to store the ADV information in its predetermined storage area. The controller 21 may also include the value indicating the RSSI of the ADV signal Q1 into the ADV information.

FIG. 3 illustrates ADV information stored (collected) in the predetermined storage area of the internal memory 21a. In order to keep the capacity of the predetermined storage area of the internal memory 21a at a certain level, the controller 21 may delete the ADV information (or overwrite the ADV information with newly generated ADV information) after storing it in the internal memory 21a for a period of time. The ADV information includes the foregoing beacon ID, attachment ID, vibration information, operating information, battery information, RSSI, and time information.

In the case of attaching an attachment 30 on the ground, etc. to the working vehicle 1, while no attachments 30 are attached to the quick hitch 16, i.e., while the latching mechanisms 51 are in the unlatching state, the user of the working vehicle 1 operates the travel operator 6 to cause the traveling devices 5 to travel forward to cause the working device 4 to approach the rear portion of the attachment 30. The user operates the work operator 7 along the first direction to actuate the boom cylinders 14 to raise or lower the booms 11 of the working device 4 so that the height of the quick hitch 16 at the distal end of the booms 11 matches the height of the attachment 30. The user operates the work operator 7 along the second direction to actuate the front cylinders 15 so that the angle (tilt) of the front plates 50f of the brackets 50 of the quick hitch 16 matches the angle of the base plate 71 of the attachment 30.

Next, the user operates the travel operator 6 to cause the traveling devices 5 to travel forward to some degree at very low speed to cause the front plates 50f of the quick hitch 16 to engage with the base plate 71 of the attachment 30 as illustrated in FIG. 17A, thus causing the brackets 50 to hold the attachment 30. In so doing, the user may, after causing the front plates 50f to engage with the base plate 71, use the work operator 7 to raise the booms 11 to some degree or cause the quick hitch 16 to swing upward to some degree to cause the working device 4 to lift up the attachment 30 to some degree to check whether the attachment 30 is held by the brackets 50.

As such, the attachment 30 vibrates, for example, when the front plates 50f of the brackets 50 engage with the base plate 71, when the attachment 30 is lifted up by the working device 4, and when the attachment 30 is latched by the latching mechanisms 51. The ADV signal Q1 transmitted from the beacon transmitter 33 in or on the attachment 30 includes vibration information relating to the vibration state of the attachment 30 detected by the vibration sensor 33d when such an instance occurs.

When (i) the latching mechanisms 51 are in the unlatching state and (ii) at least one of the traveling devices 5 or the working device 4 is performing an action to attach an attachment 30, i.e., when an attachment 30 is about to be attached to the working vehicle 1, the beacon scanner 23 receives one or more ADV signals Q1 periodically transmitted from the beacon transmitter 33 in or on the attachment 30.

Then, the information relating to the attachment 30 indicated by the received ADV signal Q1 is outputted from the beacon scanner 23 to the controller 21. That is, the information relating to the attachment 30 attached to the quick hitch 16 is inputted via the beacon scanner 23 into the working vehicle 1. Thus, the information relating to the attachment 30 inputted via the beacon scanner 23 is primary information relating to the attachment 30 inputted into the working vehicle 1, and therefore is referred to as "first attachment information". The beacon scanner 23 is included in a first interface of the working vehicle 1 via which the first attachment information is inputted (a first interface to receive input of the first attachment information).

The first interface also includes the user interface 25 (FIG. 1) in addition to or instead of the beacon scanner 23. The first attachment information relating to the attachment 30 attached to the quick hitch 16 can be inputted also by the user such as the driver of the working vehicle 1 operating the user interface 25. The first attachment information inputted via the user interface 25 includes, for example, identification information such as the product name, model number, name, nickname, and/or an attachment ID of the attachment 30. The number of types of information included in the first attachment information inputted via the user interface 25 is less than the number of types of information included in the first attachment information inputted via the beacon scanner 23. This reduces the load on the user, etc., manually inputting the first attachment information via the user interface 25.

Figure 4:
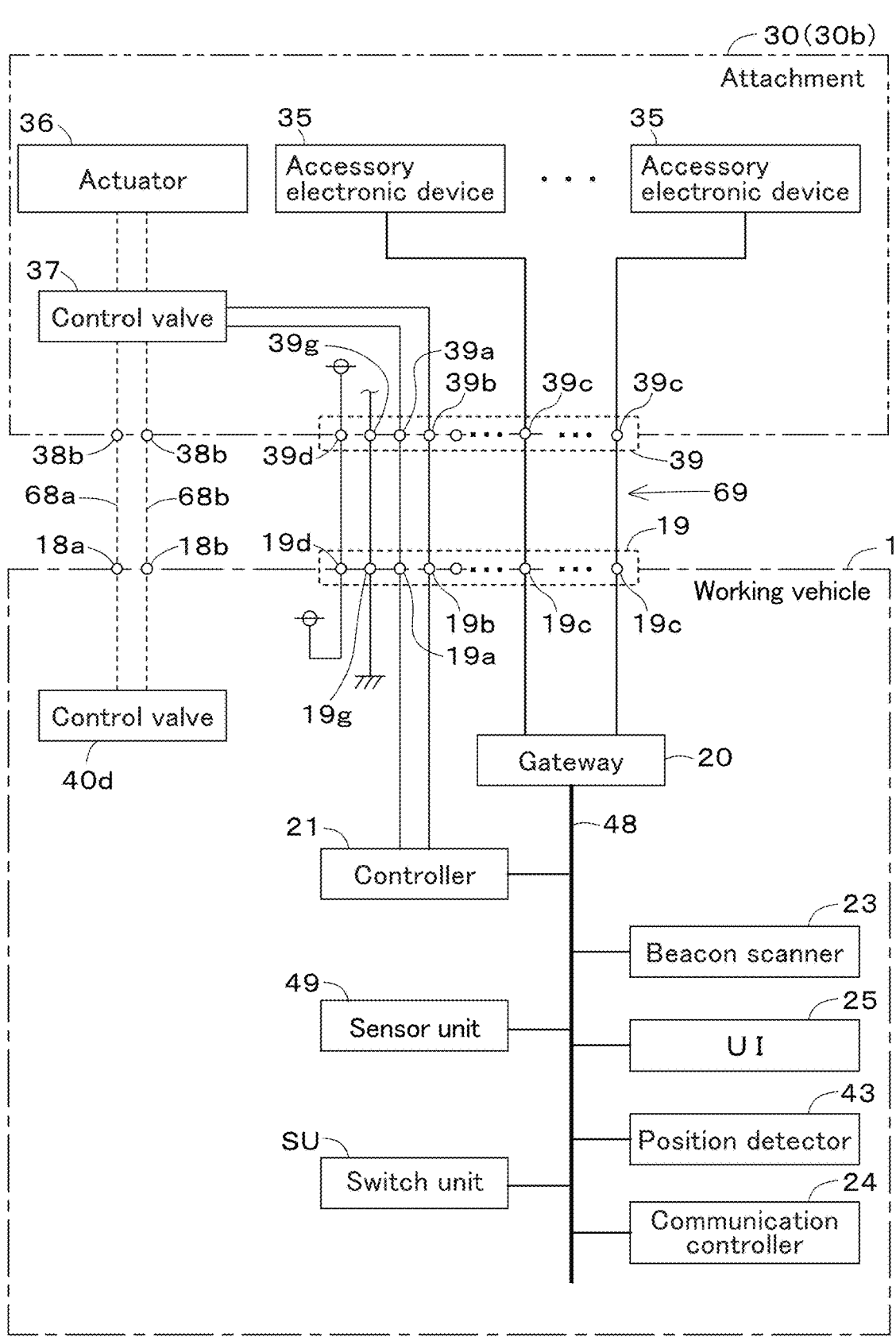
FIG. 4 illustrates an example of the manner in which electronic devices in or on a working vehicle and an attachment are connected.

FIG. 4 illustrates an example of the manner in which electronic devices in or on the working vehicle 1 and the attachment 30 (30*b*) are connected. The working vehicle 1 includes a bus 48 and a gateway 20. The bus 48 is connected to a plurality of in-vehicle electronic devices included in the working vehicle 1, such as the gateway 20, the controller 21, the beacon scanner 23, the communication controller 24, the user interface 25, the position detector 43, a sensor unit 49, and/or a switch unit SU. Such in-vehicle electronic devices transmit and receive (input and output) signals and information via the bus 48. Thus, a plurality of in-vehicle electronic devices are connected to the bus 48 to define an in-vehicle network of the working vehicle 1. Note that the working vehicle 1 also includes other electronic device(s) other than the those listed above connected to the bus 48, which is/are not illustrated in FIG. 4.

The gateway 20 includes, for example, processor(s) such as CPU and one or more memories, as well as software program(s) to be executed by the processor(s). The switch unit SU includes the switches 26 to 29 illustrated in FIG. 1 and other switch(es). The sensor unit 49 includes the sensors 49*a* to 49*g* illustrated in FIG. 1 and other sensor(s). The other sensor(s) include(s) a fluid temperature sensor to detect the temperature of hydraulic fluid in the working vehicle 1, a temperature sensor to detect the temperature of cooling water, a fuel sensor to detect the remaining amount of fuel, a liquid level sensor to detect the remaining amount of an aqueous solution of urea, a rotation speed sensor to detect the rotation speed of the prime mover 9, a battery sensor to detect the remaining charge level of the battery 44, and/or the like.

Examples of the attachment 30 include attachments 30*b* including an actuator (hydraulic actuator) 36 powered by hydraulic fluid such as a hydraulic cylinder or a hydraulic motor, and attachments 30*a* without actuators 36 such as a bucket (FIG. 1). Examples also include attachments 30 with an electric actuator.

The working vehicle 1 includes the AUX couplers 18*a* and 18*b* and an AUX connector 19 for connection with the actuator 36. In the case where an attachment 30*b* including an actuator 36 is attached to the quick hitch 16, hoses 68*a* and 68*b* are connected to the AUX couplers 18*a* and 18*b* of the working vehicle 1 and to couplers 38*a* and 38*b* of the attachment 30*b*. Furthermore, an electric harness 69 is connected to the AUX connector 19 of the working vehicle 1 and a connector 39 of the attachment 30*b*. The electric harness 69 includes, at the opposite ends thereof, connectors to fit the connectors 19 and 39.

The AUX couplers 18*a* and 18*b* are power outlet ports to allow power (hydraulic fluid) to be outputted from the working vehicle 1 to the attachment 30*b*. The AUX connector 19 is included in a second interface to connect thereto the accessory electronic device(s) 35 in or on the attachment 30*b*. The AUX connector 19 and the gateway 20 are connected (local connection) with a connector (electric line(s) and/or the like) different from the bus 48. Specifically, the gateway 20 is connected in a wired manner to the AUX connector 19 without the bus 48 between the gateway 20 and the AUX connector 19.

The connectors 19 and 39 include respective pluralities of terminals corresponding to each other. The electric harness 69 includes a plurality of electric lines corresponding to the terminals of the connector 19 and the terminals of the connector 39. The terminals of the connectors 19 and 39 include supply terminals 19*d* and 39*d*, ground terminals 19*g* and 39*g*, and control terminals 19*a*, 19*b*, 39*a* and 39*b*. The power source for the attachment 30*b* is the battery 44 of the working vehicle 1. Therefore, electricity (electric current, voltage) from the battery 44 is supplied to the accessory electronic device(s) 35 and/or the like in or on the attachment 30*b* via an electric line in or on the working vehicle 1, the supply terminal 19*d* of the AUX connector 19, a corresponding one of the electric lines of the electric harness 69, the supply terminal 39*d* of the connector 39, an electric line in or on the attachment 30*b*, and/or the like.

The electric line for grounding in or on the attachment 30*b* is connected to the electric line for grounding in or on the working vehicle 1, via the ground terminal 39*g* of the connector 39, a corresponding electric line of the electric harness 69, the ground terminal 19*g* of the AUX connector 19, and/or the like. With this, the accessory electronic device(s) 35 and/or the like of the attachment 30*b* are grounded.

The control terminals 19*a* and 19*b* of the AUX connector 19 are connected to the controller 21 via electric lines provided on or in the working vehicle 1. The control terminals 39*a* and 39*b* of the connector 39 are connected to the control valve 37 via electric lines provided on or in the attachment 30*b*. The control valve 37 is provided on or in the attachment 30*b* to adjust the direction, the amount, and the like of hydraulic fluid to the actuator 36. The control valve 37 is, for example, a proportioning valve with a plurality of positions. In FIG. 4, one actuator 36 and one control valve 37 are illustrated for convenience. However, one or more actuators 36 and one or more control valves 37 are provided on or in the attachment 30*b*.

The controller 21 inputs control signals (electric current) into the control valve 37 via electric lines provided on or in the working vehicle 1, the control terminals 19*a* and 19*b* of the AUX connector 19, corresponding electric lines of the electric harness 69, the control terminals 39*a* and 39*b* of the connector 39, electric lines provided on or in the attachment 30*b*, and/or the like to control the position and the opening of the control valve 37.

When the AUX mode switch 28 shown in FIG. 1 is operated and the working vehicle 1 is in the AUX mode, the attachment 30*b* is attached to the quick hitch 16 and, as shown in FIG. 4, the hoses 68*a* and 68*b* are connected to the AUX couplers 18*a* and 18*b* of the working vehicle 1 and to the couplers 38*a* and 38*b* of the attachment 30*b*, and the electric harness 69 is connected to the AUX connector 19 of the working vehicle 1 and to the connector 39 of the attachment 30*b*.

Then, when the AUX output switch 29 as shown in FIG. 1 is operated, the controller 21 inputs a control signal into the control valve 40*d* to switch the control valve 40*d* from the neutral position to the first position or the second position. The controller 21 inputs a control signal into the control valve 37 of the attachment 30*b* via the connectors 19 and 39 and the electric harness 69 as shown in FIG. 4 to switch the control valve 37 to the supply position such that the control valve 37 opens.

With this, hydraulic fluid from the main pump P1 (FIG. 1) is, for example, outputted through the control valve 40*d* and the fluid passage 45*a* via the AUX coupler 18*a*, and is inputted into the actuator 36 through the hose 68*a*, the coupler 38*a* of the attachment 30*b*, the control valve 37, and/or the like. The hydraulic fluid outputted from the actuator 36 (return fluid) is outputted through the control valve 37 via the coupler 38*b*, and is drained from the control valve unit 40 through the hose 68*b*, the AUX coupler 18*b*, the fluid passage 45*b*, and the control valve 40*d*. Since hydraulic fluid is introduced and discharged into and from the attachment 30*b* (actuator 36) in such a manner, the actuator 36 is actuated and the attachment 30*b* is driven, allowing the attachment 30*b* to perform work.

When the controller 21 causes hydraulic fluid to be introduced into and discharged from the attachment 30*b*, the controller 21 changes the opening of the control valve 40*d* and the position and the opening of the control valve 37 according to the attachment 30*b* to adjust the flow rate or the hydraulic pressure of hydraulic fluid supplied from the AUX coupler 18*a* to the attachment 30*b*. The controller 21 detects at least one of the flow rate or the pressure of the hydraulic fluid flowing through the fluid passage(s) 45*a* and/or 45*b* via the sensor(s) 49*f* and/or 49*g*, and controls the opening of at least one of the control valve 40*d* or the control valve 37 based on the detection result.

For example, in the case where the sensors 49*f* and 49*g* are flow rate sensors, the controller 21 detects the flow rate of hydraulic fluid flowing through at least one of the fluid passages 45*a* and 45*b* via the flow rate sensor(s) 49*f* and 49*g*, and controls the opening of the control valve 40*d* based on the detected flow rate. In the case where the sensors 49*f* and 49*g* are pressure sensors, the controller 21 detects the hydraulic pressure of hydraulic fluid flowing through at least one of the fluid passages 45*a* and 45*b* via the pressure sensor(s) 49*f* and 49*g*, and controls the opening of the control valve 40*d* based on the detected hydraulic pressure.

Additionally or alternatively, the controller 21 detects at least one of the flow rate or the pressure of hydraulic fluid supplied to the actuator 36 from the control valve 37 via sensor(s) (accessory electronic device(s) 35) provided in or on the attachment 30*b*, and controls the opening of at least one of the control valve 40*d* or the control valve 37 based on the detection signal(s) outputted from the sensor(s).

The attachment 30*b* includes at least one accessory electronic device 35. The accessory electronic device 35 is an electronic device other than the beacon transmitter 33, and includes a sensor, CPU, an electronic controller, or the like. In the case where the accessory electronic device(s) 35 is/are sensor(s), the sensor(s) is/are at least one of, for example, a flow rate sensor to detect the flow rate of hydraulic fluid supplied to the actuator 36 from the control valve 37, a pressure sensor to detect the pressure of the hydraulic fluid, a rotation speed sensor to detect the rotation speed of a hydraulic motor which is the actuator 36, an inertial measurement unit to detect the posture (tilts about three axes, i.e., back-front axis, left-right axis and up-and-down axis) of the attachment 30*b*, or an inertial sensor (gyroscope sensor or acceleration sensor) to detect the inertia of the attachment 30*b*.

The accessory electronic device(s) 35 is/are connected to the gateway 20 via electric line(s) provided on or in the attachment 30*b*, communication terminal(s) 39*c* of the connector 39, corresponding electric line(s) of the electric harness 69, communication terminal(s) 19*c* of the AUX connector 19, and electric line(s) provided on or in the working vehicle 1.

In the case where the attachment 30*b* includes a plurality of accessory electronic devices 35, the communication terminals 39*c* of the connectors 39, the communication terminals 19*c* of the connectors 19, and the electric lines of the electric harness 69 may be allocated to the respective accessory electronic devices 35. Alternatively, in the case where the plurality of accessory electronic devices 35 include (i) at least one sensor and (ii) a CPU or an electronic controller, the sensor(s) may be connected to the CPU or the electronic controller, and the CPU or the electronic controller may be connected to the gateway 20 via the connectors 39 and 19 and the electric harness 69.

When the accessory electronic device(s) 35 on or in the attachment 30*b* attached to the quick hitch 16 is/are connected to the AUX connector(s) 19 and to the gateway 20 as described above, the electronic devices such as the gateway 20 and the controller 21 of the working vehicle 1 are allowed to communicate with the accessory electronic device(s) 35.

Each accessory electronic device 35 outputs a signal indicating at least one of information relating to the accessory electronic device 35 or information relating to the attachment 30*b* in or on which the accessory electronic device 35 is provided. For example, in the case where the accessory electronic device 35 is a sensor, the signal indicating the value detected by the sensor is outputted from the accessory electronic device 35.

For example, in the case where the accessory electronic device 35 is a CPU or an electronic controller, the accessory electronic device 35 outputs at least one of (i) identification information such as the attachment ID or the product name of the attachment 30*b* in which the CPU or the electronic controller is provided, (ii) identification information such as the ID or the product name of the CPU or the electronic controller, (iii) identification information such as the ID or the product name of the sensor connected to the CPU or the electronic controller, or (iv) information indicating detection result from the sensor.

The signal outputted from the accessory electronic device 35 is inputted from the attachment 30*b* into the gateway 20 via the connectors 39 and 19, the electric harness 69, and the like. Specifically, the external signal from the attachment 30*b* is inputted via the AUX connector 19 into the working vehicle 1. The gateway 20 converts the external signal (the output signal from the accessory electronic device 35) inputted thereto from the AUX connector 19 into a signal in a protocol supported by the in-vehicle network of the working vehicle 1, and outputs the converted external signal to the bus 48.

Upon each receipt of an ADV signal Q1 from the beacon transmitter 33 in or on the attachment 30, the beacon scanner 23 measures the RSSI of the ADV signal Q1, and outputs, to the bus 48, the RSSI and information included in the ADV signal Q1 which are associated with each other. With this, the information included in the ADV signal Q1 and the RSSI of the ADV signal Q1 are inputted into the controller 21 via the bus 48. Then, the controller 21 causes the internal memory 21*a* to store ADV information including the inputted information and RSSI for a certain period of time.

When the attachment 30 is attached to the quick hitch 16, the controller 21 selects, according to a predetermined condition, first attachment information relating to the attachment 30 included in one of one or more ADV signals Q1 already received by the beacon scanner 23. Specifically, if the attaching switch 26 is operated continuously for the predetermined period T1 or more while the latching mechanisms 51 are in the unlatching state, the controller 21 determines that the attachment 30 is attached to the quick hitch 16, and the controller 21 selects, according to a predetermined condition, first attachment information (such as attachment ID) relating to the attachment 30 included in one of the one or more pieces of ADV information stored in the internal memory 21*a*.

Then, the controller 21 regards the selected first attachment information as information corresponding to the attachment 30 attached to the quick hitch 16, identifies the specifications and/or the like of the attached attachment 30 based on the first attachment information, and performs (starts) a predetermined process based on the first attachment information.

For example, the predetermined process performed by the controller 21 includes causing the user interface 25 to output (display) information indicating that the attachment 30 corresponding to the selected first attachment information is attached to the quick hitch 16 (working vehicle 1). In so doing, the controller 21 reads, from the internal memory 21*a*, a portion or whole of the ADV information corresponding to the attachment ID included in the selected first attachment information and outputs the read information. Also, the controller 21 reads, from the nonvolatile memory 22, the information indicating the attachment 30 corresponding to the attachment ID and outputs the read information.

Another example of the predetermined process is a process in which the controller 21 performs a predetermined control corresponding to the selected first attachment information. Specifically, the controller 21 controls, for example, output of hydraulic fluid (power) to the attachment 30 (30*b*) attached to the quick hitch 16 (controls start and stop of output) according to the first attachment information. It is noted here that the controller 21 may also control at least one of the amount of hydraulic fluid supplied to the attachment 30 or the pressure of hydraulic fluid supplied to the attachment 30. The controller 21 may, according to the first attachment information, control the traveling devices 5 to control the vehicle speed of the working vehicle 1, and/or control the working device 4 to control the height above the ground and/or the orientation of the attachment 30.

For each attachment 30 attachable to the quick hitch 16, i.e., for each attachment 30 usable with the working vehicle 1, corresponding data for use of the attachment 30 is preset.

FIG. 5 is an example of a table of attachment IDs and pieces of corresponding data of attachments 30 attachable to the quick hitch 16 of the working vehicle 1. The attachment IDs and the pieces of corresponding data are associated with each other and stored in a predetermined storage area of the nonvolatile memory 22 of the working vehicle 1. Note that the attachment IDs and the pieces of corresponding data may be associated with each other and stored in the internal memory 21*a* of the controller 21 instead of or in addition to the nonvolatile memory 22.

Each piece of corresponding data includes attachment data which is information relating to the attachment 30. The attachment IDs are also attachment data. A piece of corresponding data of an attachment 30 including accessory electronic device(s) 35 also includes accessory device data which is information relating to the accessory electronic device(s) 35.

The attachment data includes, for example, identification information, specifications, control data and/or the like of the attachment 30. The identification information of the attachment 30 included in the attachment data includes the name, the product name, the model number, nickname, the icon and/or the like of the attachment 30 other than the attachment ID. Such identification information is used as display data to display information relating to the attachment 30 via the user interface 25.

The specifications of the attachment 30 include the size, the weight, and/or the like of the attachment 30. The specifications of an attachment 30 in or on which an actuator 36 is provided include actuator information relating to the actuator 36. The actuator information includes information indicating the model number, the power source and/or the like of the actuator 36.

The control data indicates control to be performed on the working vehicle 1 according to the attachment 30. The control data includes, for example, the standard level of the amount of hydraulic fluid supplied to the attachment 30, the posture (tilts about three orthogonal axes, i.e., back-front, left-right and up-and-down axes, height, etc.) of the attachment 30 when performing work and/or the like, the travel speed (vehicle speed), and/or the like. Note that the control data may include the standard level of the pressure of hydraulic fluid outputted to the attachment 30, the output value of power and/or the like other than the hydraulic fluid (electricity, electric current, voltage and/or the like), and/or the like.

The accessory device data includes identification information such as the ID and the product name of the accessory electronic device(s) 35, specifications of the accessory electronic device(s) 35, and/or the like. The specifications of the accessory electronic device(s) 35 include at least one of (i) the electric current range or the voltage range of the signal outputted by the accessory electronic device(s) 35, (ii) the type(s) of information outputted by the accessory electronic device(s) 35, or (iii) the number(s) assigned to the communication terminal(s) 19*c* of the AUX connector 19 to which the accessory electronic device(s) 35 is/are connected.

The controller 21 performs a predetermined process based on the attachment ID included in the first attachment information selected as described earlier and based on the ADV information (FIG. 3) and the corresponding data (FIG. 5) corresponding to the attachment ID. Alternatively, the controller 21 performs a predetermined process based on first attachment information such as the product name of the attachment 30 inputted thereto via the user interface 25 and based on the corresponding data corresponding to the first attachment information.

The controller 21 outputs, to the bus 48, the selected first attachment information or the first attachment information inputted thereto via the user interface 25. Alternatively, the controller 21 may read information relating to the attachment 30 corresponding to the first attachment information from the corresponding data stored in the nonvolatile memory 22 based on the selected first attachment information or based on the first attachment information inputted thereto via the user interface 25. Then, the controller 21 may generate second attachment information which is secondary information relating to the attachment 30 corresponding to the first attachment information based on the information read from the nonvolatile memory 22, and may output the second attachment information to the bus 48.

Alternatively, the controller 21 may use, based on the first attachment information, secondary information relating to the corresponding attachment 30 read from the nonvolatile memory 22 as the second attachment information, and the controller 21 may output the second attachment information to the bus 48. More specifically, the controller 21 outputs, to the bus 48, at least one of (i) the first attachment information inputted thereto via the beacon scanner 23 or the user interface 25 or (ii) the second attachment information generated or read from the nonvolatile memory 22 or the like based on the first attachment information.

In the case where an external signal outputted from the accessory electronic device(s) 35 of the attachment 30*b* and inputted via the AUX connector 19 and the like does not agree with the attachment 30 corresponding to the first attachment information inputted via the beacon scanner 23 or the user interface 25, the gateway 20 does not output the external signal to the bus 48, and, in the case where the external signal agrees with the attachment 30 corresponding to the first attachment information (which may be hereinafter simply referred to as "agrees with the attachment"), the gateway 20 outputs the external signal to the bus 48. In the case where the external signal does not agree with the attachment 30 corresponding to the first attachment information, the controller 21 does not perform control corresponding to the external signal, and in the case where the external signal agrees with the attachment 30, the controller 21 performs control corresponding to the external signal.

Figure 6:
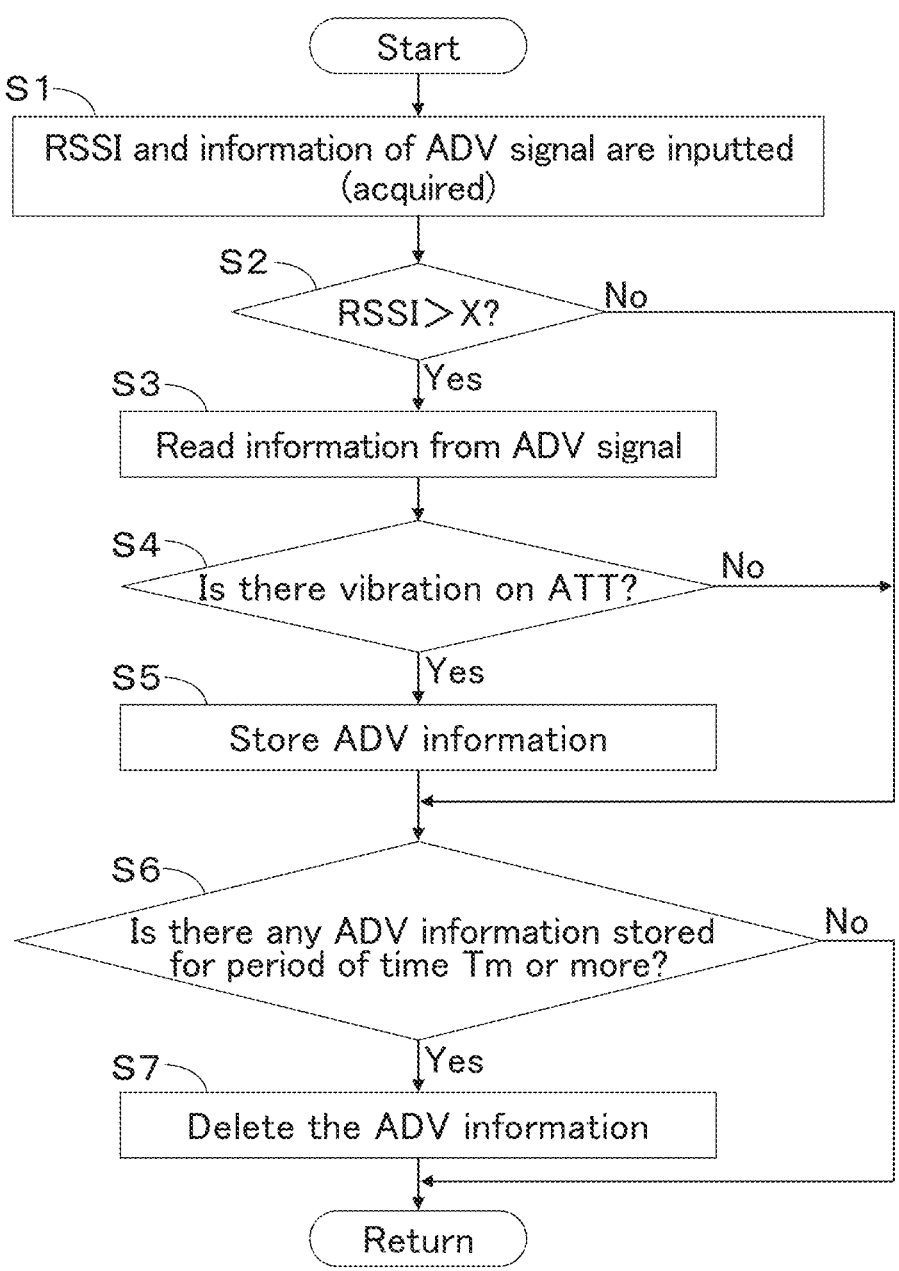
FIG. 6 is a flowchart showing an example of an advertisement information collecting process.

FIG. 6 is a flowchart showing an example of an ADV information collecting process.

The ADV information collecting process is repeatedly performed by the controller 21 based on software program (s) stored in the internal memory 21a or the nonvolatile memory 22 while the working vehicle 1 is in operation (while the prime mover 9 is being driven). The same applies to the process in FIGS. 7A to 7C and FIG. 13 (described later). In the flowchart of FIG. 6, the attachment is referred to as "ATT" for convenience of description. The same applies to the other flowcharts (described later).

When the beacon scanner 23 receives an ADV signal Q1 from the beacon transmitter 33, the beacon scanner 23 measures the RSSI of the ADV signal Q1, and outputs the RSSI and the information indicated by the ADV signal Q1 to the bus 48 in order to transmit the RSSI and the information to the controller 21. In so doing, the beacon scanner 23 associates the RSSI and the information of the ADV signal Q1 to be outputted with identification information such as the ID of the beacon scanner 23 which is the sender and identification information of the controller 21 which is the destination.

Upon receipt (acquisition) of input of the RSSI and the information relating to the ADV signal Q1 from the beacon scanner 23 via the bus 48 (S1 in FIG. 6), the controller 21 compares the RSSI with a predetermined value X. If the RSSI of the ADV signal Q1 is greater than the predetermined value X (YES at S2), the controller 21 reads the information from the inputted ADV signal Q1 (S3). If the read information includes vibration information indicating that the attachment 30 is vibrating, the controller 21 determines that there is vibration on the attachment 30 (YES at S4). The controller 21 then generates ADV information (FIG. 3) including the read information relating to the ADV signal Q1 (first attachment information) and the RSSI of the ADV signal Q1, and causes the internal memory 21a to store the ADV information (S5 at FIG. 6).

In contrast, if the RSSI of the received ADV signal Q1 is equal to or less than the predetermined value X (NO in S2), the controller 21 does not cause the internal memory 21a to store the read information relating to the ADV signal Q1 or the RSSI of the ADV signal Q1. Also if the read information relating to the ADV signal Q1 does not include vibration information indicating that the attachment 30 is vibrating and it is determined that there is no vibration on the attachment 30 (NO in S4), the controller 21 does not cause the internal memory 21a to store the read information relating to the ADV signal Q1 or the RSSI of the ADV signal Q1.

If any of the pieces of ADV information in the internal memory 21a has been stored for a predetermined period of time Tm or more (YES in S6), the controller 21 deletes that piece(s) of ADV information from the internal memory 21a (S7). The predetermined period of time Tm is, for example, about 30 seconds which corresponds to at least one of the time for an attachment 30 to be attached to the working vehicle 1 or the time for the attachment 30 to be replaced with another one.

Figure 7A:
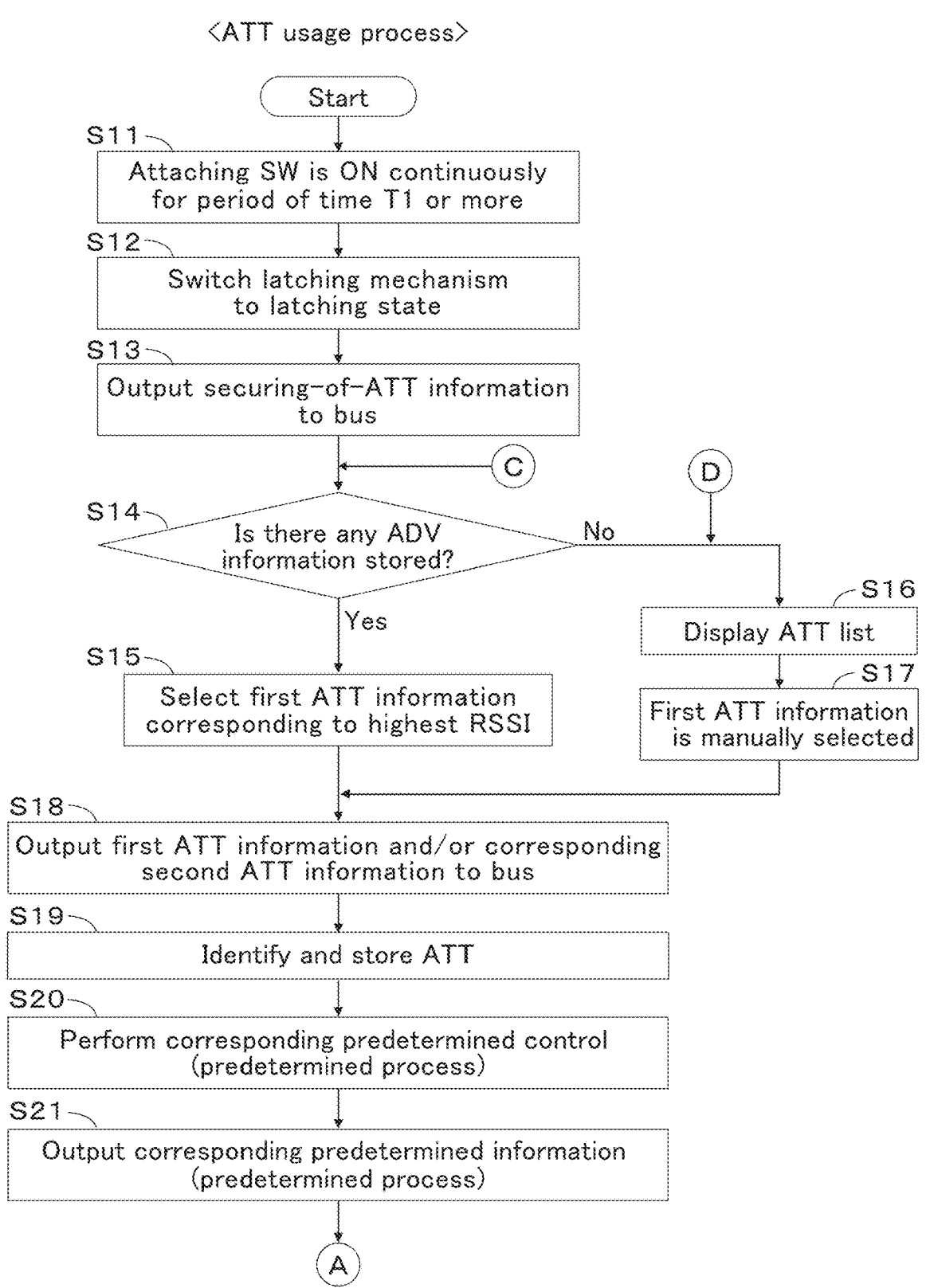
FIG. 7A is a flowchart showing an example of an attachment usage process.
Figure 7B:
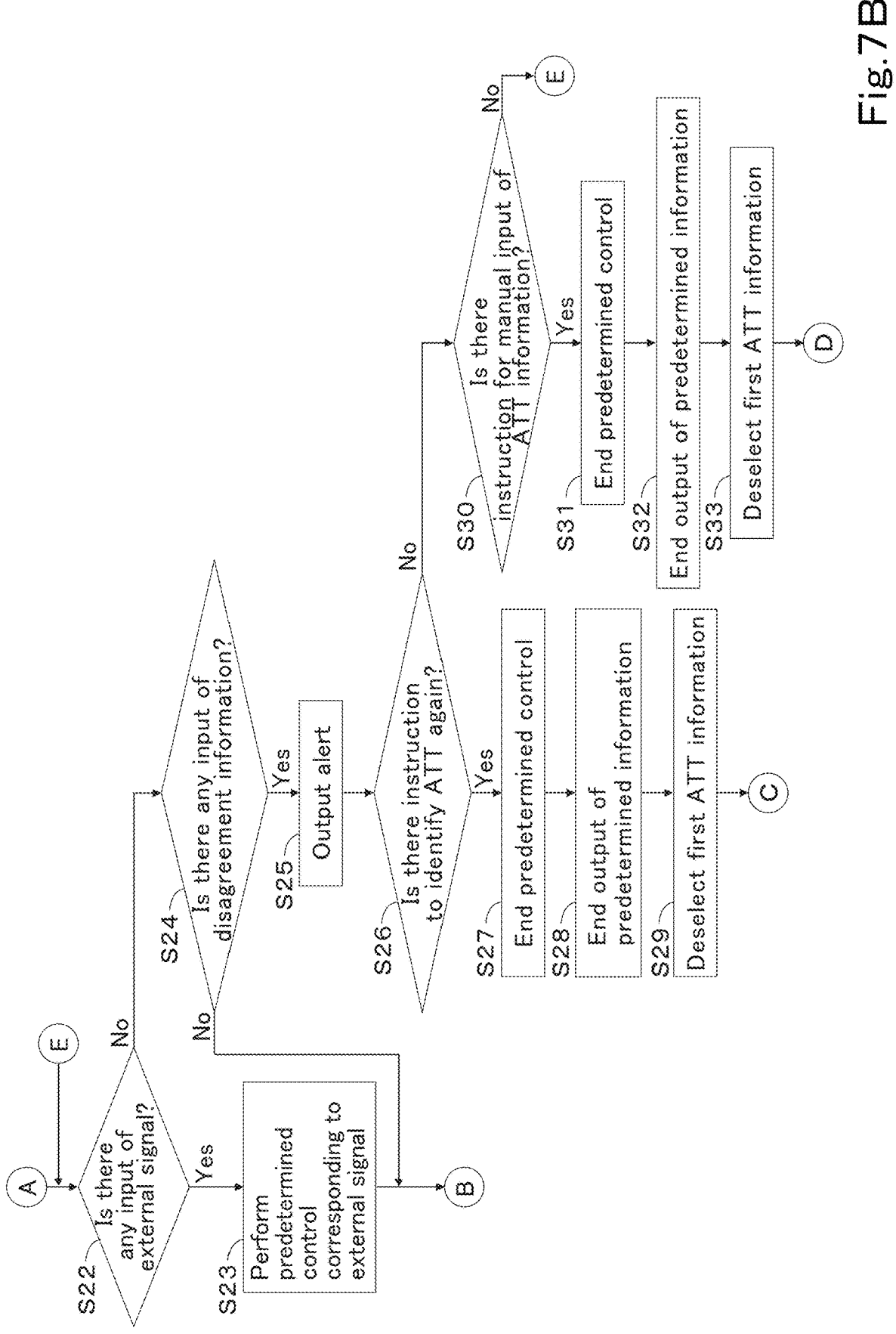
FIG. 7B is a flowchart continuing from FIG. 7A.
Figure 7C:
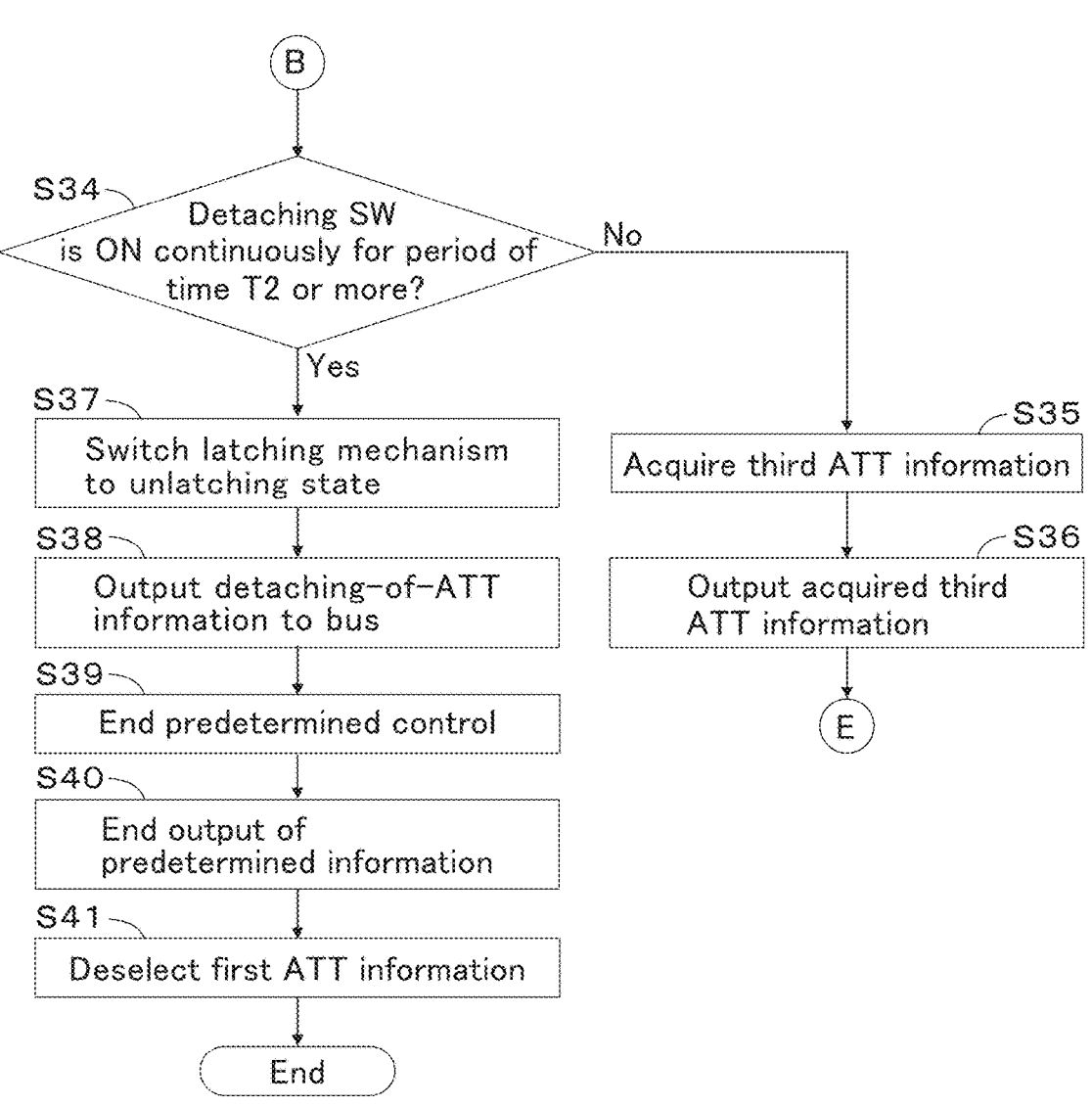
FIG. 7C is a flowchart continuing from FIG. 7B.

FIGS. 7A to 7C are a flowchart showing an example of an attachment usage process. When the controller 21 detects that the latching mechanisms 51 are in the unlatching state, if the controller 21 detects that the attaching switch 26 has been operated continuously for the predetermined period T1 or more based on a signal inputted thereto from the attaching switch 26 via the bus 48 (YES at S11 in FIG. 7A), the controller 21 causes the latch cylinder 52 to extend to a predetermined degree or more to bring the latching mechanisms 51 into the latching state (S12). With this, the attachment 30 is attached to the quick hitch 16. Accordingly, the controller 21 outputs, to the bus 48, information indicating that an attachment 30 is attached (such information may be hereinafter referred to as "securing-of-attachment information") (S13). In so doing, the controller 21 associates the securing-of-attachment information to be outputted with the identification information of the controller 21 (sender).

Then, the controller 21 determines whether or not any ADV information is stored in the internal memory 21a. In so doing, in the case where one or more pieces of ADV information are stored in the internal memory 21a (YES at S14), the controller 21 reads the stored pieces(s) of ADV information, detects the highest RSSI, and selects the first attachment information included in the ADV information corresponding to the highest RSSI (S15). Steps S14 and S15, and steps S2 and S4 shown in FIG. 6 are an example of a predetermined condition based on which first attachment information is selected.

In this manner, the controller 21 automatically selects, according to a predetermined condition, the attachment ID indicated by one of one or more ADV signals received by the beacon scanner 23 in a period of time Tm which ends when the attachment 30 is attached to the quick hitch 16.

As another example, the predetermined condition may include condition(s) relating to at least one of (i) the number of identical attachment IDs (the number of times the attachment ID has been received) stored in the internal memory 21a or (ii) the point(s) in time (receipt time point(s)) at which the signal(s) were received stored in the internal memory 21a. For example, the predetermined condition may include (i) a condition in which the attachment ID to be selected is the attachment ID most frequently stored in the internal memory 21a, (ii) a condition in which the attachment ID to be selected is the most recently received attachment ID, and/or the like. The predetermined condition may include a combination of at least two of the following: RSSI, the number of identical attachment IDs stored, and the receipt time point. Such conditions are merely examples, and the predetermined condition may include other condition(s).

On the other hand, in the case where no ADV information is stored in the internal memory 21a (NO at S14), the controller 21 causes the user interface 25 to display an attachment list L1 indicating a plurality of attachments 30 usable with the working vehicle 1 (attachable to the quick hitch 16) (S16).

FIG. 8 shows an example of the attachment list L1. The nonvolatile memory 22 stores data of the attachment list L1. The attachment list L1 includes, for example, first attachment information such as name(s), attachment ID(s), and specifications of attachments 30 which can be used with the working vehicle 1. The specifications include at least one of the product name, model number, model, type (large, small), or size (total length, total width) of an attachment 30.

At step S16 of FIG. 7A, the controller 21 reads the data of the attachment list L1 from the nonvolatile memory 22, and outputs the data to the bus 48 in order to transmit that data to the user interface 25. In so doing, the controller 21 associates the data of the attachment list L1 to be outputted with a display command, the identification information of the controller 21 which is the sender, and the identification information of the user interface 25 which is the destination. When the user interface 25 receives input of the data of the attachment list L1 via the bus 48, the user interface 25 displays the attachment list L1 on the display based on the data.

When the controller 21 causes the user interface 25 to display the attachment list L1, the controller 21 also causes the user interface 25 to display a prompt message asking for selection of the information indicating the attachment 30 attached to the quick hitch 16. The message and the attachment list L1 are an example of information requesting to input first attachment information.

The user of the working vehicle 1 such as a driver selects one of the pieces of first attachment information indicating the attachment 30 attached to the quick hitch 16 from the attachment list L1 via the user interface 25 (S17 of FIG. 7A). With this, first attachment information is manually inputted via the user interface 25, and the controller 21 accepts the inputted first attachment information. After that, the controller 21 stops displaying the attachment list L1 and/or the like (causes the attachment list L1 and/or the like to disappear).

For example, the controller 21 may cause the user interface 25 to display, in a selectable manner, icon(s) (symbol(s)) of the attachment(s) 30 which can be used with the working vehicle 1, instead of displaying the attachment list L1. Alternatively, for example, the controller 21 may cause the user interface 25 to display an input screen to receive manual input of first attachment information such as the product name of the attachment 30. When causing the user interface 25 to display the icon(s) of the attachment 30 or the input screen for first attachment information, the controller 21 may cause the user interface 25 to also display a prompt message asking for selection of the icon of the attachment 30 attached to the quick hitch 16 or input of the product name etc. of the attachment 30 attached to the quick hitch 16.

In the case where the controller 21 selects one of the pieces of first attachment information at step S15 of FIG. 7A or in the case where first attachment information is inputted at step S17, the controller 21 determines the first attachment information as the information indicating the attachment 30 attached to the quick hitch 16. Then, the controller 21 outputs the first attachment information to the bus 48 in order to transmit the first attachment information to the gateway 20 (S18).

Alternatively, at S18, the controller 21 may read second attachment information (corresponding data, control data) corresponding to the first attachment information from the nonvolatile memory 22 and/or the like based on the first attachment information, and may output the second attachment information to the bus 48. Alternatively, the controller 21 may generate, based on the selected first attachment information, second attachment information including at least a portion of the above-mentioned corresponding data and control data as well as the first attachment information, and may output the second attachment information to the bus 48.

That is, the controller 21 outputs at least one of the first attachment information or the second attachment information to the bus 48. In so doing, the controller 21 associates the attachment information (at least one of the first attachment information or the second attachment information) to be outputted with the identification information of the controller 21 which is the sender and the identification information of the gateway 20 which is the destination.

As another example, the controller 21 may output securing-of-attachment information to the bus 48 at step S18 at the same as or right before or right after when the attachment information is outputted to the bus 48. That is, step S13 may be performed at the same time as or right before or right after step S18.

The controller 21 identifies (recognizes) the attachment 30 attached to the quick hitch 16 based on the first attachment information and/or the like (at least one of the first attachment information or the second attachment information), and causes the nonvolatile memory 22 and/or the like (which may be the internal memory 21*a*) to store the result of the identification (S19 of FIG. 7B). In so doing, the controller 21 reads the ADV information (FIG. 3) corresponding to the first attachment information and/or the like from the internal memory 21*a*, and reads corresponding display data and control data (FIG. 5) from the nonvolatile memory 22. Then, the controller 21 identifies the product name, the type, the specifications and/or the like of the attached attachment 30 based on the source information included in the read ADV information, display data, and control data.

The controller 21 performs (starts) a predetermined control corresponding to the first attachment information and/or the like (predetermined process at S20). In so doing, the controller 21 performs a predetermined control for work to be performed by the attachment 30 on the working vehicle 1 based on, for example, the ADV information and control data corresponding to at least one of the first attachment information or the second attachment information.

Specifically, in the case where the controller 21 determines, based on the source information included in the ADV information corresponding to the first attachment information and/or the like, that the attached attachment 30 is an attachment 30*b* including an actuator 36, the controller 21, based on the corresponding control data, causes the control valves 40*d* and 37 to open, and starts controlling introduction and discharge of hydraulic fluid into and from the attachment 30*b* via the AUX couplers 18*a* and 18*b*. In so doing, the controller 21 may cause the user interface 25 to display a message indicating that the control of the introduction and discharge of hydraulic fluid into and from the attachment 30*b* has started.

Note that the controller 21 actually starts to output (supply) hydraulic fluid to the attachment 30*b* when the AUX output switch 29 (FIG. 1) is turned ON. When the AUX output switch 29 is turned OFF, the controller 21 stops the output of hydraulic fluid to the attachment 30*b*.

The controller 21, based on the control data corresponding to the first attachment information and/or the like, controls the traveling devices 5 and the working device 4 to perform control such as adjusting and/or limiting the moving speed of the attachment 30 (vehicle speed of the working vehicle 1), the speed stage of the working vehicle 1, the height from the ground and posture of the attachment 30, and/or the like. Note that, by controlling the height of the raised or lowered left and right booms 11, the tilt angle of the quick hitch 16, and/or the like, the controller 21 adjusts or limits the height from the ground and the posture of the attachment 30.

In the case where the controller 21 determines, based on source information included in the ADV information corresponding to the first attachment information and/or the like, that the attached attachment 30 is an attachment 30*a* including no hydraulic actuators such as the bucket 30*a*, the controller 21 does not allow hydraulic fluid to be introduced into or discharged from the attachment 30*a*. In such a case, the controller 21, based on the control data corresponding to the first attachment information and/or the like, controls the traveling devices 5 and the working device 4 to perform control such as adjusting and/or limiting the moving speed of the attachment 30, the speed stage of the working vehicle 1, the posture of the attachment 30, and/or the like.

The controller 21 causes the user interface 25 to display (output) the predetermined information corresponding to the first attachment information and/or the like (predetermined process at S21). In so doing, the controller 21 extracts predetermined information (including source information) relating to the attached attachment 30 from the ADV information and display data corresponding to the first attachment information and/or the second attachment information, and outputs the predetermined information to the bus 48 in order to transmit the predetermined information to the user interface 25. The controller 21 associates the predetermined information of the attachment 30 to be outputted with a display command, the identification information of the controller 21 which is the sender, and the identification information of the user interface 25 which is the destination. When the predetermined information of the attachment 30 is inputted thereto via the bus 48, the user interface 25 displays the predetermined information on the monitor screen G1 of the display.

Figure 9A:
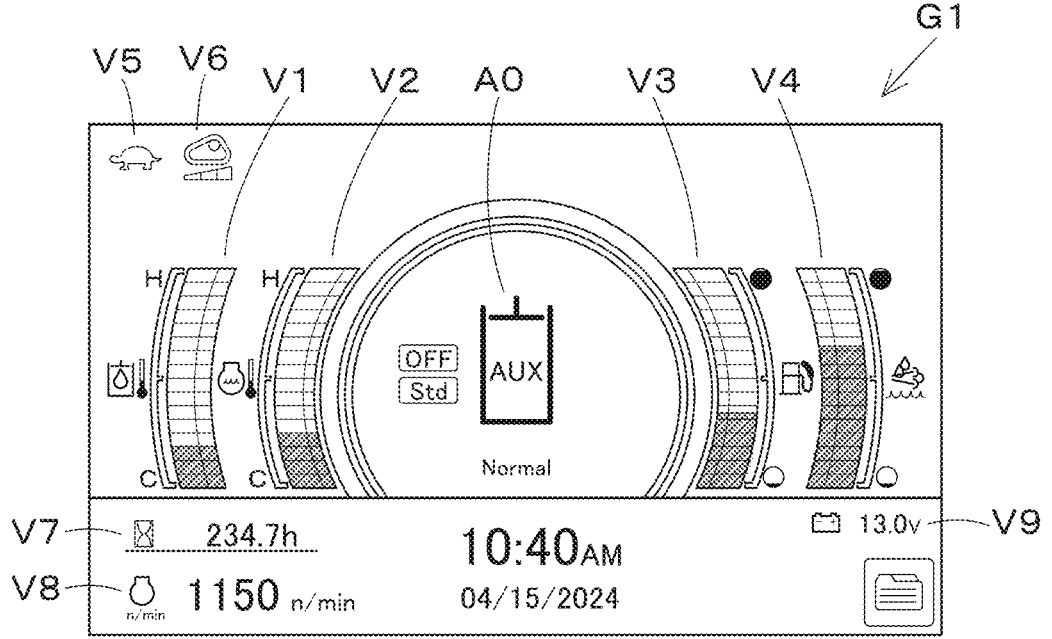
FIG. 9A illustrates an example of a monitor screen before an attachment is attached.
Figure 9B:
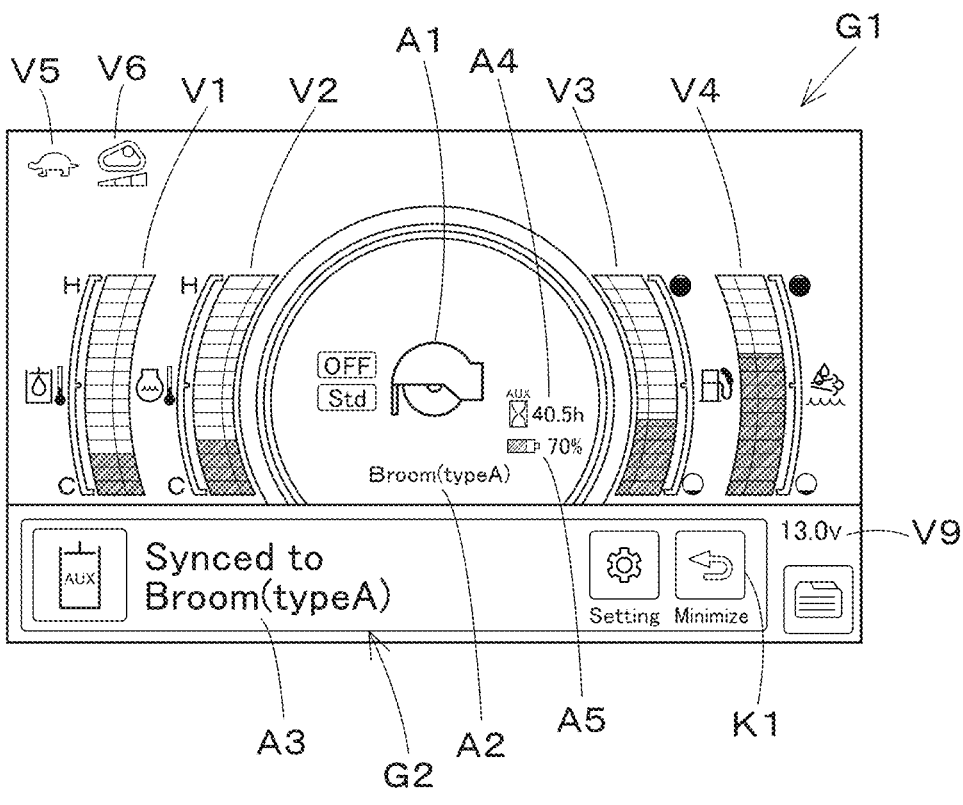
FIG. 9B illustrates an example of a monitor screen displaying predetermined information relating to an attachment.

FIGS. 9A and 9B illustrate examples of the monitor screen G1 displayed by the user interface 25. While the working vehicle 1 is in operation, the controller 21 causes the user interface 25 to display the monitor screen G1. At step S16 in FIG. 7A, the controller 21 causes the attachment list L1 (FIG. 8) to be displayed on the monitor screen G1 in a pop-up manner.

As illustrated in FIG. 9A, the controller 21 causes the monitor screen G1 to display information relating to the state of the working vehicle 1 detected by sensors included in the sensor unit 49 of the working vehicle 1 and the current date and time etc. The information relating to the state of the working vehicle 1 includes the temperature V1 of the hydraulic fluid, the temperature V2 of cooling water, the remaining amount V3 of fuel, the remaining amount V4 of aqueous urea solution, the stage V5 of vehicle speed, the magnitude of the load V6 on the traveling devices 5, an hour meter V7 (operating time) of the working vehicle 1, the rotation speed V8 of the prime mover 9 (engine), and the battery voltage V9.

When the latching mechanisms 51 are in the unlatching state and the attachment 30 is not attached to the quick hitch 16, as shown in FIG. 9A, in order to indicate that the central portion of the monitor screen G1 is a display area for the information relating to the attachment 30 which is an auxiliary hydraulic device, the controller 21 displays a default icon A0 in the central portion.

After the latching mechanisms 51 enter the latching state and the attachment 30 is attached to the quick hitch 16, the controller 21 performs step S21 in FIG. 7A, to cause the monitor screen G1 to display predetermined information based on the first attachment information and/or the like as shown in FIG. 9B.

In the example in FIG. 9B, the predetermined information relating to the attachment 30 include an icon A1 representing the attachment 30 corresponding to the first attachment information selected by the controller 21 at step S15 in FIG. 7A, product name A2, information A3, operating information A4, and battery information A5, which are displayed on the monitor screen G1. More specifically, since the attachment 30 identified is an angle broom, the icon A1 of the angle broom and the product name A2 "Broom (type A)" of the angle broom are displayed on the monitor screen G1. Furthermore, the message A3 "Synced to Broom (type A)" indicating that the controller 21 (working vehicle 1) is synchronized with the angle broom (attachment 30), the hour meter A4 indicating the operating time of the beacon transmitter 33 and the attachment 30, and the charge level meter A5 indicating the remaining charge level of the battery 33e of the beacon transmitter 33 are displayed on the monitor screen G1.

Note that at step S17 of FIG. 7A, in the case where first attachment information is inputted by the driver or the like, the controller 21 causes the monitor screen G1 to display the icon A1 and the product name A2 of the attachment 30 and the message A3 as the predetermined information of the attachment 30.

The driver or the like (user) of the working vehicle 1 visually recognizes the information A1 to A5 (or A1 to A3) relating to the attachment 30 displayed on the monitor screen G1 to know the type of the attachment 30 automatically identified (recognized) by the working vehicle 1 and the status (operating time, battery charge level) of the attachment 30 and the beacon transmitter 33.

Of the information A1 to A5 relating to the attachment 30, the message A3, the hour meter A4 of the attachment 30 etc., and the charge level meter A5 of the battery 33e are displayed in a pop-up window G2. When a certain period of time has passed since the pop-up window G2 was displayed or if a Minimize key K1 in the pop-up window G2 is tapped on, the controller 21 stops displaying the pop-up window G2 (causes the pop-up window G2 to disappear) and display information such as the date and time, the hour meter V7 of the working vehicle 1, the rotation speed V8 of the prime mover 9, and the battery voltage V9, etc. which were hidden by the pop-up window G2 (see FIG. 9A).

As shown in FIG. 9B, after the pieces of information A1 to A5 relating to the attachment 30 start to be displayed on the monitor screen G1, the user turns on the AUX output switch 29 or an AUX activation switch, which is located in proximity to the seat 8. With this, the controller 21 changes the "OFF" displayed at the center of the monitor screen G1 into "ON", and highlights the icon A1 displayed. In so doing, the controller 21 may start the predetermined control at step S20 in FIG. 7A mentioned earlier.

Information relating to the attachment 30 other than the previously mentioned pieces of information A1 to A5, etc. may be displayed on the monitor screen G1. For example, the controller 21 may cause the monitor screen G1 to display the name, nickname, model number, the type (model) and other specifications of the attachment 30 corresponding to the first attachment information and/or the like. Additionally or alternatively, the controller 21 may cause the monitor screen G1 to display at least one of information relating to the beacon transmitter 33 corresponding to the first attachment information and/or the like (the product name, model number, specifications, etc. of the beacon transmitter 33) or information relating to the actuator 36 (the product name, model number, type (model), etc., of the actuator 36).

Additionally or alternatively, the controller 21 may cause the communication controller 24 (FIG. 1) to transmit predetermined information relating to the attachment 30 corresponding to the first attachment information and/or the like to the external computer 80, and cause the display (user interface) corresponding to the external computer 80 to display the monitor screen G1, and cause the monitor screen G1 to display information relating to the attachment 30 and/or the like.

The controller 21 may perform steps S14 and S15 to select first attachment information when, after the attaching switch 26 has been operated continuously for the predetermined period of time T1 or more (YES at S11 in FIG. 7A), at least one of the traveling devices 5 or the working device 4 is in action. In such a case, if, for example, the controller 21 detects that at least one of the travel operator 6 or the work operator 7 has been continuously operated for a certain period of time or more, the controller 21 determines that at least one of the traveling devices 5 or the working device 4 is in action.

As another example, the controller 21 may detect whether the traveling devices 5 and the working device 4 are each in action based on output signal(s) from sensor(s) such as inertial measurement unit(s), acceleration sensor(s) and/or potentiometer(s) in or on the vehicle body 2, the working device 4, and/or the quick hitch 16.

The controller 21 may be configured or programmed to (i) select, as candidate(s), piece(s) of first attachment information indicated by one or more ADV signals Q1 received by the beacon scanner 23 during a first duration, i.e., a predetermined period of time which ends when the attaching switch 26 has been operated continuously for a predetermined period of time T1 or more (step S11 in FIG. 7A) and/or a second duration, i.e., a predetermined period of time which starts when the attaching switch 26 has been operated continuously for a predetermined period of time T1 or more (step S11 in FIG. 7A), and (ii) select a piece of first attachment information from the candidate(s).

For example, the gateway 20 determines whether an external signal inputted thereto via the AUX connector 19 and the like from an accessory electronic device 35 of the attachment 30*b* agrees with the attachment corresponding to the first attachment information or not (agreement/disagreement), based on the first attachment information and/or the like (at least one of the first attachment information or the second attachment information) outputted to the bus 48 from the controller 21 at step S18 in FIG. 7A.

Figure 10:
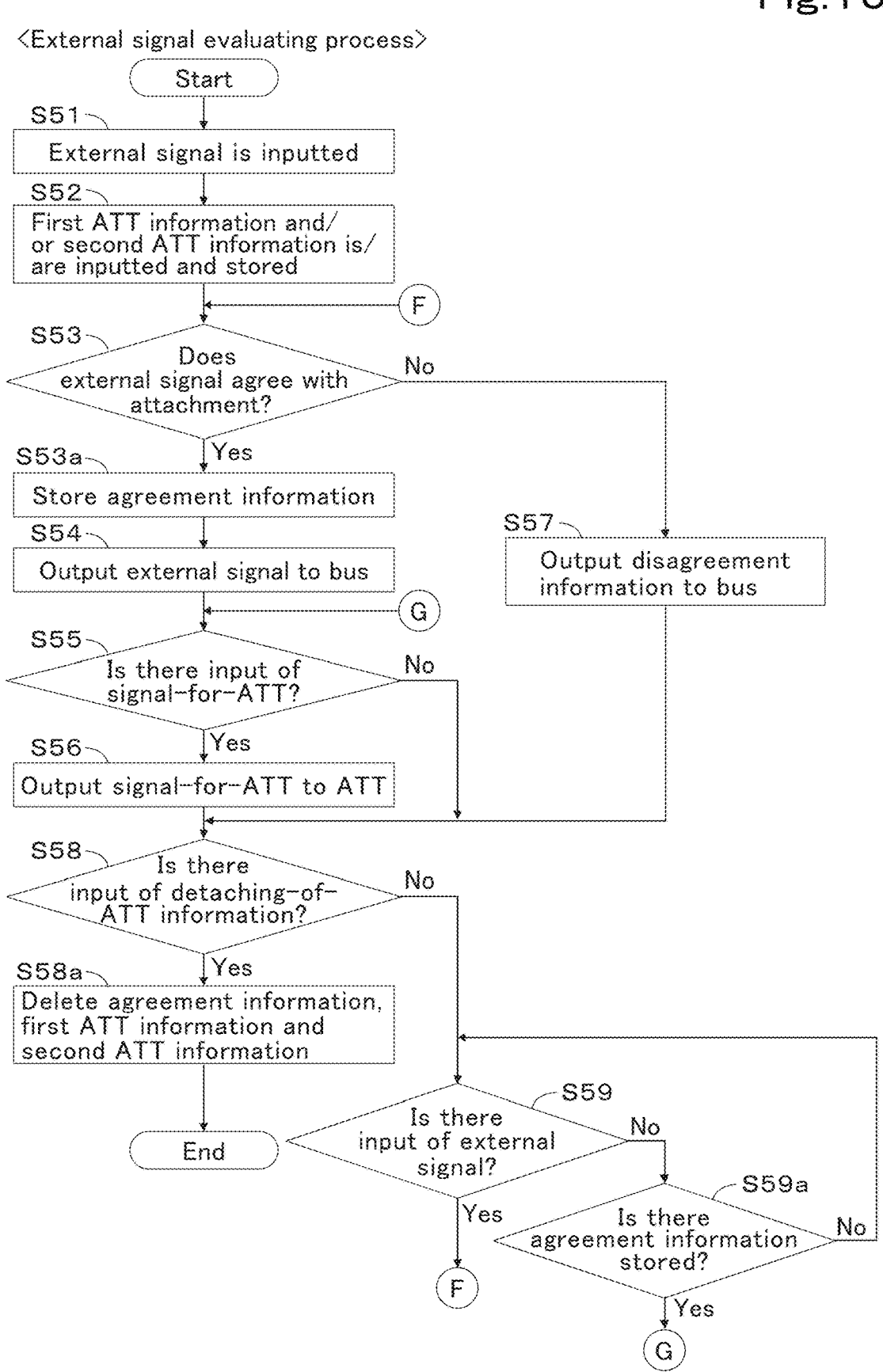
FIG. 10 is a flowchart showing an example of an external signal evaluating process.

FIG. 10 is a flowchart showing an example of an external signal evaluating process. The steps of the external signal evaluating process shown in FIG. 10 are performed by the processor(s) of the gateway 20 repeatedly based on software program(s) stored in advance in a memory.

After the connector 39 of the attachment 30*b* including the accessory electronic device 35 and the AUX connector 19 of the working vehicle 1 are connected by the electric harness 69, a signal is outputted from the accessory electronic device 35 such as a sensor. When an external signal from the accessory electronic device 35 is inputted via the AUX connector 19 and the like (S51) and first attachment information and/or the like from the controller 21 is inputted via the bus 48 (S52), the gateway 20 determines whether or not the external signal agrees with the attachment 30 corresponding to the first attachment information. The gateway 20 causes the internal memory to store the first attachment information and/or the like (at least one of the first attachment information or the second attachment information) inputted thereto from the controller 21 via the bus 48 (S52).

For example, in the case where the identification information such as the attachment ID included in the first attachment information is specific identification information indicating an attachment 30*a* such as a bucket with no accessory electronic devices 35, the gateway 20 determines that the external signal does not agree with the attachment 30 corresponding to the first attachment information (NO at S53). The controller 21 makes such a determination because no external signals are inputted from the attachment 30 including no accessory electronic devices 35. Such a situation occurs because of (1) an unintended connection of the attachment 30 to the AUX connector 19, (2) accidental reception of first attachment information by the beacon scanner 23, (3) accidental input of first attachment information via the user interface 25, and/or the like.

The reason (1) indicates that, for example, an attachment 30 different from the attachment 30 corresponding to the first attachment information inputted via the beacon scanner 23 or the user interface 25 is accidentally connected to the AUX connector 19.

The reason (2) indicates that, for example, the battery 33*e* of the beacon transmitter 33 in or on the attachment 30 attached to the quick hitch 16 is running out or the ADV signal Q1 from the beacon transmitter 33 is blocked and therefore the ADV signal Q1 from the beacon transmitter 33 is not received by the beacon scanner 23 but an ADV signal Q1 from a beacon transmitter 33 in or on an attachment 30 not attached to the quick hitch 16 is accidentally received by the beacon scanner 23. The reason (3) indicates that the driver or the like accidentally inputs the first attachment information of an attachment 30 not attached to the quick hitch 16.

The gateway 20 may be configured or programmed to, in the case where the identification information included in the first attachment information is not the specific identification information indicating an attachment 30*a* with no accessory electronic devices 35, determine that the external signal agrees with the attachment 30 corresponding to the first attachment information (YES at S53).

Alternatively, the gateway 20 may be configured or programmed to check the identification information of the accessory electronic device 35 included in the second attachment information corresponding to the first attachment information against the identification information of the accessory electronic device 35 indicated by the external signal, and, if the former identification information and the latter identification information correspond to each other (indicate the same accessory electronic device 35), determine that the external signal agrees with the attachment 30 corresponding to the first attachment information (YES at S53). The gateway 20 is configured or programmed to, for example, if the identification information of the accessory electronic devices 35 included in the second attachment information does not correspond to the identification information of the accessory electronic devices 35 indicated by the external signal (the two do not indicate the same accessory electronic devices 35), determine that the external signal does not agree with the attachment 30 corresponding to the first attachment information (NO at S53). Such a situation occurs also because of the above-mentioned (1) to (3), etc.

Alternatively, the gateway 20 may be configured or programmed to check the identification information of the attachment 30 included in the first attachment information or in its corresponding second attachment information against the identification information of the attachment 30 indicated by the external signal, and, if these pieces of identification information correspond to each other (indicate the same attachment 30), determine that the external signal agrees with the attachment 30 corresponding to the first attachment information (YES at S53). The gateway 20 is configured or programmed to, for example, if the identification information of the attachment 30 included in the first attachment information or the second attachment information and the identification information of the attachment 30 indicated by the external signal do not correspond to each other (do not indicate the same attachment 30), determine that the external signal does not agree with the attachment 30 corresponding to the first attachment information (NO at S53).

The gateway 20 detects at least one piece of characteristics information, i.e., at least one of (i) the electric current value or the voltage value of the external signal, (ii) the type of information (information outputted by the accessory electronic device 35) indicated by the external signal, or (iii) the number assigned to the communication terminal 19c which received input of the external signal. Furthermore, the gateway 20 extracts at least one characteristics information, i.e., at least one of (i) the range (specified range) of the electric current value or the voltage value of the output signal from the accessory electronic device 35, (ii) the type of information outputted by the accessory electronic device 35, or (iii) the number assigned to the communication terminal 19c of the AUX connector 19 connected to the accessory electronic device 35, indicated in the specifications of the accessory electronic device 35 included in the second attachment information.

The gateway 20 may be configured or programmed to then check the characteristics information detected from the external signal against the characteristics information extracted from the second attachment information, and, if these pieces of characteristic information correspond to each other (if the checked types of information are the same and/or the checked numbers assigned to the communication terminals 19c are the same, and/or if the checked electric current values or voltage values are within the specified range), and determine that the external signal agrees with the attachment 30 corresponding to the first attachment information (YES at S53).

The gateway 20 may be configured or programmed to, if the characteristics information detected from the external signal and the characteristic information extracted from the second attachment information do not correspond to each other (if the checked types of information are the same and/or the checked numbers assigned to the communication terminal 19c are not the same, and/or if the checked electric current values or voltage values are not within the specified range), determine that the external signal does not agree with the attachment 30 corresponding to the first attachment information (NO at S53). Such a situation occurs also because of the above-mentioned (1) to (3), etc.

Furthermore, the electric current value or voltage value of the external signal may be an unexpected value (for example, 0 (zero) or the like) for reason(s) such as (4) breakage or short circuiting of an electric line from the accessory electronic devices 35 to the gateway 20 and/or (5) failure of the accessory electronic devices 35. In the case where the electric current value or the voltage value of the external signal is an unexpected value, the gateway 20 determines that the external signal does not agree with the attachment 30 corresponding to the first attachment information (NO at S53).

As described above, the gateway 20 determines whether or not the external signal agrees with the attachment 30 corresponding to the first attachment information based on (i) at least one of the first attachment information or the second attachment information, (ii) the external signal from the AUX connector 19, and (ii) the information indicated by the external signal. The above-described logic of determining whether the external signal agrees with the attachment is an example, and this does not imply any limitation. A logic other than the above described logic may be used to determine whether the external signal agrees with the attachment.

In the case where the gateway 20 determines that the external signal agrees with the attachment 30 corresponding to the first attachment information (YES at S53), the gateway 20 causes the internal memory to store agreement information indicating the result of the determining (S53a), and outputs that external signal to the bus 48 to transmit the external signal to the controller 21 (S54). After that, for example, an output signal for the attachment 30b (accessory electronic device 35), which is a signal-for-ATT, is outputted to the bus 48 from the controller 21, the sensor unit 49, the switch unit SU, and/or the like. When the signal-for-ATT is inputted into the gateway 20 (YES at S55), the gateway 20 outputs the signal-for-ATT to the attachment 30b (accessory electronic device 35) via the AUX connector 19 and the like (S56).

In the case where the gateway 20 determines that the external signal does not agree with the attachment 30 corresponding to the first attachment information (NO at S53), the gateway 20 does not output the external signal to the bus 48, and outputs disagreement information indicating that the external signal does not agree with the first attachment information to the bus 48 (S57). In such a case, even if the signal-for-ATT is outputted afterward from the controller 21 and/or the like to the bus 48, the gateway 20 does not output the signal-for-ATT to the attachment 30b via the AUX connector 19 and the like.

Even if an external signal is inputted from the attachment 30b (accessory electronic device 35) (YES at S51), while the first attachment information and/or the like is not inputted from the controller 21 via the bus 48, the gateway 20 does not output the external signal to the bus 48 and does not output the signal-for-ATT to the attachment 30b from the controller 21 and/or the like.

After NO is determined at step S55 (NO at S55), after step S56, or after step S57, if detaching-of-attachment information is not inputted via the bus 48 (NO at S58), the gateway 20 determines whether or not an external signal has been inputted from the AUX connector 19. Then, in the case where an external signal is inputted (YES at S59), the gateway 20 repeats step S53 and subsequent steps as described earlier.

In the case where no external signals are inputted (NO at S59), if agreement information is already stored in the internal memory (YES at S59a), the gateway 20 accepts the signal-for-ATT from the controller 21 and/or the like, and repeats step S55 and subsequent steps. If no agreement information is stored (NO at S59a), the gateway 20 repeats step S59 and subsequent steps.

After that, when the detaching-of-attachment information is inputted via the bus 48 (YES at S58), the gateway 20 deletes, from the internal memory, the first attachment information and/or the like (at least one of the first attachment information or the second attachment information stored at step S52) and information indicating the result of determining whether the external signal agrees with the attachment (agreement information stored at step S53a) (S58a).

With this, from this point on, even if an external signal is inputted, since there is no first attachment information and/or the like used to determine whether or not the external signal agrees with the attachment, the gateway 20 does not output the external signal to the bus 48. That is, the gateway 20 does not output an external signal to the bus 48 after the following are performed. The attaching switch 26 is operated to attach the attachment 30 to the quick hitch 16, the first attachment information and/or the like is inputted, then an external signal is outputted from the gateway 20 to the bus 48, and the detaching switch 27 is operated to detach the attachment 30 from the quick hitch 16.

Note that, after step S58a, the gateway 20 repeats step S51 and subsequent steps. Thus, in the case where an external signal and first attachment information and/or the like are inputted (S51 and S52), the gateway 20 determines whether the external signal agrees with the attachment, and, if the gateway 20 determines again that the external signal agrees with the attachment (YES at S53), the gateway 20 outputs the external signal to the bus 48 (S54).

When the external signal is inputted from the gateway 20 via the bus 48 (YES at S22 in FIG. 7B), the controller 21 performs control corresponding to the external signal (S23). In so doing, for example, the controller 21 detects at least one of the flow rate or the pressure of hydraulic fluid supplied from the control valve 37 to the actuator 36 based on the detector signal from sensor(s) (flow rate sensor, pressure sensor) indicated by the external signal, and controls the opening(s) of at least one of the control valve 40d or the control valve 37 based on the result of the detection.

More specifically, the controller 21, for example, compares at least one of the detected flow rate or the detected pressure of hydraulic fluid detected by the sensor(s) with the standard level of at least one of the supply amount or the supply pressure of hydraulic fluid to the attachment 30 included in the control data read from the nonvolatile memory 22 at step S19 in FIG. 7A. Then, the controller 21 controls the opening of at least one of the control valve 40d or the control valve 37 so that hydraulic fluid is supplied to the actuator 36 from the control valve 37 at that standard level(s).

Furthermore, at step S23, for example, the controller 21 detects at least one of the actual posture, acceleration, or moving speed of the attachment 30b based on detection signal(s) from sensor(s) (inertial measurement unit, inertial sensor) indicated by the external signal, controls at least one of the traveling devices 5 or the working device 4 based on the result of the detection, and adjusts at least one of the posture, the acceleration, or the moving speed of the actuator 36. Specifically, the controller 21 controls at least one of the traveling devices 5 or the working device 4 so that, for example, the actual posture of the attachment 30 and/or the like match the posture of the attachment 30 and/or the like included in the control data.

Note that the controller 21 controls at least one of the control valves 40a to 40c, the traveling devices 5, or the working device 4 also based on detection signal(s) from the sensors 49a to 49e and other sensor(s) included in the sensor unit 49, as needed.

Figure 9C:
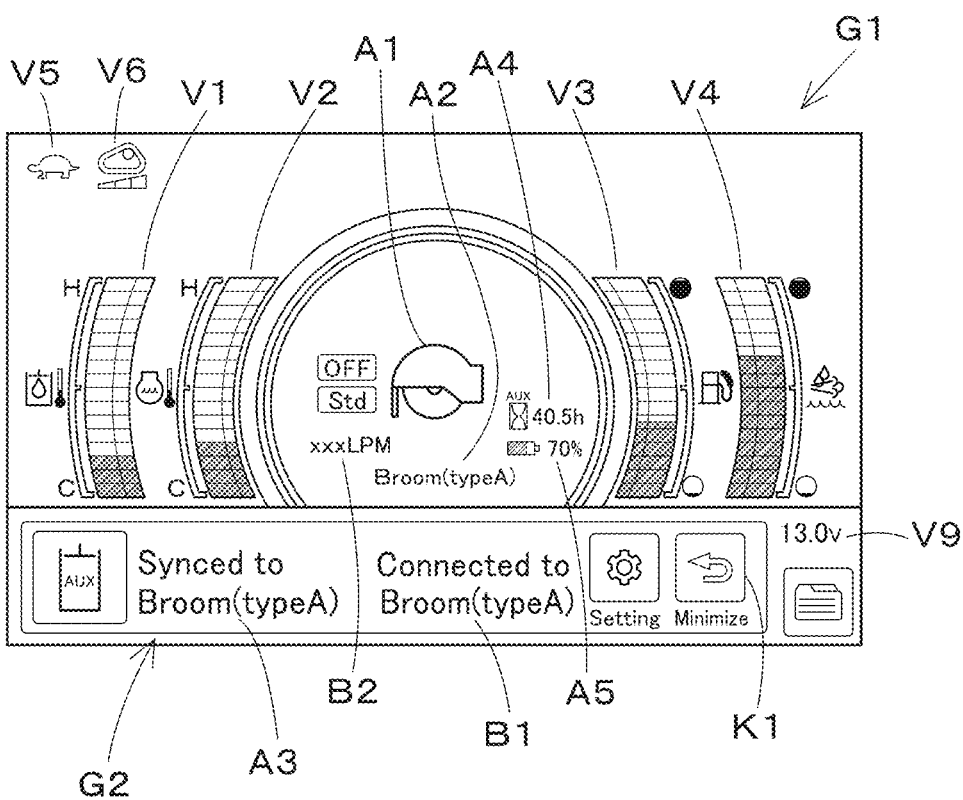
FIG. 9C illustrates an example of a monitor screen displaying information corresponding to external signal(s).

At step S23, the controller 21 may cause the user interface 25 to display (output) information based on the external signal. For example, as shown in FIG. 9C, the controller 21 causes the user interface 25 to display, on the monitor screen G1, information B1 ("Connected to Broom (type A)" in FIG. 9C) indicating that the attachment 30 (30b) corresponding to the external signal is connected in a wired manner. In such a case, the controller 21 may extract identification information such as the product name of the attachment 30 corresponding to the external signal from the external signal, or may use the identification information such as the product name of the attachment 30 already identified at step S19 in FIG. 7A.

The controller 21 causes the user interface 25 to display, on the monitor screen G1, information B2 such as the detection value(s) from the sensor(s) and/or the like indicated by the external signal as shown in FIG. 9C. In the example shown in FIG. 9C, the information B2 indicated by the external signal displayed on the monitor screen G1 includes the supply flow rate of hydraulic fluid to the actuator 36 detected by the sensor(s) in or on the attachment 30b. The information B2 indicated by the external signal displayed on the monitor screen G1 by the controller 21 and the user interface 25 may include, in addition to or instead of the information described above, at least one of the supply pressure of hydraulic fluid supplied to the actuator 36, the drive speed of the actuator 36 (rotation speed of the hydraulic motor and/or the like), or the posture (tilts around three axes) of the attachment 30 detected by the sensor(s) in or on the attachment 30b, as well as the temperature of hydraulic fluid and/or the outside air temperature.

On the other hand, if the external signal is not inputted via the bus 48 from the gateway 20 (NO at S22) and disagreement information is inputted (YES at S24), the controller 21 causes the user interface 25 to output an alert (S25). In so doing, the controller 21 causes the user interface 25 to display, on the monitor screen G1, for example, an error message (alert) indicating that the external signal inputted from the AUX connector 19 does not agree with the attachment, in a pop-up manner.

At step S25, the controller 21 may cause the monitor screen G1 to display a message asking for confirmation of at least one of the attachment 30 attached to the quick hitch 16, the attachment 30 connected to the AUX connector 19, or the first attachment information inputted via the user interface 25. The controller 21 may cause the monitor screen G1 to display a message indicating that the electric harness 69 and/or the like may be broken.

The driver or the like who recognized the alert outputted at step S25 checks the attachment 30 attached to the quick hitch 16 and, for example, inputs an instruction to identify (synchronize) the attachment 30 again (a retry instruction) using the user interface 25 (YES at S26). In such a case, the controller 21 ends the predetermined control corresponding to the currently selected first attachment information and/or the like (S27). In so doing, for example, in the case where the controller 21 is currently controlling the output of hydraulic fluid to the attachment 30 (started at step S20), the controller 21 stops the output control. With this, the hydraulic fluid is not outputted anymore from the working vehicle 1 to the attachment 30.

The controller 21 stops displaying the information about the attachment 30 on the monitor screen G1 as shown in FIG. 9B (started at step S21) (S28). That is, the controller 21 causes the user interface 25 to stop displaying the pieces of information A1 to A5 on the monitor screen G1 (cause the pieces of information A1 to A5 to disappear from the monitor screen G1), and stops the synchronization with the attachment 30.

Furthermore, the controller 21 deselects the first attachment information (performs resetting) (S29), so that no attachment information is selected. In so doing, the controller 21 may delete the information about the result of identification of the attachment 30 from the nonvolatile memory 22, and may store the information as history in another storage area of the nonvolatile memory 22. Then, the controller 21 repeats step S14 and subsequent steps in FIG. 7A. With this, the selection of first attachment information and the identification (synchronization) of an attachment 30 are performed again.

In the case where, for example, the driver or the like inputs an instruction for re-input of first attachment information via the user interface 25 (YES at S30), the controller 21 ends the predetermined control corresponding to the currently selected first attachment information and/or the like similarly to steps S27 to S29 (S31), stops displaying information about the attachment 30 (S32), and deselects the first attachment information (S33). Then, the controller 21 repeats step S16 and subsequent steps in FIG. 7A. With this, the input of first attachment information via the user interface 25 and the identification (synchronization) of an attachment 30 are performed again.

The controller 21 may stop outputting the alert which started to be outputted at step S25, after a predetermined period of time has passed. Alternatively, the controller 21 may stop outputting the alert which started to be outputted at step S25, when the controller 21 selects the first attachment information at step S15 of FIG. 7A after step S29 of FIG. 7B or when the first attachment information is manually selected at step S17 of FIG. 7A after step S33 of FIG. 7B.

If an instruction to perform the identification of an attachment 30 again and an instruction for re-input of first attachment information are not inputted (NO at S26, NO at S30 of FIG. 7B), the controller 21 repeats step S22 and subsequent steps.

After step S23 of FIG. 7B is performed or after the controller 21 detects that no disagreement information is inputted at step S24 (NO at S24), the controller 21 detects, for example, that the detaching switch 27 has not been operated continuously for a predetermined period of time T2 or more (NO at S34 of FIG. 7C). In such a case, the controller 21 acquires third attachment information relating to the attachment 30 corresponding to the first attachment information from at least one of the in-vehicle electronic devices such as the sensor unit 49, the switch unit SU and the position detector 43, or the accessory electronic device 35, via the bus 48 and/or the like (S35).

Then, the controller 21 outputs the acquired third attachment information to the bus 48 to transmit the acquired third attachment information to the communication controller 24 (S36). In so doing, the controller 21 associates the third attachment information to be outputted with the identification information of the controller 21 which is the sender and the identification information of the communication controller 24 which is the destination. After step S36, the controller 21 repeats step S22 and subsequent steps in FIG. 7B.

Note that, even if the external signal is not inputted via the bus 48 (NO at S22 of FIG. 7B), the controller 21 may acquire the third attachment information via the bus 48 from in-vehicle electronic device(s) such as the sensor unit 49, the switch unit SU, and/or the position detector 43 and output the acquired third attachment information to the communication controller 24 via the bus 48.

After that, the driver or the like operates the detaching switch 27 continuously for a predetermined period of time T2 or more in order to detach the attachment 30 from the quick hitch 16. When the controller 21 detects that the detaching switch 27 has been continuously operated for a predetermined period of time T2 or more based on the signal inputted from the detaching switch 27 via the bus 48 (YES at S34 of FIG. 7C), the controller 21 causes the latch cylinder 52 to retract to bring the latching mechanisms 51 into the unlatching state (S37). With this, the attachment 30 is not secured to the quick hitch 16 anymore, and is detachable from the quick hitch 16. Thus, the controller 21 outputs detaching-of-attachment information indicating that the attachment 30 is detachable to the bus 48 (S38). In so doing, the controller 21 associates the securing-of-attachment information to be outputted with the identification information of the controller 21 which is the sender.

Then, similarly to the foregoing steps S27 to S29 of FIG. 7B, the controller 21 ends the predetermined control corresponding to the currently selected first attachment information and/or the like (S39), stops displaying the information about the attachment 30 (S40), and deselects the first attachment information (S41).

Figure 11:
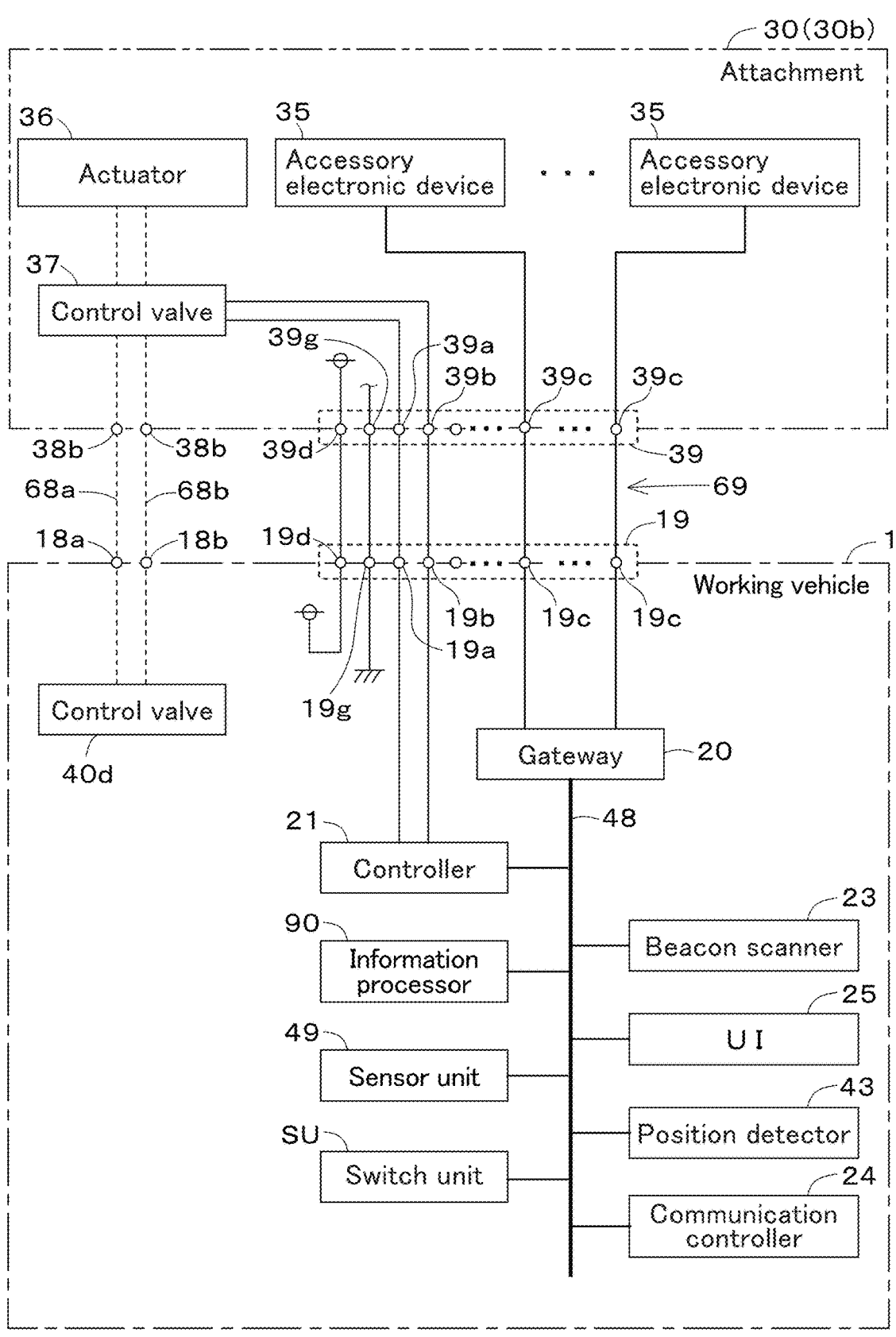
FIG. 11 illustrates another example of the manner in which electronic devices in or on a working vehicle and an attachment are connected.

The above description of example embodiments discusses an example in which the gateway 20 determines whether or not an external signal inputted thereto from the AUX connector 19 agrees with the attachment. However, alternatively, some other information processor including a processor, such as the controller 21 and/or the beacon scanner 23, may be configured or programmed to determine whether the external signal agrees with the attachment. As shown in FIG. 11, the working vehicle 1 may include an information processor 90 differing from the gateway 20, the controller 21, and the beacon scanner 23, and the information processor 90 may be configured or programmed to determine whether the external signal agrees with the attachment. The information processor 90 may include a vehicle controller (electronic control unit).

In the above-mentioned case, for example, when an external signal is inputted from the AUX connector 19, the gateway 20 may output (transmit) information indicating that an external signal has been inputted, to the controller 21 and/or the like (the controller 21, the beacon scanner 23, the information processor 90, and/or the like) via the bus 48 or via a bus or an electric line differing from the bus 48.

In such a case, when information indicating that an external signal has been inputted is inputted from the gateway 20, the controller 21 and/or the like checks the identification information of the attachment 30 included in the first attachment information and/or the like (which may be the second attachment information). Then, in the case where the identification information included in the first attachment information and/or the like is specific identification information indicating an attachment 30a such as a bucket with no accessory electronic devices 35, the controller 21 and/or the like determines that the external signal does not agree with the attachment 30 corresponding to the first attachment information. In the case where the identification information included in the first attachment information and/or the like is specific identification information indicating an attachment 30b with accessory electronic device(s) 35, the controller 21 and/or the like determines that the external signal agrees with the attachment 30 corresponding to the first attachment information.

Alternatively, the gateway 20 may read the information indicated by the external signal inputted from the AUX connector 19, and output, to the controller 21 and/or the like via the bus 48 and/or the like (bus 48 or a bus or electric line different from the bus 48), the identification information of at least one of the accessory electronic device 35 which outputted the external signal or the attachment 30b in or on which the accessory electronic device 35 is provided, of the read information. In such a case, the controller 21 and/or the like reads the identification information of at least one of the attachment 30 corresponding to the first attachment information or the accessory electronic device 35 in or on the attachment 30 from the acquired first attachment information and/or the like.

Note that the beacon scanner 23 may acquire the second attachment information corresponding to the first attachment information from the controller 21 via the bus 48. The information processor 90 may acquire at least one of the first attachment information or the second attachment information from the controller 21 via the bus 48.

Then, the controller 21 and/or the like determines whether or not the external signal agrees with the attachment 30 corresponding to the first attachment information based on the identification information of at least one of the attachment 30 or the accessory electronic device 35 inputted thereto from the gateway 20 and based on the identification information of at least one of the attachment 30 or the accessory electronic device 35 read from the first attachment information and/or the like.

For example, in the case where the identification information from the gateway 20 and the identification information read from the first attachment information and/or the like correspond to each other (indicate the same accessory electronic device 35 or attachment 30), the controller 21 and/or the like determines that the external signal agrees with the attachment 30 corresponding to the first attachment information. In the case where the identification information from the gateway 20 and the identification information included in the first attachment information do not correspond to each other (do not indicate the same accessory electronic device 35 or attachment 30), the controller 21 and/or the like determines that the external signal does not agree with the attachment 30 corresponding to the first attachment information.

The method in which the controller 21 and/or the like determines whether or not an external signal agrees with the attachment as described above is an example, and the controller 21 and/or the like may determine whether or not an external signal agrees with the attachment using other methods and information. The controller 21 and/or the like may determine whether or not an external signal agrees with the attachment in the same manner as the gateway 20 determining whether or not an external signal agrees with the attachment as described earlier.

When the controller 21 and/or the like determines that the external signal does not agree with the attachment 30 corresponding to the first attachment information, the controller 21 and/or the like outputs disagreement information indicating the result of the determining to the gateway 20 via the bus 48 and/or the like. When the controller 21 and/or the like determines that the external signal agrees with the attachment 30 corresponding to the first attachment information, the controller 21 and/or the like outputs agreement information indicating the result of the determining to the bus 48.

When the gateway 20 receives input of the disagreement information from the controller 21 and/or the like, the gateway 20 does not output information indicated by the external signal to the bus 48. When the gateway 20 receives input of the agreement information from the controller 21 and/or the like, the gateway 20 outputs at least the state information indicating the state of the attachment 30b indicated by the external signal to the bus 48. Note that the state information about the attachment 30b is information for the controller 21 to perform control corresponding to the external signal, and includes, for example, information indicating at least one of (i) the position and/or the posture of the attachment 30b detected by sensor(s) in or on the attachment 30b or (ii) the flow rate and/or the pressure of hydraulic fluid supplied to the actuator 36. Thus, when the state information about the attachment 30b is inputted via the bus 48, the controller 21 performs control corresponding to the state information.

As another example, the gateway 20 may be configured or programmed to, when an external signal is inputted from the AUX connector 19, output the external signal or external information indicated by the external signal to the bus 48. In such a case, when an external signal or external information indicated by the external signal is inputted via the bus 48, the controller 21 and/or the like (the controller 21, the beacon scanner 23, the information processor 90 and/or the like) determines whether or not the external signal or external information indicated by the external signal agrees with the attachment 30 corresponding to the first attachment information as described earlier.

For example, in the case where the controller 21 determines whether or not the external signal agrees with the attachment, if the controller 21 determines that the external signal does not agree with the attachment 30 corresponding to the first attachment information, the controller 21 does not perform control corresponding to the external signal. If the controller 21 determines that the external signal agrees with the attachment 30 corresponding to the first attachment information, the controller 21 performs control corresponding to the external signal.

In the case where the information processor 90 and/or the like (or the beacon scanner 23) determines whether or not the external signal agrees with the attachment, if the information processor 90 and/or the like determines that the external signal does not agree with the attachment 30 corresponding to the first attachment information, the information processor 90 and/or the like outputs disagreement information indicating the result of the determining to the bus 48. If the information processor 90 and/or the like determines that the external signal agrees with the attachment 30 corresponding to the first attachment information, the information processor 90 and/or the like outputs agreement information indicating the result of the determining to the bus 48. Then, when the disagreement information is inputted via the bus 48, the gateway 20 does not output the external signal to the controller 21. When the agreement information is inputted via the bus 48, the gateway 20 outputs the external signal to the controller 21. When the external signal is inputted from the gateway 20 via the bus 48, the controller 21 performs control corresponding to the external signal.

Figure 12:
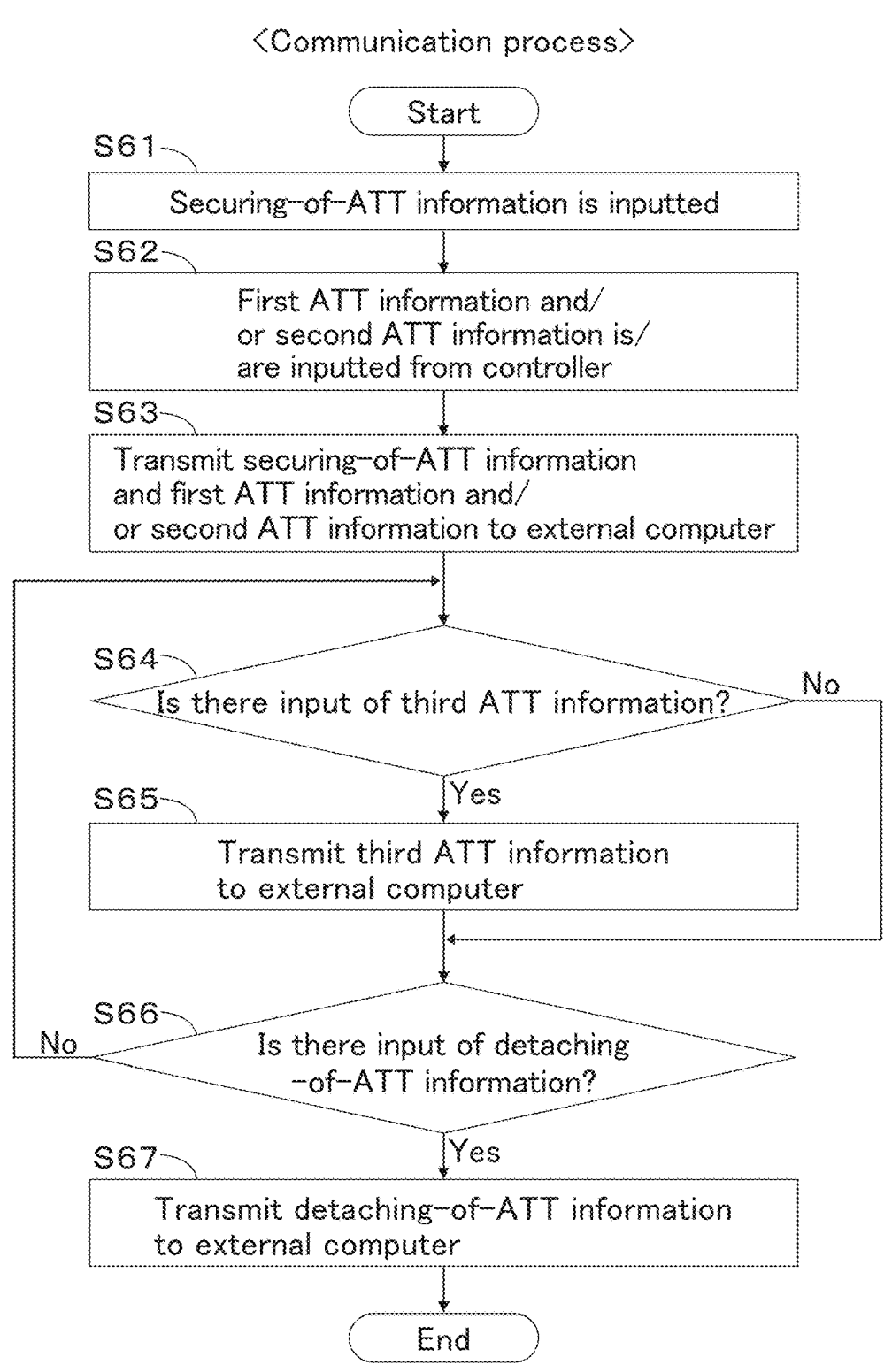
FIG. 12 is a flowchart showing an example of a communication process.

FIG. 12 is a flowchart showing an example of a communication process performed by the communication controller 24. The steps of the communication process shown in FIG. 12 are repeatedly performed by processor(s) included in the communication controller 24 based on software program(s) stored in advance in one or more memories.

When the securing-of-attachment information from the controller 21 is inputted via the bus 48 and at least one of the first attachment information or the second attachment information from the controller 21 is inputted via the bus 48 (S61), the communication controller 24 transmits the inputted securing-of-attachment information and the attachment information (at least one of the first attachment information or the second attachment information), which are associated with each other, to the external computer 80 (S62). In so doing, the communication controller 24 associates the securing-of-attachment information and attachment information to be transmitted with the identification information of the communication controller 24 which is the sender and the identification information of the working vehicle 1 provided with the communication controller 24

Note that at least one of the first attachment information or the second attachment information transmitted by the communication controller 24 includes the identification information of the attachment 30 attached to the quick hitch 16. The communication controller 24 may be configured or programmed to acquire, via the bus 48, position information indicating the position of the working vehicle 1 measured by the position detector 43, and associate the position information with the securing-of-attachment information.

When the third attachment information from the controller 21 is inputted via the bus 48 (YES at S64), the communication controller 24 transmits the third attachment information to the external computer 80 (S65). In so doing, the communication controller 24 also associates the third attachment information to be transmitted with the identification information of the communication controller 24 which is the sender and the identification information of the working vehicle 1 provided with the communication controller 24.

As described earlier, the third attachment information includes at least one of (i) information outputted from in-vehicle electronic device(s) in or on the working vehicle 1 such as the sensor unit 49, the switch unit SU, and/or the position detector 43 or (ii) the information outputted from the accessory electronic device(s) 35 in or on the attachment 30*b* connected via the AUX connector 19 and the like to the working vehicle 1. Thus, at step S65, the communication controller 24 transmits information outputted from at least one of the in-vehicle electronic device(s) or the accessory electronic device(s) 35 to the external computer 80.

Then, if no detaching-of-attachment information is inputted via the bus 48 (NO at S66), the communication controller 24 repeats step S64 and subsequent steps. When the detaching-of-attachment information from the controller 21 is inputted via the bus 48 (YES at S66), the communication controller 24 transmits the detaching-of-attachment information to the external computer 80 (S67). In so doing, the communication controller 24 may acquire, via the bus 48, position information indicating the position of the working vehicle 1 measured by the position detector 43, and associate the position information with the detaching-of-attachment information.

When the external computer 80 receives the securing-of-attachment information and at least one of the first attachment information or the second attachment information transmitted from the communication controller 24, the external computer 80 causes a predetermined memory to store such pieces of information as information relating to the working vehicle 1. After that, when the external computer 80 receives the third attachment information and the securing-of-attachment information transmitted from the communication controller 24, the external computer 80 causes the predetermined memory to also store such pieces of information as information relating to the working vehicle 1. In so doing, the external computer 80 causes the memory to store pieces of information relating to the same working vehicle 1 such that they are associated with each other.

With this, the external computer 80 manages the information relating to the attachment 30 and the working vehicle 1 that was/were transmitted from the working vehicle 1 between when the attachment 30 was attached to the working vehicle 1 and when the attachment 30 was allowed to be detached from the working vehicle 1, i.e., the information indicating the usage state of the attachment 30 and the working vehicle 1, the information indicating the drive state of the attachment 30 and the working vehicle 1, the position information of the working vehicle 1, and/or the like that was/were detected by sensor(s) between when the attachment 30 was attached to the working vehicle 1 and when the attachment 30 was allowed to be detached from the working vehicle 1.

In the case where the controller 21 starts the predetermined process corresponding to the first attachment information selected based on the reception information obtained by the beacon scanner 23 as described earlier (steps S20 and S21 in FIG. 7B), the controller 21 performs the continue-attachment-usage process from when the controller 21 starts the predetermined process to when the attachment 30 is allowed to be detached from the quick hitch 16, and continues or stops the predetermined process depending on whether or not the controller 21 succeeds in acquiring source information included in the first attachment information again via the beacon scanner 23.

Figure 13:
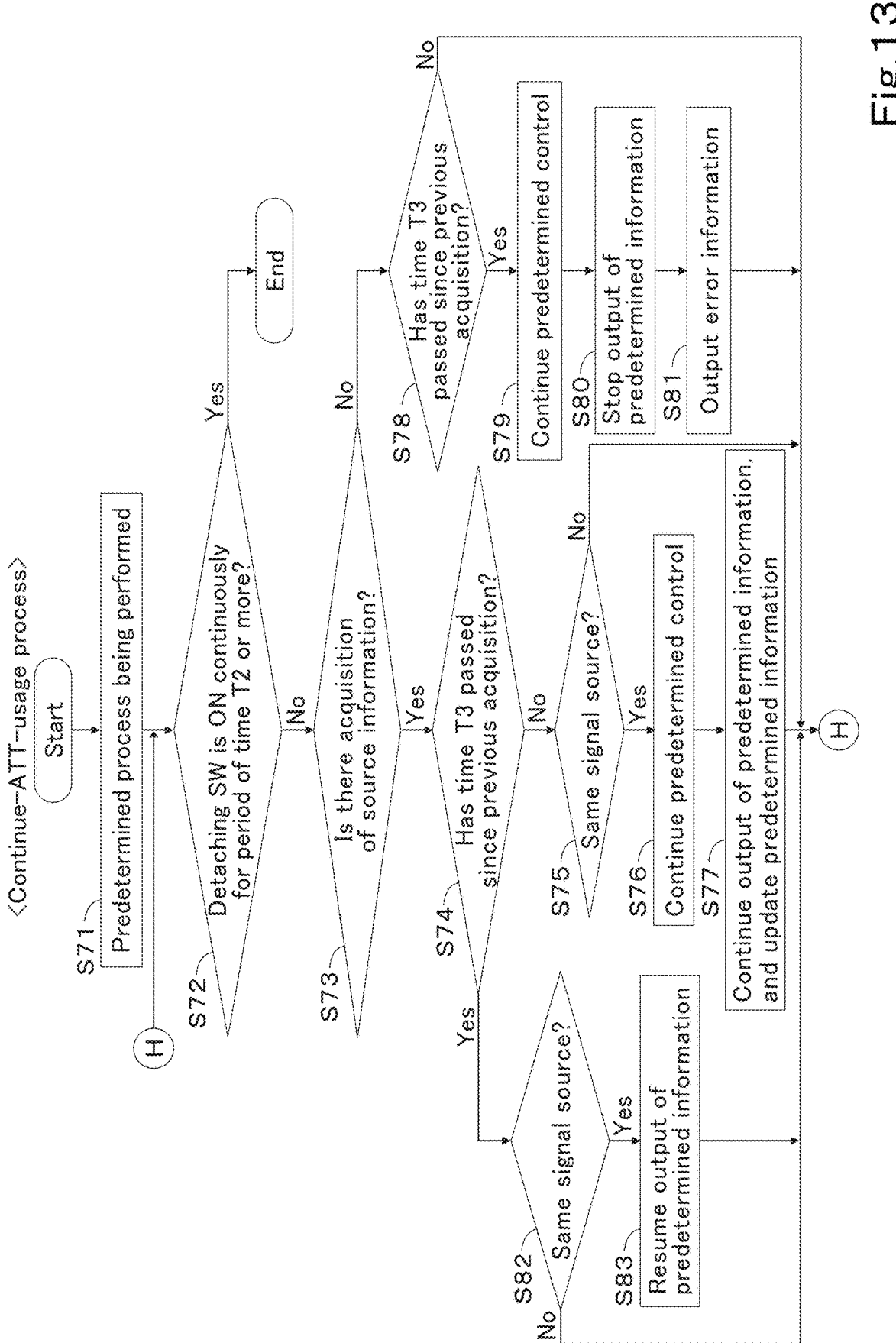
FIG. 13 is a flowchart showing an example of a continue-attachment-usage process.

FIG. 13 is a flowchart showing an example of a continue-attachment-usage process. After starting the predetermined process corresponding to the first attachment information automatically selected by the controller 21, under normal conditions, every time an ADV signal Q1 is transmitted from the beacon transmitter 33 attached to the quick hitch 16, the ADV signal Q1 is received by the beacon scanner 23. Then, the first attachment information indicated by the ADV signal Q1 is inputted from the beacon scanner 23 into the controller 21 via the bus 48.

When the predetermined process corresponding to the automatically selected first attachment information is being performed (S71), if it is not detected that the detaching switch 27 has been continuously operated for a predetermined period of time T2 or more (NO at S72), the controller 21 determines whether or not the source information included in the first attachment information has been acquired via the beacon scanner 23.

Then, in the case where the controller 21 has acquired the source information included in the first attachment information via the beacon scanner 23 (YES at S73), the controller 21 determines whether or not the source information was acquired after a predetermined period of time T3 (third predetermined period of time) from the previous acquisition of source information. The predetermined period of time T3 is, for example, about 30 seconds, but this does not imply any limitation. The predetermined period of time T3 is a period longer than an interval at which the ADV signal Q1 is transmitted from the beacon transmitter 33.

In the case where the controller 21 acquired the source information before the predetermined period of time T3 from the previous acquisition (NO at S74), the controller 21 determines whether or not the acquired source information indicates the same signal source as the source information included in the currently selected first attachment information. For example, in the case where the attachment ID and the beacon ID and/or the like included in the acquired source information match the attachment ID and the beacon ID and/or the like included in the currently selected source information, the controller 21 determines that the acquired source information and the currently selected source information indicate the same signal source (YES at S75). In such a case, the controller 21 continues the predetermined control currently being performed (S76). Specifically, the controller 21 continues the currently performed control of the introduction and discharge of hydraulic fluid into and from the attachment 30, and the currently performed control of the traveling devices 5 and the working device 4.

The controller 21, while continuing to output the predetermined information, updates the currently outputted predetermined information based on the acquired source information (S77). Specifically, the controller 21 continues to cause the user interface 25 to display the pieces of information A1 to A5 about the attachment 30 that started to be displayed on the monitor screen G1 at step S21 of FIG. 7A (see FIG. 9B). In so doing, the controller 21 continues to cause the pieces of information A1 to A3 of the pieces of information A1 to A5 that indicate that the attachment 30 is attached to be displayed without updating them. The controller 21 updates the hour meter A4 indicating the operating time of the attachment 30 (beacon transmitter 33) and the charge level meter A5 indicating the remaining charge level of the battery 33e, so that they indicate the operating time of the attachment 30 (beacon transmitter 33) and the charge level of the battery 33e included in the acquired source information, respectively. After performing step S77 of FIG. 13, the controller 21 repeats step S72 and subsequent steps.

On the other hand, there may be cases in which the controller 21 does not receive input of first attachment information from the beacon scanner 23 via the bus 48 due to braking or short circuiting of the electric harness or electric line connecting the beacon scanner 23 to the bus 48, failure of the beacon scanner 23 or the beacon transmitter 33, blocking of the ADV signal Q1, and/or the like. In such cases, the controller 21 does not acquire source information via the beacon scanner 23 within a predetermined period of time T3 from the previous acquisition of source information anymore (NO at S73, YES at S78). Upon detecting such, the controller 21 continues the currently performed predetermined control (S79), stops the output of predetermined information (S80), and outputs error information (S81).

Figure 14A:
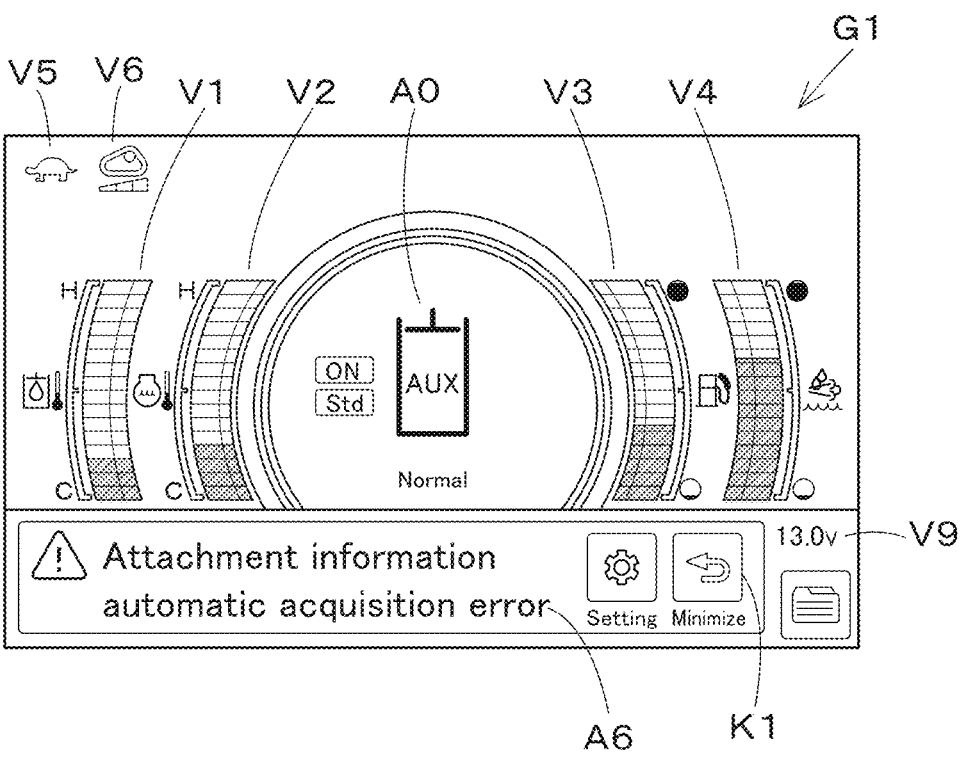
FIG. 14A illustrates an example of a monitor screen displaying an error message.

Specifically, the controller 21 continues the currently performed control of introduction and discharge of hydraulic fluid into and from the attachment 30, and the currently performed control of the traveling devices 5 and the working device 4 (S79). In the case where, for example, the controller 21 causes the monitor screen G1 to display the pieces of information A1 to A5 about the attachment 30 as shown in FIG. 9B, the controller 21 causes the user interface 25 to stop displaying the pieces of information A1 to A5 (S80 of FIG. 13), and causes the user interface 25 to display, on the monitor screen G1, an error message A6 as shown in FIG. 14A (S81 of FIG. 13). The error message A6 indicates that an error occurred where the information about the attachment 30 cannot be automatically acquired. After performing step S81 of FIG. 13, the controller 21 repeats step S72 and subsequent steps.

Figure 14B:
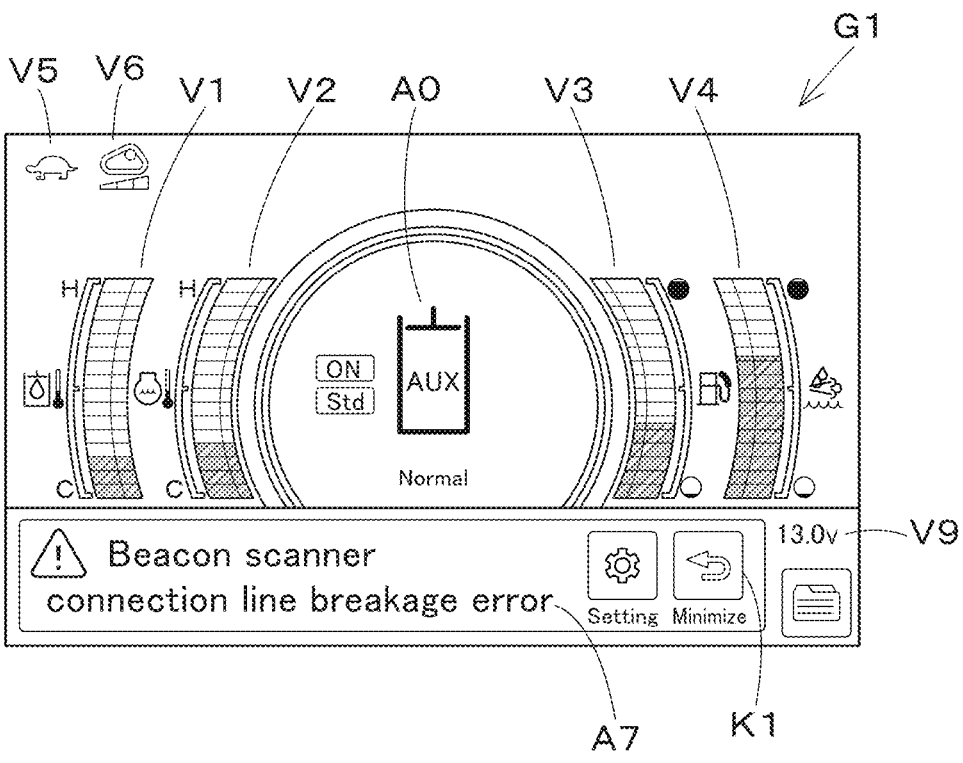
FIG. 14B illustrates another example of a monitor screen displaying an error message.

Before performing step S81, for example, the controller 21 may output a predetermined connection check signal to the beacon scanner 23 via the bus 48, and, if a predetermined response signal is not inputted from the beacon scanner 23 via the bus 48 within a certain period of time from the output of the connection check signal, the controller 21 may determine that the electric harness connecting the beacon scanner 23 and the bus 48 is broken. The controller 21 may then, at step S81, cause the monitor screen G1 to display an error message A7 indicating that the electric line connecting the beacon scanner 23 is broken as shown in FIG. 14B. The controller 21 may cause the monitor screen G1 to display the error messages A6 and A7 in a pop-up manner only for a certain period of time.

Figure 14C:
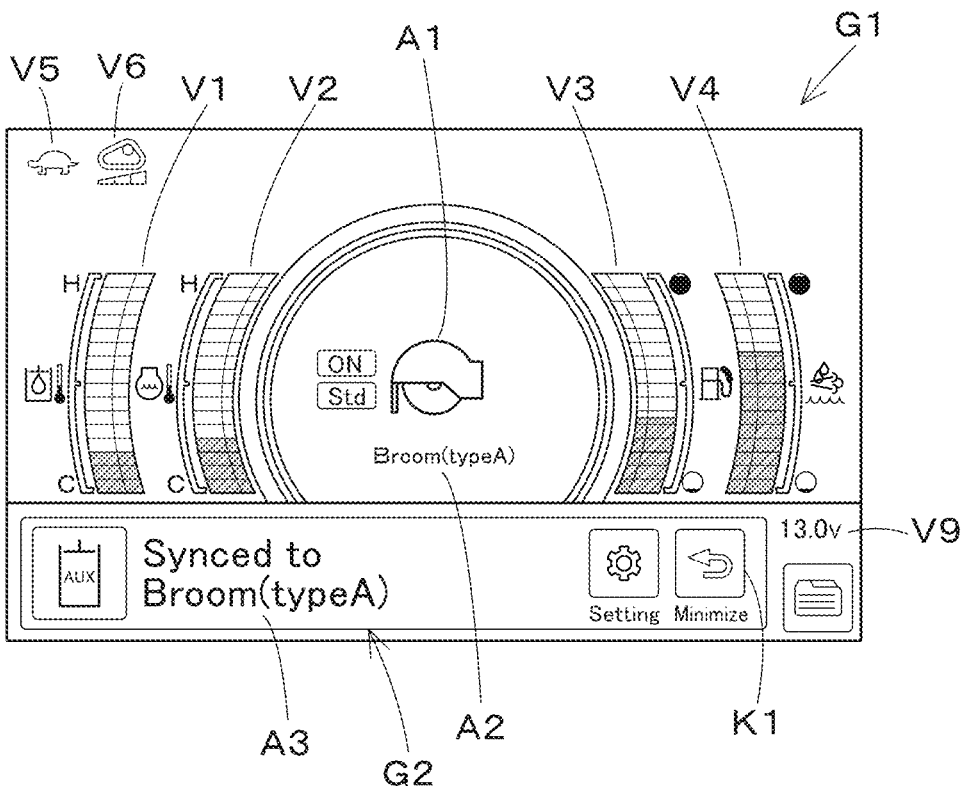
FIG. 14C illustrates an example of a monitor screen in which attached information about an attachment is displayed but operating information and the charge level of a battery are not displayed.

At step S80 of FIG. 13, the controller 21 continues to cause the user interface 25 to display the pieces of information A1 to A3 indicating that the attachment 30 is attached to the quick hitch 16, as in the monitor screen G1 shown in FIG. 14C. However, the controller 21 may stop displaying the hour meter A4 indicating the operating time of the attachment 30 (beacon transmitter 33) and the charge level meter A5 indicating the charge level of the battery 33e.

In the case where the attachment ID, the beacon ID, and/or the like included in the source information acquired via the beacon scanner 23 do not match the attachment ID, the beacon ID, and/or the like included in the currently selected source information, the controller 21 determines that the acquired source information does not indicate the same signal source as the currently selected source information (NO at S75 of FIG. 13). In such a case, the controller 21 repeats step S72 and subsequent steps.

In the case where, after stopping the output of predetermined information at step S80 of FIG. 13, the controller 21 does not detect that the detaching switch 27 has been continuously operated for a predetermined period of time T2 or more (NO at S72) and the controller 21 acquires source information after the predetermined period of time T3 has passed since the previous acquisition (YES at S73, YES at S74), the controller 21 determines whether or not the acquired source information indicates the same signal source as the source information included in the currently selected first attachment information.

Then, in the case where the acquired source information indicates the same signal source as the source information included in the currently selected first attachment information (YES at S82), the controller 21 resumes the output of predetermined information based on the acquired source information (S83). In so doing, the controller 21 causes the user interface 25 to display, on the monitor screen G1, the pieces of information A1 to A5 about the attachment 30. The controller 21 causes the hour meter A4 and the charge level meter A5 to be displayed to indicate the operating time of the attachment 30 (beacon transmitter 33) and the charge level of the battery 33e included in the acquired source information, respectively.

In the case where the acquired source information does not indicate the same signal source as the currently selected source information (NO at S82), the controller 21 does not resume the output of predetermined information, and repeats step S72 and subsequent steps. After starting the continue-attachment-usage process, when the controller 21 detects that the detaching switch 27 has been continuously operated for a predetermined period of time T2 or more (YES at S72) while the predetermined process is being performed (S71), the controller 21 ends the continue-attachment-usage process.

In the above-described example embodiments, an attachment 30 is provided with a beacon transmitter 33 to transmit a wireless signal compliant with Bluetooth (registered trademark) Low Energy, and the working vehicle 1 is provided with a beacon scanner 23 to receive the wireless signals. However, additionally or alternatively, for example, the attachment 30 may be provided with a transmitter such as a radio frequency identification (RFID) tag, and the working vehicle 1 may be provided with a receiver to receive wireless signals transmitted from the RFID. Additionally or alternatively, the attachment 30 may be provided with a transmitter to transmit radio waves for some other near field communication, and the working vehicle 1 may be provided with a receiver to receive the radio waves.

In the above-described example embodiments, the working vehicle 1 is provided with the quick hitch 16. Alternatively, the working vehicle 1 may be provided with a hitch having a different structure from the quick hitch 16, a quick hitch to which an attachment 30 can be attached and detached both automatically and manually, or a hitch to which an attachment 30 can be attached and detached only manually. In the case where the user manually attaches the attachment 30 to the hitch or manually detaches the attachment 30 from the hitch, the user may input information indicating that the attachment 30 is attached or detached using the user interface 25.

In the above-described example embodiments, information is inputted and outputted via the user interface 25 of the working vehicle 1. Additionally or alternatively, a mobile terminal device and/or a computer, etc., external to the working vehicle 1 may be used as an input and an output. In such a case, the controller 21 need only cause the communication controller 24 to transmit pieces of information to the output external to the working vehicle 1 and cause the output to output the pieces of information. A controller such as an information processor external to the working vehicle 1 may perform similar processes to the controller 21. That is, the controller and the output of the attachment usage system 100 may be provided somewhere other than the working vehicle 1.

In the above-described example embodiments, the working device 4, the quick hitch 16, and the attachment 30b are provided with hydraulic actuators (such as the boom cylinders 14, the front cylinders 15, the latch cylinder 52, the actuator 36). For another example, the working device 4 and the quick hitch 16 may be provided with hydraulic actuators other than the hydraulic cylinders and/or electric actuators such as electric motors.

For example, the quick hitch 16 may include an electric cylinder (servo cylinder or the like) or an electric motor (servo motor or the like) as an electric actuator instead of the latch cylinder 52. The controller 21 need only be configured or programmed to, for example, control the driving of the electric actuator via a drive circuit (electric circuit) in response to the operation of the attaching switch 26 or the detaching switch 27, to cause the latch levers 57 to rotate to cause the latch pins 54 to move downward or upward, thus bringing the latching mechanisms 51 into the latching state or the unlatching state.

An electric actuator may be provided on or in an attachment. In the case where the attachment including the electric actuator is attached to the quick hitch 16, the controller 21 may output, for example, electricity (power) from the battery 44 (FIG. 1) as the power for the electric actuator to the attachment via connector(s), electric harness(es), and/or the like based on control data corresponding to the attachment. Alternatively, a large-capacity battery larger than the battery 44 may be provided in or on the vehicle body 2, and the controller 21 may output electricity from the large-capacity battery to the attachment via connector(s), electric harness (es), and/or the like.

An attachment including a work member to be actuated by power from the prime mover 9 of the working vehicle 1 may be attached to the quick hitch 16. In the case where such an attachment including a work member is attached to the quick hitch 16, the controller 21 may output power from the prime mover 9 to the attachment via a power transmission mechanism including gear(s), shaft(s), and/or the like based on control data corresponding to the attachment.

Working vehicles 1 and attachment usage systems 100 according to example embodiments described so far include feature(s) included in the following item(s) and achieve the following effect(s).

(Item 1) A working vehicle 1 including a hitch (quick hitch) 16 to attach and detach an attachment 30 thereto and therefrom, a first interface 23, 25 (beacon scanner 23, user interface 25) to receive input of a piece of first attachment information relating to the attachment 30 attached to the hitch 16, a second interface (AUX connector) 19 to connect thereto at least one accessory electronic device 35 provided in or on the attachment 30 (30b) attached to the hitch 16, a bus 48, a controller 21 connected to the bus 48, and a gateway 20 connected to the bus 48, wherein the gateway 20 is connected to the second interface 19 without the bus 48 between the gateway 20 and the second interface 19, and is configured or programmed to, if an external signal inputted thereto from the second interface 19 does not agree with the attachment 30 (30b) corresponding to the piece of first attachment information inputted thereto via the first interface 23, 25, not output the external signal to the bus 48, and, if the external signal agrees with the attachment 30 (30b) corresponding to the piece of first attachment information, output the external signal to the bus 48, and the controller 21 is configured or programmed to perform control corresponding to the external signal inputted thereto via the bus 48.

With the configuration according to item 1, even if an external signal which does not agree with the attachment 30 corresponding to the first attachment information, i.e., an external signal which does not agree with the attachment 30 attached to the hitch 16, is inputted via the second interface 19 into the working vehicle 1 due to, for example, the accidental connection of an attachment 30 to the second interface 19 or the accidental input of first attachment information via the first interface 23, 25, the control corresponding to the external signal is not performed on the working vehicle 1. This makes it possible to eliminate or reduce the likelihood that the working vehicle 1 will undergo failures such as malfunction due to the external signal which does not agree with the attachment 30 attached to the hitch 16. It is also possible to appropriately perform, on the working vehicle 1, control corresponding to the external signal if the external signal which agrees with the attachment 30 corresponding to the first attachment information is inputted into the working vehicle 1 via the second interface 19. This makes it possible to appropriately use the attached attachment 30 on the working vehicle 1.

(Item 2) The working vehicle 1 according to item 1, wherein the controller 21 is configured or programmed to perform the control corresponding to the external signal after starting a predetermined process based on the piece of first attachment information.

With the configuration according to item 2, it is possible, on the working vehicle 1, to start a predetermined process according to the attachment 30 attached to the hitch 16 and then appropriately perform control corresponding to the external signal which agrees with the attachment 30, making it possible to appropriately perform work using the attachment 30.

(Item 3) The working vehicle 1 according to item 1 or 2, further including a first operation switch (attaching switch) 26 to be operated to attach the attachment 30 to the hitch 16, wherein the gateway 20 is configured or programmed to output, to the bus 48, the external signal which agrees with the attachment 30 corresponding to the piece of first attachment information after the first operation switch 26 is operated.

With the configuration according to item 3, it is possible, on the working vehicle 1, to appropriately perform control corresponding to the external signal which agrees with the attachment 30 after the attachment 30 is attached.

(Item 4) The working vehicle 1 according to any one of items 1 to 3, further including a second operation switch (detaching switch) 27 to be operated to allow the attachment 30 to be detached from the hitch 16, wherein the gateway 20 is configured or programmed to not output the external signal to the bus 48 after the second operation switch 27 is operated.

The configuration according to item 4 achieves the following. When the attachment 30 is allowed to be detached from the hitch 16 on the working vehicle 1, i.e., under unstable conditions in which the attachment 30 is not secured to the hitch 16, external signals are not inputted into the controller 21. The configuration according to item 4 makes it possible to eliminate or reduce the likelihood that unstable control will be performed based on an external signal.

(Item 5) The working vehicle 1 according to any one of items 1 to 4, wherein the gateway 20 is configured or programmed to determine whether or not the external signal agrees with the attachment 30 corresponding to the piece of first attachment information.

With the configuration according to item 5, the gateway 20 outputs the external signal to the bus 48 when determining that the external signal agrees with the attachment 30 corresponding to the first attachment information, making it possible for the controller 21 to appropriately perform control corresponding to the external signal which agrees with the attachment.

Furthermore, since the gateway 20 does not output the external signal to the bus 48 if determining that the external signal does not agree with the attachment 30 corresponding to the first attachment information, the controller 21 does not perform control based on the external signal which does not agree with the attachment, making it possible to prevent or reduce failures such as malfunction.

(Item 6) The working vehicle 1 according to item 5, wherein the gateway 20 is configured or programmed to determine whether or not the external signal agrees with the attachment 30 corresponding to the piece of first attachment information based on information relating to the at least one accessory electronic device 35 that is indicated by the external signal and based on information relating to the at least one accessory electronic device 35 provided in or on the attachment 30 that is included in the piece of first attachment information.

With the configuration according to item 6, the gateway 20 is able to appropriately determine whether or not the external signal agrees with the attachment 30 attached to the hitch 16 and the accessory electronic device(s) 35 in or on the attachment 30.

(Item 7) The working vehicle 1 according to item 5, further including a memory 21a, 22 (internal memory 21a, nonvolatile memory 22) from which information is readable by the controller 21, wherein the memory 21a, 22 stores a plurality of pieces of second attachment information for a respective plurality of the attachments 30 attachable to the hitch 16, the plurality of pieces of second attachment information each including at least one of (i) more types of information relating to the attachment 30 than in the piece of first attachment information or (ii) information relating to the at least one accessory electronic device 35 provided in or on the attachment 30, the external signal indicates at least one of (a) information relating to the at least one accessory electronic device 35 from which the external signal is outputted or (b) information relating to the attachment 30 in or on which the at least one accessory electronic device 35 is provided, the controller 21 is configured or programmed to output, to the bus 48, at least one of the piece of first attachment information or a piece of second attachment information that corresponds to the piece of first attachment information, and the gateway 20 is configured or programmed to determine whether or not the external signal agrees with the attachment 30 corresponding to the piece of first attachment information based on the at least one of the piece of first attachment information or the piece of second attachment information inputted thereto via the bus 48 from the controller 21 and based on the at least one of the information (a) or the information (b) indicated by the external signal.

With the configuration according to item 7, the gateway 20 is able to more appropriately determine whether or not the external signal agrees with the attachment 30 attached to the hitch 16 and the accessory electronic device(s) 35 in or on the attachment 30.

(Item 8) The working vehicle 1 according to item 5, wherein the first interface 23, 25 includes a receiver (beacon scanner) 23 to receive a wireless signal (advertisement signal) Q1 which is transmitted periodically from a transmitter (beacon transmitter) 33 in or on the attachment 30 and which is compliant with a near field communication standard, the controller 21 is configured or programmed to select one of one or more of the pieces of first attachment information indicated by one or more of the wireless signals received by the receiver 23 that satisfies a predetermined condition, and output, to the bus 48, at least one of (i) the selected piece of first attachment information or (ii) a piece of second attachment information relating to the attachment 30 that is generated or read from a memory 21a, 22 based on the piece of first attachment information, and the gateway 20 is configured or programmed to determine, based on the at least one of the selected piece of first attachment information or the piece of second attachment information inputted thereto from the controller 21 via the bus 48, whether or not the external signal agrees with the attachment corresponding to the inputted piece of first attachment information.

With the configuration according to item 8, it is possible to automatically select at least one of the first attachment information or the second attachment information relating to the attachment 30 attached to the hitch 16 easily and accurately. It is also possible to appropriately determine whether or not the external signal inputted via the second interface 19 agrees with the attachment 30 attached to the hitch 16 based on the selected first attachment information and/or the like, making it possible to appropriately perform control corresponding to the external signal which agrees with the attachment.

(Item 9) The working vehicle 1 according to any one of items 5 to 8, wherein the gateway 20 is configured or programmed to not output the external signal to the bus 48 if the external signal is inputted thereto but no first attachment information is inputted thereto.

With the configuration according to item 9, it is possible to eliminate or reduce the likelihood that control will be performed based on an external signal inputted via the second interface 19 without determining whether or not the external signal agrees with the attachment 30 corresponding to the first attachment information, and also possible to prevent or reduce failures such as malfunction that would result from the external signal which does not agree with the attachment.

(Item 10) The working vehicle 1 according to any one of items 1 to 9, further including a user interface 25 to output an alert when the external signal does not agree with the attachment 30 corresponding to the piece of first attachment information.

With the configuration according to item 10, it is possible to give an alert to the user indicating that the external signal inputted via the second interface 19 does not agree with the attachment 30 corresponding to the first attachment information inputted via the first interface. This allows the user, who recognizes the alert, to check the attachment 30 attached to the hitch 16, the attachment 30 connected to the second interface 19, and the first attachment information, and perform appropriate actions such as attaching an attachment 30 to the hitch 16, connecting an attachment 30 to the second interface 19, and/or re-inputting first attachment information via the first interface 23, 25.

(Item 11) The working vehicle 1 according to any one of items 1 to 10, wherein the first interface 23, 25 includes a user interface 25 to receive input of the piece of first attachment information from a user.

The configuration according to item 11 enables manual input of the first attachment information relating to the attachment 30 attached to the hitch 16 via the user interface 25. This makes it possible to determine whether or not the external signal inputted via the second interface 19 agrees with the attachment 30 attached to the hitch 16 corresponding to the first attachment information, and possible to appropriately perform, on the working vehicle 1, control corresponding to the external signal which agrees with the attachment.

(Item 12) The working vehicle 1 according to item 11, wherein the controller 21 is configured or programmed to output, to the bus 48, at least one of (i) the piece of first attachment information inputted thereto via the user interface 25 or (ii) a piece of second attachment information generated or read from a memory 21*a*, 22 based on the inputted piece of first attachment information, the piece of second attachment information relating to the attachment 30 corresponding to the piece of first attachment information, and the gateway 20 is configured or programmed to determine, based on the at least one of the piece of first attachment information or the piece of second attachment information inputted thereto from the controller 21 via the bus 48, whether or not the external signal agrees with the attachment 30 corresponding to the inputted piece of first attachment information.

With the configuration according to item 12, it is possible to appropriately determine whether or not the external signal inputted via the second interface 19 agrees with the attachment 30 attached to the hitch 16 corresponding to the first attachment information inputted by the user, and possible to appropriately perform, on the working vehicle 1, control corresponding to the external signal which agrees with the attachment.

(Item 13) The working vehicle 1 according to item 1, wherein the controller 21 or an information processor 90, 23 (beacon scanner 23) included in the working vehicle 1 is configured or programmed to determine whether or not the external signal agrees with the attachment 30 corresponding to the piece of attachment information, and output information indicating a result of determining to the gateway 20.

With the configuration according to item 13, if the controller 21 or the information processor 90, 23 determines that the external signal agrees with the attachment 30 corresponding to the first attachment information, the controller 21 is able to perform control corresponding to the external signal. Furthermore, if the controller 21 or the information processor 90, 23 determines that the external signal does not agree with the attachment 30 corresponding to the first attachment information, the controller 21 does not perform control based on the external signal, making it possible to prevent or reduce failures such as malfunction.

(Item 14) The working vehicle 1 according to item 13, wherein the external signal indicates information which includes (i) at least one of identification information of the at least one accessory electronic device from which the external signal is outputted or identification information of the attachment 30 (30*b*) in or on which the at least one accessory electronic device 35 is provided and (ii) state information indicating a state of the attachment 30 (30*b*), the gateway 20 is configured or programmed to input the identification information indicated by the external signal into the controller 21 or the information processor 90, 23, the controller 21 or the information processor 90, 23 is configured or programmed to determine whether or not the external signal agrees with the attachment 30 corresponding to the piece of first attachment information based on the identification information inputted thereto from the gateway 20 and based on at least one of identification information of the attachment 30 corresponding to the piece of first attachment information or identification information of the at least one accessory electronic device 35 provided in or on the attachment 30, and the gateway 20 is configured or programmed to, upon receipt of input of information indicating that the external signal agrees with the attachment 30 corresponding to the piece of first attachment information from the controller 21 or the information processor 90, 23, output at least the state information indicated by the external signal to the bus 48.

With the configuration according to item 14, the controller 21 or the information processor 90, 23 is able to appropriately determine whether or not the external signal agrees with the attachment 30 corresponding to the first attachment information. Furthermore, if the external signal agrees with the attachment 30 corresponding to the first attachment information, at least the state information of the attachment 30 (30*b*) indicated by the external signal is outputted from the gateway 20 to the bus 48, making it possible for the controller 21 to perform appropriate control based on the state information. On the contrary, if the external signal does not agree with the attachment 30 corresponding to the first attachment information, the information indicated by the external signal is not outputted from the gateway 20 to the bus 48, and therefore the controller 21 does not perform wrong control, making it possible to prevent or reduce failures such as malfunction.

(Item 15) The working vehicle 1 according to any one of items 1 to 14, wherein the second interface 19 includes a connector (AUX connector) 19 to connect thereto an electric harness 69 connected to the at least one accessory electronic device 35.

With the configuration according to item 15, the external signal outputted from the accessory electronic device(s) 35 in or on the attachment 30 is inputted into the gateway 20 via the electric harness 69 and the connector 19, making it possible to prevent or reduce the degradation of the external signal during transmission. This makes it possible to achieve high reception quality of the external signal at the gateway 20 and possible to reliably determine whether or not the external signal agrees with the attachment 30 attached to the hitch 16 corresponding to the first attachment information, making it possible to improve the reliability of determining whether or not the external signal agrees with the attachment.

(Item 16) The working vehicle 1 according to any one of items 1 to 15, further including a traveling device 5 to allow a vehicle body 2 to travel, and a working device 4 provided on the vehicle body 2 and having the hitch 16 linked thereto, wherein the at least one accessory electronic device 35 includes at least one sensor to detect at least one of a position, posture, or action of the attachment 30 in or on which the at least one accessory electronic device 35 is provided, and the controller 21 is configured or programmed to control at least one of the traveling device 5 or the working device 4 based on a detection signal from the at least one sensor, the detection signal being the external signal which agrees with the attachment 30 corresponding to the piece of first attachment information.

With the configuration according to item 16, it is possible to appropriately control at least one of the traveling device 5 or the working device 4 of the working vehicle 1 based on a detection signal from the at least one sensor in or on the attachment 30 that agrees with the attachment 30 attached to the hitch 16.

(Item 17) The working vehicle 1 according to any one of items 1 to 16, further including a power outlet port (AUX coupler) 18a, 18b to allow power to be outputted to the attachment 30 attached to the hitch 16, wherein the controller 21 is configured or programmed to allow power to be outputted via the power outlet port 18a, 18b to the attachment 30 based on the external signal which agrees with the attachment 30 corresponding to the piece of first attachment information.

With the configuration according to item 17, power is appropriately outputted from the working vehicle 1 to the attachment 30 attached to the hitch 16, making it possible to appropriately drive the attachment 30 to perform work.

(Item 18) The working vehicle 1 according to item 17, wherein the at least one accessory electronic device 35 includes at least one sensor to detect an operating state of an actuator 36 in or on the attachment 30 in or on which the at least one accessory electronic device 35 is provided, and the controller 21 is configured or programmed to control output of power to the attachment 30 based on a detection signal from the at least one sensor, the detection signal being the external signal which agrees with the attachment 30 corresponding to the piece of first attachment information.

With the configuration according to item 18, power is appropriately outputted from the working vehicle 1 from the actuator 36 in or on the attachment 30 attached to the hitch 16, making it possible to appropriately actuate the actuator 36 to cause the attachment 30 to perform work.

(Item 19) The working vehicle 1 according to any one of items 1 to 18, further including a user interface 25, wherein the controller 21 is configured or programmed to cause the user interface 25 to output information based on the external signal which agrees with the attachment 30 corresponding to the piece of first attachment information.

With the configuration according to item 19, it is possible to provide the user with a notification including information about the attachment 30 corresponding to the external signal which agrees with the attachment 30 attached to the hitch 16 and information about the sensor indicated by the external signal, etc. The user is able to perform work using the attachment 30 with reference to the information.

(Item 20) The working vehicle 1 according to any one of items 1 to 19, further including at least one in-vehicle electronic device (sensor unit 49, switches 26 to 29, position detector 43, and/or the like) connected to the bus 48, wherein the gateway 20 is configured or programmed to, if the external signal does not agree with the attachment 30 corresponding to the piece of first attachment information, not output, via the second interface 19, an output signal (signal-for-ATT) outputted from at least one of the controller 21 or the at least one in-vehicle electronic device to the bus 48, and, if the external signal agrees with the attachment 30 corresponding to the piece of first attachment information, output the output signal via the second interface 19.

With the configuration according to item 20, it is possible to output a control signal and/or the like from the controller 21 and the in-vehicle electronic device(s) of the working vehicle 1 to the accessory electronic device(s) 35 in or on the attachment 30 attached to the hitch 16 to cause the attachment 30 to operate based on the control signal and/or the like, making it possible to cause the attachment 30 to perform work appropriately.

(Item 21) A working vehicle 1 including a hitch (quick hitch) 16 to attach and detach an attachment 30 thereto and therefrom, a first interface 23, 25 (beacon scanner 23, user interface 25) to receive input of a piece of first attachment information relating to the attachment 30 attached to the hitch 16, a second interface (AUX connector) 19 to connect thereto at least one accessory electronic device 35 provided in or on the attachment 30 (30b) attached to the hitch 16, a bus 48, a controller 21 connected to the bus 48, and a gateway 20 connected to the bus 48, wherein the gateway 20 is connected to the second interface 19 without the bus 48 between the gateway 20 and the second interface 19 and is configured or programmed to output an external signal inputted thereto from the second interface 19 to the bus 48, and the controller 21 is configured or programmed to, if the external signal does not agree with the attachment 30 corresponding to the piece of first attachment information inputted thereto via the first interface 23, 25, not perform control corresponding to the external signal, and, if the external signal agrees with the attachment 30 corresponding to the piece of first attachment information, perform control corresponding to the external signal.

With the configuration according to item 21, it is possible to prevent or reduce failures such as malfunction of the working vehicle 1 that would be caused by an external signal not agreeing with the attachment 30 attached to the hitch 16. Furthermore, in the case where an external signal which agrees with the attachment 30 corresponding to the first attachment information is inputted via the second interface 19 into the working vehicle 1, it is possible to appropriately perform control corresponding to the external signal on the working vehicle 1. This makes it possible to appropriately use the attached attachment 30 on the working vehicle 1.

(Item 22) The working vehicle 1 according to item 8, wherein the receiver 23 is connected to the bus 48 and is configured or programmed to output, to the bus 48, a piece of first attachment information indicated by the wireless signal Q1 received from the transmitter 33 and reception information (RSSI) relating to a reception condition of the wireless signal Q1 which are associated with each other, and the controller 21 is configured or programmed to select one of the one or more pieces of first attachment information that satisfies the predetermined condition based on the piece of first attachment information and the reception information inputted thereto via the bus 48.

With the configuration according to item 22, even if a plurality of attachments 30 are present in the vicinity of the working vehicle 1, it is possible to select the first attachment information relating to the attachment 30 attached to the hitch 16 transmitted from the transmitter 33 in or on the attachment 30.

(Item 23) The working vehicle 1 according to item 8 or 22, further including a communication controller 24 connected to the bus 48 and configured or programmed to transmit, to an external computer 80 in a wireless manner, the at least one of the piece of first attachment information or the piece of second attachment information inputted thereto from the controller 21 via the bus 48.

With the configuration according to item 23, it is possible to appropriately transmit at least one of the first attachment information or the second attachment information relating to the attachment 30 attached to the hitch 16 from the working vehicle 1 to the external computer 80, and possible to allow the external computer 80 to manage and use the at least one of the first attachment information or the second attachment information.

(Item 24) The working vehicle 1 according to item 23, further including at least one in-vehicle electronic device connected to the bus 48, wherein the controller 21 is configured or programmed to acquire, via the bus 48, a piece of third attachment information relating to the attachment 30 corresponding to the piece of first attachment information from at least one of the at least one in-vehicle electronic device or the at least one accessory electronic device 35, and output the acquired piece of third attachment information to the bus 48, and the communication controller 24 is configured or programmed to transmit, to the external computer 80, the piece of third attachment information inputted thereto from the controller 21 via the bus 48.

With the configuration according to item 24, it is possible to acquire, from at least one of the in-vehicle electronic device(s) of the working vehicle 1 or the accessory electronic device(s) 35 of the attachment 30 attached to the hitch 16, third attachment information relating to the attachment 30 and transmit the third attachment information from the working vehicle 1 to the external computer 80 to allow the external computer 80 to manage or use the third attachment information. It is also possible to transmit more pieces of information relating to the attachment 30 than the first attachment information inputted via the first interface 23, 25 to the external computer 80 to allow the external computer 80 to manage and use the pieces of information.

(Item 25) The working vehicle 1 according to item 23 or 24, further including a first operation switch (attaching switch) 26 to be operated to attach the attachment 30 to the hitch 16, wherein the controller 21 is configured or programmed to, when the first operation switch 26 is operated, select the piece of first attachment information and output, to the bus 48, securing-of-attachment information indicating that the attachment 30 is attached to the hitch 16, and the communication controller 24 is configured or programmed to transmit, to the external computer 80, the securing-of-attachment information inputted thereto via the bus 48.

With the configuration according to item 25, it is possible, when the attachment 30 is attached to the hitch 16, to output the securing-of-attachment information indicating such to the in-vehicle electronic device(s) connected to the bus 48, allowing the in-vehicle electronic device(s) to use the securing-of-attachment information. It is also possible to transmit the securing-of-attachment information from the working vehicle 1 to the external computer 80 to allow the external computer 80 to manage and use the securing-of-attachment information.

(Item 26) The working vehicle 1 according to any one of items 23 to 25, further including a second operation switch (detaching switch) 27 to be operated to allow the attachment 30 to be detached from the hitch 16, wherein the controller 21 is configured or programmed to, when the second operation switch 27 is operated with the attachment 30 attached to the hitch 16, output, to the bus 48, detaching-of-attachment information indicating that the attachment 30 is allowed to be detached from the hitch 16, and the communication controller 24 is configured or programmed to transmit, to the external computer 80, the detaching-of-attachment information inputted thereto via the bus 48.

With the configuration according to item 26, it is possible, when the attachment 30 is allowed to be detached from the hitch 16, to output the detaching-of-attachment information indicating such to the in-vehicle electronic device(s) connected to the bus 48, allowing the in-vehicle electronic device(s) to use the detaching-of-attachment information. It is also possible to transmit the detaching-of-attachment information from the working vehicle 1 to the external computer 80 to allow the external computer 80 to manage and use the detaching-of-attachment information.

(Item 27) An attachment usage system 100 including a working vehicle 1 to perform work using an attachment 30, wherein the working vehicle 1 includes a hitch 16, a first interface 23, 25, a second interface 19, a bus 48, a controller 21, and a gateway 20.

(Item 28) The attachment usage system 100 according to item 27, further including a transmitter (beacon transmitter) 33 in or on the attachment 30 to periodically transmit a wireless signal Q1 compliant with a near field communication standard, wherein the first interface 23, 25 includes a receiver (beacon scanner) 23 to receive one or more of the wireless signals Q1 transmitted from one or more of the transmitters 33, the controller 21 is configured or programmed to select one of one or more of the pieces of first attachment information indicated by the one or more wireless signals Q1 received by the receiver 23 that satisfies a predetermined condition, and output, to the bus 48, at least one of (i) the selected piece of first attachment information or (ii) a piece of second attachment information relating to the attachment 30 that is generated or read from a memory 21a, 22 based on the selected piece of first attachment information, the gateway 20 is configured or programmed to determine whether or not the external signal agrees with the attachment 30 corresponding to the piece of first attachment information based on the at least one of the piece of first attachment information or the piece of second attachment information inputted thereto from the controller 21 via the bus 48, and the working vehicle 1 further includes a communication controller 24 connected to the bus 48 and configured or programmed to transmit, to an external computer 80 in a wireless manner, the at least one of the piece of first attachment information or the piece of second attachment information inputted thereto via the bus 48.

With the configuration according to items 27 and 28, if the external signal inputted via the second interface 19 agrees with the attachment 30 attached to the hitch 16, it is possible to appropriately perform control corresponding to the external signal, and possible to appropriately perform work using the attachment 30. On the contrary, if the external signal does not agree with the attachment 30 attached to the hitch 16, control is not performed based on the external signal, making it possible to prevent or reduce failures such as malfunction of the controller 21 and/or the like. It is also possible to appropriately transmit at least one of the first attachment information or the second attachment information relating to the attachment 30 attached to the hitch 16 from the working vehicle 1 to the external computer 80 to allow the external computer 80 to manage and use the at least one of the first attachment information or the second attachment information.

(Item 29) The working vehicle 1 according to item 2, wherein the first interface 23, 25 includes a receiver 23 to receive a wireless signal Q1 which is transmitted periodically from a transmitter 33 in or on the attachment 30 and which is compliant with a near field communication standard, and the controller 21 is configured or programmed to select one of one or more of the pieces of first attachment information indicated by one or more of the wireless signals Q1 received by the receiver 23 that satisfies a predetermined condition, and start the predetermined process based on source information included in the selected piece of first attachment information and relating to a signal source, the signal source being at least one of the transmitter 33 or the attachment 30, the predetermined process including performing a predetermined control and outputting predetermined information relating to a state of the signal source, and during a period from when the controller 21 starts performing the predetermined control and outputting the predetermined information to when the attachment 30 is allowed to be detached from the hitch 16, if another source information is acquired via the receiver 23 within a predetermined period of time T3 from the previous acquisition, continue performing the predetermined control and outputting the predetermined information, and, if no other source information is acquired within the predetermined period of time T3 from the previous acquisition, continue performing the predetermined control and stop outputting the predetermined information.

With the configuration according to item 29, it is possible, on the working vehicle 1, to acquire source information from the transmitter 33 in or on the attachment 30 attached to the hitch 16 and, based on the source information, appropriately start performing predetermined control and outputting predetermined information corresponding to the attachment 30. This makes it possible, on the working vehicle 1, to appropriately perform work using the attached attachment 30 and provide a notification indicating the state of the attachment 30 and the transmitter 33 in or on the attachment 30 to the user and/or the like. Furthermore, during the period from when the predetermined control and the output of the predetermined information are started to when the attachment 30 is allowed to be detached from the hitch 16, if another source information is acquired via the receiver 23 within a predetermined period of time T3 from the previous acquisition, reselection of source information is not performed and the predetermined control or the output of predetermined information is not restarted, making it possible to stably continue the predetermined control and the output of the predetermined information and to continue the work performed by the attachment 30. It is also possible to reduce the processing load on the controller 21.

Furthermore, during the period from when the predetermined control and the output of the predetermined information are started to when the attachment 30 is allowed to be detached from the hitch 16, if source information stops being acquired via the receiver 23 due to an error such as the breakage of an electric line connecting the receiver 23 or a failure of the receiver 23 or if source information is not acquired at intervals equal to or shorter than the predetermined period of time T3 anymore, the controller 21 and/or the like does not erroneously recognize that the attachment 30 is detached, making it possible to continue the predetermined control and the work performed by the attachment 30. Furthermore, by stopping the output of predetermined information in such a case, it is possible to cause the user to notice the error (failure, breakage) of device(s) (transmitter 33, receiver 23, controller 21) and/or electric line(s) (including the bus 48) of the system for input of the source information and to allow the user to perform maintenance of the devices and electric lines.

(Item 30) The working vehicle 1 according to item 29, wherein the controller 21 is configured or programmed to output error information A6, A7 if the controller 21 acquires no other source information within the predetermined period of time T3.

With the configuration according to item 30, it is possible to give an alert to the user indicating that an error has occurred in the system for input of the source information from the transmitter 33 to the controller 21. The user, who recognizes the error information A6, A7, is able to immediately perform maintenance of the devices and electric lines in the system for input of source information.

(Item 31) The working vehicle 1 according to item 29 or 30, wherein the controller 21 is configured or programmed to cause a user interface 25 to output the predetermined information, and, based on the another source information acquired within the predetermined period of time T3, update the predetermined information which is being outputted by the user interface 25.

With the configuration according to item 31, it is possible to cause the user interface 25 to output, to the user, the predetermined information about the attachment 30 attached to the hitch 16. It is also possible to keep the outputted predetermined information about the attachment 30 updated based on the another source information acquired at interval(s) equal to or shorter than the predetermined period of time T3. This allows the user to recognize the predetermined information outputted by the user interface 25 and know the current state of the attachment 30 attached to the hitch 16 and the transmitter 33.

(Item 32) The working vehicle 1 according to item 31, wherein the controller 21 is configured or programmed to, if the another source information acquired within the predetermined period of time T3 indicates the same signal source as the source information included in the selected piece of first attachment information, update, based on the another source information acquired within the predetermined period of time T3, the predetermined information which is being outputted by the user interface 25.

With the configuration according to item 32, it is possible to appropriately update the predetermined information which is being outputted by the user interface 25, i.e., the predetermined information about the attachment 30 attached to the hitch 16.

(Item 33) The working vehicle 1 according to any one of items 29 to 32, wherein the controller 21 is configured or programmed to, if another source information is acquired after passage of the predetermined period of time T3 and before the attachment 30 is allowed to be detached, resume outputting the predetermined information based on the acquired another source information.

With the configuration according to item 33, even if, after the predetermined information starts being outputted and before the attachment 30 is allowed to be detached from the hitch 16, the predetermined information stops being outputted because source information stops being acquired at intervals shorter than or equal to the predetermined period of time T3 due to temporary failure of the receiver 23, etc., the output of the predetermined information can be resumed when another source information is acquired.

(Item 34) The working vehicle 1 according to item 33, wherein the controller 21 is configured or programmed to cause a user interface 25 to output the predetermined information, and, if another source information is acquired after passage of the predetermined period of time T3 and before the attachment 30 is allowed to be detached and the acquired another source information indicates the same signal source as the source information included in the selected piece of first attachment information, cause the user interface 25 to resume outputting the predetermined information based on the acquired another source information.

With the configuration according to item 34, even if, after the predetermined information about the attachment 30 attached to the hitch 16 starts being outputted and before the attachment 30 is allowed to be detached from the hitch 16, the predetermined information stops being outputted because source information stops being acquired at intervals shorter than or equal to the predetermined period of time T3, the output of the predetermined information about the attachment 30 can be resumed appropriately when another source information corresponding to the attached attachment 30 is acquired.

(Item 35) The working vehicle 1 according to any one of items 29 to 34, wherein the receiver 23 and the controller 21 are electrically connected to each other in a wired manner, and the controller 21 is configured or programmed to, if no signal is inputted from the receiver 23 during a period from when the attachment 30 is attached to the hitch 16 to when the attachment 30 is allowed to be detached from the hitch 16, continue performing the predetermined control, stop outputting the predetermined information, and output error information A7 indicating a connection error of the receiver 23.

With the configuration according to item 35, it is possible to detect a connection error such as a breakage of an electric line connecting the receiver 23 and output it as error information A7. This allows the user to recognize the error information A7 and immediately perform maintenance (fixing, replacing) of the electric line connecting the receiver 23.

(Item 36) The working vehicle 1 according to any one of items 29 to 35, wherein the controller 21 is configured or programmed to output the predetermined information based on the source information, the outputting of the predetermined information including causing a user interface 25 to display at least one of an operating time A4 of the signal source or a remaining charge level A5 of a battery 33e of the transmitter 33 each of which is included in the source information, and causing the user interface 25 to display attached information A1 to A3 indicating that the attachment 30 corresponding to the source information is attached, and during a period from when the predetermined information starts to be outputted to when the attachment 30 is allowed to be detached from the hitch 16, if no other source information is acquired within the predetermined period of time T3, cause the user interface 25 to continue displaying the attached information A1 to A3 and stop displaying the operating time A4 and the remaining charge level A5.

With the configuration according to item 36, during the period from when the predetermined information about the attachment 30 attached to the hitch 16 starts being outputted to when the attachment 30 is allowed to be detached from the hitch 16, it is possible to cause the user interface 25 to continue displaying the attached information A1 to A3 about the attachment 30 such that the user can visually recognize them. If the source information stops being acquired at intervals shorter or equal to the predetermined period of time T3 during the period from when the predetermined information about the attachment 30 attached to the hitch 16 starts being outputted to when the attachment 30 is allowed to be detached from the hitch 16, it is not possible to detect the current operating time of the attachment 30 and/or the like and the current charge level of the battery 33e based on the source information anymore. If this is the case, the user interface 25 stops displaying the operating time A4 of the attachment 30 and/or the like and the charge level A5 of the battery 33e, making it possible to prevent or reduce the likelihood that an operating time A4 and a charge level A5 differing from the actual ones (not up-to-date operating time A4 and charge level A5) will be displayed.

(Item 37) The working vehicle 1 according to any one of items 29 to 36, wherein the controller 21 is configured or programmed to finish performing the predetermined control and outputting the predetermined information when the attachment 30 is allowed to be detached from the hitch 16.

With the configuration according to item 37, it is possible to appropriately end the predetermined control and the output of the predetermined information when the attachment 30 is not used on the working vehicle 1 anymore.

(Item 38) The working vehicle 1 according to any one of items 29 to 37, further including a first operation switch 26 to be operated to attach the attachment 30 to the hitch 16, and a second operation switch 27 to be operated to allow the attachment 30 to be detached from the hitch 16, wherein the controller 21 is configured or programmed to determine whether or not the attachment 30 is attached to the hitch 16 based on an operation state of the first operation switch 26, and determine whether or not the attachment 30 is allowed to be detached from the hitch 16 based on an operation state of the second operation switch 27.

With the configuration according to item 38, the controller 21 is able to appropriately detect the point in time at which the attachment 30 is attached to the hitch 16 and the point in time at which the attachment 30 is allowed to be detached from the hitch 16.

(Item 39) The working vehicle 1 according to any one of items 29 to 38, wherein the controller 21 is configured or programmed to cause a memory (internal memory) 21a to store, for a period of time Tm, one or more received signal strengths (RSSIs) of the one or more wireless signals Q1 received by the receiver 23 and the one or more pieces of first attachment information indicated by the one or more wireless signals Q1 such that the one or more received signal strengths and the one or more pieces of first attachment information are associated with each other, and when the attachment 30 is attached to the hitch 16, select one of the one or more pieces of first attachment information stored in the memory 21a that satisfies the predetermined condition relating to at least one of a received signal strength or first attachment information.

With the configuration according to item 39, even in cases where a plurality of attachments 30 are present in the vicinity of the working vehicle 1 and the receiver 23 receives wireless signals Q1 from transmitters 33 in or on the respective attachments 30, it is possible to appropriately select the first attachment information corresponding to the attachment 30 attached to the hitch 16. This makes it possible to appropriately perform predetermined control and output predetermined information corresponding to the attachment 30 attached to the hitch 16 based on the selected first attachment information.

(Item 40) The working vehicle 1 according to item 39, wherein the receiver 23 and the controller 21 are electrically connected to each other in a wired manner, and the controller 21 is configured or programmed to, when the attachment 30 is attached to the hitch 16, if the memory 21a stores no first attachment information, cause a user interface 25 to output information (such as an attachment list L1) requesting input of a piece of first attachment information, and, upon receipt of input of the piece of first attachment information via the user interface 25, start performing the predetermined control corresponding to the inputted piece of first attachment information and outputting the predetermined information corresponding to the inputted piece of first attachment information.

With the configuration according to item 40, even if the receiver 23 of the working vehicle 1 stops acquiring first attachment information due to, for example, a breakage of an electric line connecting the receiver 23, it is possible to allow the user to input first attachment information via the user interface 25 and possible to start performing predetermined control and outputting predetermined information, making it possible to appropriately perform work using the attachment 30 attached to the hitch 16.

(Item 41) An attachment usage system 100 including a working vehicle 1 to perform work using an attachment 30, wherein the working vehicle 1 includes a hitch 16, a receiver 23, and a controller 21 configured or programmed to acquire source information relating to a signal source which is at least one of the transmitter 33 or the attachment 30 indicated by the wireless signal Q1 received by the receiver 23, and the controller 21 is configured or programmed to, after the attachment 30 is attached to the hitch 16, start performing a predetermined control for the attachment 30 to perform work and outputting predetermined information relating to a state of the signal source based on the source information, and before the attachment 30 is allowed to be detached from the hitch 16, if another source information is acquired via the receiver 23 within a predetermined period of time T3 from the previous acquisition, continue performing the predetermined control and outputting the predetermined information, and, if no other source information is acquired within the predetermined period of time T3, continue performing the predetermined control and stop outputting the predetermined information.

With the configuration according to item 41, it is possible, on the working vehicle 1, to appropriately start performing predetermined control and outputting predetermined information corresponding to the attachment 30 attached to the hitch 16, making it possible to appropriately perform work using the attachment 30 and providing a notification of the state of the attachment 30 and/or the like to the user. Furthermore, after the predetermined control and the output of predetermined information are started, if source information is acquired via the receiver 23 within the predetermined period of time T3 from the previous acquisition, the predetermined control and the output of predetermined information and the work performed by the attachment 30 can be continued stably, and the processing load on the controller 21 can also be reduced. Furthermore, if source information stops being acquired at intervals shorter than or equal to the predetermined period of time T3 due to an error, the predetermined control and the work performed by the attachment 30 can be continued, and the output of predetermined information is stopped to allow the user to notice the error, making it possible to prevent or reduce the notifications of invalid information.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:

a hitch to attach and detach an attachment thereto and therefrom;

a first interface to receive input of a piece of first attachment information relating to the attachment attached to the hitch;

a second interface to connect thereto at least one accessory electronic device provided in or on the attachment attached to the hitch;

a bus;

a controller connected to the bus; and a gateway connected to the bus; wherein the gateway:

is connected to the second interface without the bus between the gateway and the second interface; and is configured or programmed to, if an external signal inputted thereto from the second interface does not agree with the attachment corresponding to the piece of first attachment information inputted thereto via the first interface, not output the external signal to the bus, and, if the external signal agrees with the attachment corresponding to the piece of first attachment information, output the external signal to the bus; and the controller is configured or programmed to perform control corresponding to the external signal inputted thereto via the bus after starting a predetermined process based on the piece of first attachment information;

the first interface includes a receiver to receive a wireless signal which is transmitted periodically from a transmitter in or on the attachment and which is compliant with a near field communication standard; and the controller is configured or programmed to:

select one of one or more of the pieces of first attachment information indicated by one or more of the wireless signals received by the receiver that satisfies a predetermined condition, and start the predetermined process based on source information included in the selected piece of first attachment information and relating to a signal source, the signal source being at least one of the transmitter or the attachment, the predetermined process including performing a predetermined control and outputting predetermined information relating to a state of the signal source; and during a period from when the controller starts performing the predetermined control and outputting the predetermined information to when the attachment is allowed to be detached from the hitch, if another source information is acquired via the receiver within a predetermined period of time from the previous acquisition, continue performing the predetermined control and outputting the predetermined information, and, if no other source information is acquired within the predetermined period of time from the previous acquisition, continue performing the predetermined control and stop outputting the predetermined information.

2. The working vehicle according to claim 1, wherein the controller is configured or programmed to output error information if the controller acquires no other source information within the predetermined period of time.

3. The working vehicle according to claim 1, wherein the controller is configured or programmed to cause a user interface to output the predetermined information, and, based on the another source information acquired within the predetermined period of time, update the predetermined information which is being outputted by the user interface.

4. The working vehicle according to claim 3, wherein the controller is configured or programmed to, if the another source information acquired within the predetermined period of time indicates the same signal source as the source information included in the selected piece of first attachment information, update, based on the another source information acquired within the predetermined period of time, the predetermined information which is being outputted by the user interface.

5. The working vehicle according to claim 1, wherein the controller is configured or programmed to, if another source information is acquired after passage of the predetermined period of time and before the attachment is allowed to be detached, resume outputting the predetermined information based on the acquired another source information.

6. The working vehicle according to claim 5, wherein the controller is configured or programmed to cause a user interface to output the predetermined information, and, if another source information is acquired after passage of the predetermined period of time and before the attachment is allowed to be detached and the acquired another source information indicates the same signal source as the source information included in the selected piece of first attachment information, cause the user interface to resume outputting the predetermined information based on the acquired another source information.

7. The working vehicle according to claim 1, wherein the receiver and the controller are electrically connected to each other in a wired manner; and the controller is configured or programmed to, if no signal is inputted from the receiver during a period from when the attachment is attached to the hitch to when the attachment is allowed to be detached from the hitch, continue performing the predetermined control, stop outputting the predetermined information, and output error information indicating a connection error of the receiver.

8. The working vehicle according to claim 1, wherein the controller is configured or programmed to:

output the predetermined information based on the source information, the outputting of the predetermined information including causing a user interface to display at least one of an operating time of the signal source or a remaining charge level of a battery of the transmitter each of which is included in the source information, and causing the user interface to display attached information indicating that the attachment corresponding to the source information is attached; and during a period from when the predetermined information starts to be outputted to when the attachment is allowed to be detached from the hitch, if no other source information is acquired within the predetermined period of time, cause the user interface to continue displaying the attached information and stop displaying the operating time and the remaining charge level.

9. The working vehicle according to claim 1, wherein the controller is configured or programmed to finish performing the predetermined control and outputting the predetermined information when the attachment is allowed to be detached from the hitch.

10. The working vehicle according to claim 1, further comprising:

a first operation switch to be operated to attach the attachment to the hitch; and a second operation switch to be operated to allow the attachment to be detached from the hitch; wherein the controller is configured or programmed to determine whether or not the attachment is attached to the hitch based on an operation state of the first operation switch, and determine whether or not the attachment is allowed to be detached from the hitch based on an operation state of the second operation switch.

11. The working vehicle according to claim 1, wherein the controller is configured or programmed to:

cause a memory to store, for a period of time, one or more received signal strengths of the one or more wireless signals received by the receiver and the one or more pieces of first attachment information indicated by the one or more wireless signals such that the one or more received signal strengths and the one or more pieces of first attachment information are associated with each other; and when the attachment is attached to the hitch, select one of the one or more pieces of first attachment information stored in the memory that satisfies the predetermined condition relating to at least one of a received signal strength or first attachment information.

12. The working vehicle according to claim 11, wherein the receiver and the controller are electrically connected to each other in a wired manner; and the controller is configured or programmed to, when the attachment is attached to the hitch, if the memory stores no first attachment information, cause a user interface to output information requesting input of a piece of first attachment information, and, upon receipt of input of the piece of first attachment information via the user interface, start performing the predetermined control corresponding to the inputted piece of first attachment information and outputting the predetermined information corresponding to the inputted piece of first attachment information.

13. A working vehicle comprising:

a hitch to attach and detach an attachment thereto and therefrom;

a first interface to receive input of a piece of first attachment information relating to the attachment attached to the hitch;

a second interface to connect thereto at least one accessory electronic device provided in or on the attachment attached to the hitch;

a bus;

a controller connected to the bus;

a gateway connected to the bus; and at least one in-vehicle electronic device connected to the bus; wherein the gateway is connected to the second interface without the bus between the gateway and the second interface and is configured or programmed to output an external signal inputted thereto from the second interface to the bus;

the controller is configured or programmed to, if the external signal does not agree with the attachment corresponding to the piece of first attachment information inputted thereto via the first interface, not perform control corresponding to the external signal, and, if the external signal agrees with the attachment corresponding to the piece of first attachment information, perform control corresponding to the external signal; and the gateway is configured or programmed to, if the external signal does not agree with the attachment corresponding to the piece of first attachment information, not output, via the second interface, an output signal outputted from at least one of the controller or the at least one in-vehicle electronic device to the bus, and, if the external signal agrees with the attachment corresponding to the piece of first attachment information, output the output signal via the second interface.

14. An attachment usage system comprising a working vehicle to perform work using an attachment; wherein the working vehicle includes:

a hitch to attach and detach the attachment thereto and therefrom;

a first interface to receive input of a piece of first attachment information relating to the attachment attached to the hitch;

a second interface to connect thereto at least one accessory electronic device provided in or on the attachment attached to the hitch;

a bus;

a controller connected to the bus; and a gateway connected to the bus;

the gateway:

is connected to the second interface without the bus between the gateway and the second interface; and is configured or programmed to, if an external signal inputted thereto from the second interface does not agree with the attachment corresponding to the piece of first attachment information inputted thereto via the first interface, not output the external signal to the bus, and, if the external signal agrees with the attachment corresponding to the piece of first attachment information, output the external signal to the bus; and the controller is configured or programmed to perform control corresponding to the external signal inputted thereto via the bus.

15. The attachment usage system according to claim 14, further comprising a transmitter in or on the attachment to periodically transmit a wireless signal compliant with a near field communication standard; wherein the first interface includes a receiver to receive one or more of the wireless signals transmitted from one or more of the transmitters;

the controller is configured or programmed to:

select one of one or more of the pieces of first attachment information indicated by the one or more wireless signals received by the receiver that satisfies a predetermined condition; and output, to the bus, at least one of (i) the selected piece of first attachment information or (ii) a piece of second attachment information relating to the attachment that is generated or read from a memory based on the selected piece of first attachment information;

the gateway is configured or programmed to determine whether or not the external signal agrees with the attachment corresponding to the piece of first attachment information based on the at least one of the piece of first attachment information or the piece of second attachment information inputted thereto from the controller via the bus; and the working vehicle further includes a communication controller connected to the bus and configured or programmed to transmit, to an external computer in a wireless manner, the at least one of the piece of first attachment information or the piece of second attachment information inputted thereto via the bus.

16. The working vehicle according to claim 14, wherein the controller is configured or programmed to perform the control corresponding to the external signal after starting a predetermined process based on the piece of first attachment information.

17. The working vehicle according to claim 14, further comprising a first operation switch to be operated to attach the attachment to the hitch; wherein the gateway is configured or programmed to output, to the bus, the external signal which agrees with the attachment corresponding to the piece of first attachment information after the first operation switch is operated.

18. The working vehicle according to claim 14, further comprising a second operation switch to be operated to allow the attachment to be detached from the hitch; wherein the gateway is configured or programmed to not output the external signal to the bus after the second operation switch is operated.

19. The working vehicle according to claim 14, wherein the gateway is configured or programmed to determine whether or not the external signal agrees with the attachment corresponding to the piece of first attachment information.

20. The working vehicle according to claim 19, wherein the gateway is configured or programmed to determine whether or not the external signal agrees with the attachment corresponding to the piece of first attachment information based on information relating to the at least one accessory electronic device that is indicated by the external signal and based on information relating to the at least one accessory electronic device provided in or on the attachment that is included in the piece of first attachment information.

21. The working vehicle according to claim 19, further comprising a memory from which information is readable by the controller; wherein the memory is configured to store a plurality of pieces of second attachment information for a respective plurality of the attachments attachable to the hitch, the plurality of pieces of second attachment information each including at least one of (i) more types of information relating to the attachment than in the piece of first attachment information or (ii) information relating to the at least one accessory electronic device provided in or on the attachment;

the external signal indicates at least one of (a) information relating to the at least one accessory electronic device from which the external signal is outputted or (b) information relating to the attachment in or on which the at least one accessory electronic device is provided;

the controller is configured or programmed to output, to the bus, at least one of the piece of first attachment information or a piece of second attachment information that corresponds to the piece of first attachment information; and the gateway is configured or programmed to determine whether or not the external signal agrees with the attachment corresponding to the piece of first attachment information based on the at least one of the piece of first attachment information or the piece of second attachment information inputted thereto via the bus from the controller and based on the at least one of the information (a) or the information (b) indicated by the external signal.

22. The working vehicle according to claim 19, wherein the first interface includes a receiver to receive a wireless signal which is transmitted periodically from a transmitter in or on the attachment and which is compliant with a near field communication standard;

the controller is configured or programmed to:

select one of one or more of the pieces of first attachment information indicated by one or more of the wireless signals received by the receiver that satisfies a predetermined condition; and output, to the bus, at least one of (i) the selected piece of first attachment information or (ii) a piece of second attachment information relating to the attachment that is generated or read from a memory based on the selected piece of first attachment information; and the gateway is configured or programmed to determine, based on the at least one of the piece of first attachment information or the piece of second attachment information inputted thereto from the controller via the bus, whether or not the external signal agrees with the attachment corresponding to the inputted piece of first attachment information.

23. The working vehicle according to claim 22, wherein the receiver is connected to the bus and is configured or programmed to output, to the bus, a piece of first attachment information indicated by the wireless signal received from the transmitter and reception information relating to a reception condition of the wireless signal which are associated with each other; and the controller is configured or programmed to select one of the one or more pieces of first attachment information that satisfies the predetermined condition based on the piece of first attachment information and the reception information inputted thereto via the bus.

24. The working vehicle according to claim 22, further comprising a communication controller connected to the bus and configured or programmed to transmit, to an external computer in a wireless manner, the at least one of the piece of first attachment information or the piece of second attachment information inputted thereto from the controller via the bus.

25. The working vehicle according to claim 24, further comprising at least one in-vehicle electronic device connected to the bus; wherein the controller is configured or programmed to:

acquire, via the bus, a piece of third attachment information relating to the attachment corresponding to the piece of first attachment information from at least one of the at least one in-vehicle electronic device or the at least one accessory electronic device; and output the acquired piece of third attachment information to the bus; and the communication controller is configured or programmed to transmit, to the external computer, the piece of third attachment information inputted thereto from the controller via the bus.

26. The working vehicle according to claim 24, further comprising a first operation switch to be operated to attach the attachment to the hitch; wherein the controller is configured or programmed to, when the first operation switch is operated, select the piece of first attachment information and output, to the bus, securing-of-attachment information indicating that the attachment is attached to the hitch; and the communication controller is configured or programmed to transmit, to the external computer, the securing-of-attachment information inputted thereto via the bus.

27. The working vehicle according to claim 24, further comprising a second operation switch to be operated to allow the attachment to be detached from the hitch; wherein the controller is configured or programmed to, when the second operation switch is operated with the attachment attached to the hitch, output, to the bus, detaching-of-attachment information indicating that the attachment is allowed to be detached from the hitch; and the communication controller is configured or programmed to transmit, to the external computer, the detaching-of-attachment information inputted thereto via the bus.

28. The working vehicle according to claim 19, wherein the gateway is configured or programmed to not output the external signal to the bus if the external signal is inputted thereto but no first attachment information is inputted thereto.

29. The working vehicle according to claim 14, further comprising a user interface to output an alert when the external signal does not agree with the attachment corresponding to the piece of first attachment information.

30. The working vehicle according to claim 14, wherein the first interface includes a user interface to receive input of the piece of first attachment information from a user.

31. The working vehicle according to claim 30, wherein the controller is configured or programmed to output, to the bus, at least one of (i) the piece of first attachment information inputted thereto via the user interface or (ii) a piece of second attachment information generated or read from a memory based on the inputted piece of first attachment information, the piece of second attachment information relating to the attachment corresponding to the piece of first attachment information; and the gateway is configured or programmed to determine, based on the at least one of the piece of first attachment information or the piece of second attachment information inputted thereto from the controller via the bus, whether or not the external signal agrees with the attachment corresponding to the inputted piece of first attachment information.

32. The working vehicle according to claim 14, wherein the controller or an information processor included in the working vehicle is configured or programmed to determine whether or not the external signal agrees with the attachment corresponding to the piece of attachment information and output information indicating a result of determining to the gateway.

33. The working vehicle according to claim 32, wherein the external signal indicates information which includes (i) at least one of identification information of the at least one accessory electronic device from which the external signal is outputted or identification information of the attachment in or on which the at least one accessory electronic device is provided and (ii) state information indicating a state of the attachment;

the gateway is configured or programmed to input the identification information indicated by the external signal into the controller or the information processor;

the controller or the information processor is configured or programmed to determine whether or not the external signal agrees with the attachment corresponding to the piece of first attachment information based on the identification information inputted thereto from the gateway and based on at least one of identification information of the attachment corresponding to the piece of first attachment information or identification information of the at least one accessory electronic device provided in or on the attachment; and the gateway is configured or programmed to, upon receipt of input of information indicating that the external signal agrees with the attachment corresponding to the piece of first attachment information from the controller or the information processor, output at least the state information indicated by the external signal to the bus.

34. The working vehicle according to claim 14, wherein the second interface includes a connector to connect thereto an electric harness connected to the at least one accessory electronic device.

35. The working vehicle according to claim 14, further comprising:

a traveling device to allow a vehicle body to travel; and a working device provided on the vehicle body and having the hitch linked thereto; wherein the at least one accessory electronic device includes at least one sensor to detect at least one of a position, posture, or action of the attachment in or on which the at least one accessory electronic device is provided; and the controller is configured or programmed to control at least one of the traveling device or the working device based on a detection signal from the at least one sensor, the detection signal being the external signal which agrees with the attachment corresponding to the piece of first attachment information.

36. The working vehicle according to claim 14, further comprising a power outlet port to allow power to be outputted to the attachment attached to the hitch; wherein the controller is configured or programmed to allow power to be outputted via the power outlet port to the attachment based on the external signal which agrees with the attachment corresponding to the piece of first attachment information.

37. The working vehicle according to claim 36, wherein the at least one accessory electronic device includes at least one sensor to detect an operating state of an actuator in or on the attachment in or on which the at least one accessory electronic device is provided; and the controller is configured or programmed to control output of power to the attachment based on a detection signal from the at least one sensor, the detection signal being the external signal which agrees with the attachment corresponding to the piece of first attachment information.

38. The working vehicle according to claim 14, further comprising a user interface; wherein the controller is configured or programmed to cause the user interface to output information based on the external signal which agrees with the attachment corresponding to the piece of first attachment information.

39. The working vehicle according to claim 14, further comprising at least one in-vehicle electronic device connected to the bus; wherein the gateway is configured or programmed to, if the external signal does not agree with the attachment corresponding to the piece of first attachment information, not output, via the second interface, an output signal outputted from at least one of the controller or the at least one in-vehicle electronic device to the bus, and, if the external signal agrees with the attachment corresponding to the piece of first attachment information, output the output signal via the second interface.

40. An attachment usage system comprising a working vehicle to perform work using an attachment; wherein the working vehicle includes:

a hitch to attach and detach the attachment thereto and therefrom;

a receiver to receive a wireless signal which is transmitted periodically from a transmitter in or on the attachment and which is compliant with a near field communication standard; and a controller configured or programmed to acquire source information relating to a signal source which is at least one of the transmitter or the attachment indicated by the wireless signal received by the receiver; and the controller is configured or programmed to:

after the attachment is attached to the hitch, start performing a predetermined control and outputting predetermined information relating to a state of the signal source based on the source information; and before the attachment is allowed to be detached from the hitch, if another source information is acquired via the receiver within a predetermined period of time from the previous acquisition, continue performing the predetermined control and outputting the predetermined information, and, if no other source information is acquired within the predetermined period of time, continue performing the predetermined control and stop outputting the predetermined information.

* * * * *